United States Patent
Honermann et al.

(10) Patent No.: US 9,199,187 B2
(45) Date of Patent: Dec. 1, 2015

(54) LIQUID FILTER, ASSEMBLY, SYSTEM, AND METHODS

(75) Inventors: Bradley S. Honermann, Prior Lake, MN (US); Kathryn A. Legault, Bloomington, MN (US); John R. Hacker, Minneapolis, MN (US); Mark S. Emery, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 1217 days.

(21) Appl. No.: 12/519,866

(22) PCT Filed: Apr. 25, 2008

(86) PCT No.: PCT/US2008/061539
§ 371 (c)(1),
(2), (4) Date: Nov. 2, 2009

(87) PCT Pub. No.: WO2008/134494
PCT Pub. Date: Nov. 6, 2008

(65) Prior Publication Data
US 2010/0044295 A1 Feb. 25, 2010

Related U.S. Application Data

(60) Provisional application No. 60/955,954, filed on Aug. 15, 2007, provisional application No. 60/926,547, filed on Apr. 27, 2007.

(51) Int. Cl.
*B01D 35/34* (2006.01)
*B01D 29/23* (2006.01)
*B01D 35/153* (2006.01)

(52) U.S. Cl.
CPC ............ *B01D 29/232* (2013.01); *B01D 35/153* (2013.01); *B01D 2201/0415* (2013.01);
(Continued)

(58) Field of Classification Search
CPC ............. B01D 35/16; B01D 2201/291; B01D 2201/4046
USPC ...................................................... 210/232
See application file for complete search history.

(56) References Cited

U.S. PATENT DOCUMENTS

| 2,748,948 A | 6/1956 | Fricke et al. |
| 5,098,559 A | 3/1992 | Mack et al. |

(Continued)

FOREIGN PATENT DOCUMENTS

| DE | 42 01 041 A1 | 7/1993 |
| DE | 43 03 695 A1 | 8/1994 |

(Continued)

OTHER PUBLICATIONS

European Search Report mailed Jun. 1, 2012.

*Primary Examiner* — Tony G Soohoo
*Assistant Examiner* — Peter Keyworth
(74) *Attorney, Agent, or Firm* — Merchant & Gould P.C.

(57) ABSTRACT

A filter cartridge 38 includes a first endcap 41 defining a first open aperture and having at least first and second protrusions extending from a wall along the aperture and into the first open aperture. The first protrusion is spaced from the second protrusion in both a vertical direction and a circumferential direction. The filter cartridge also includes filter media 44 and a second endcap 42. The filter cartridge is mountable in a filter bowl 36 having an inner liner assembly, and the bowl and the inner liner assembly is connectable to a filter head to form a filter system. The filter system can have any one or combination of the following features: a filter lock-out mechanism to ensure that the filter head and the filter bowl are not connectable unless there is a proper filter cartridge installed therein; an automatic drain mechanism to drain the filter bowl of liquid before the filter cartridge is removed from the bowl; and a cartridge retention mechanism, to ensure that the filter cartridge remains with the filter bowl after the filter bowl has been removed from the filter head. Adaptor rings can be utilized in order to test other types of filter elements in the system, when those other types of filter elements do not have the protrusion arrangement. Assemblies, methods of servicing, methods of installing, methods of use, and methods of retaining can be practiced.

16 Claims, 39 Drawing Sheets

(52) U.S. Cl.
CPC ... *B01D2201/291* (2013.01); *B01D 2201/4046* (2013.01); *B01D 2201/4084* (2013.01); *Y10T 29/49815* (2015.01); *Y10T 29/49826* (2015.01)

(56) References Cited

U.S. PATENT DOCUMENTS

| | | | |
|---|---|---|---|
| 5,516,425 A | 5/1996 | Brieden et al. | |
| 5,643,446 A | 7/1997 | Clausen et al. | |
| 5,681,461 A | 10/1997 | Gullett et al. | |
| 5,695,633 A | 12/1997 | Ernst et al. | |
| 5,695,636 A | 12/1997 | Gullett | |
| 5,753,120 A | 5/1998 | Clausen et al. | |
| 5,762,788 A | 6/1998 | Gullett | |
| 5,770,065 A | 6/1998 | Popoff et al. | |
| 5,814,215 A | 9/1998 | Bruss et al. | |
| 5,846,416 A | 12/1998 | Gullett | |
| 5,855,780 A | 1/1999 | Dye et al. | |
| 5,888,384 A | 3/1999 | Wiederhold et al. | |
| 5,902,479 A | 5/1999 | Fukumori et al. | |
| 6,015,492 A | 1/2000 | Popoff et al. | |
| 6,016,923 A | 1/2000 | Baumann | |
| 6,053,334 A | 4/2000 | Popoff et al. | |
| 6,113,781 A | 9/2000 | Popoff et al. | |
| 6,171,491 B1 | 1/2001 | Popoff et al. | |
| 6,177,003 B1 | 1/2001 | Jainek et al. | |
| 6,217,763 B1 | 4/2001 | Lawrence et al. | |
| 6,235,194 B1 | 5/2001 | Jousset | |
| 6,251,273 B1 | 6/2001 | Jawurek et al. | |
| 6,485,637 B2 | 11/2002 | Jainek et al. | |
| 6,488,845 B1 | 12/2002 | Neufeld et al. | |
| 6,495,042 B1 | 12/2002 | Knight | |
| 6,506,303 B1 | 1/2003 | Gustafsson et al. | |
| 6,543,625 B1 | 4/2003 | Le Roux et al. | |
| 6,554,139 B1 | 4/2003 | Maxwell et al. | |
| 6,572,768 B1 | 6/2003 | Cline et al. | |
| 6,607,665 B2 | 8/2003 | Fick et al. | |
| 6,635,175 B2 | 10/2003 | Stankowski | |
| 6,679,990 B2 | 1/2004 | Reinhart | |
| 6,685,829 B1 | 2/2004 | Baumann et al. | |
| 6,770,196 B2 | 8/2004 | Wall | |
| 6,790,356 B2 | 9/2004 | Wright et al. | |
| 6,797,168 B1 | 9/2004 | Knight | |
| 6,814,243 B2 * | 11/2004 | Amstutz et al. | 210/457 |
| 6,837,993 B2 | 1/2005 | Clausen et al. | |
| 6,896,803 B2 | 5/2005 | Cline et al. | |
| 6,921,479 B2 | 7/2005 | Ardes | |
| 6,926,156 B2 | 8/2005 | Wall | |
| 6,926,825 B2 | 8/2005 | Ardes | |
| 6,936,161 B2 | 8/2005 | Wright et al. | |
| 6,949,182 B2 | 9/2005 | Yano et al. | |
| 6,983,851 B2 | 1/2006 | Maxwell et al. | |
| 6,986,426 B2 | 1/2006 | Clausen et al. | |
| 6,994,796 B2 | 2/2006 | Wall | |
| 7,086,537 B2 | 8/2006 | Maxwell et al. | |
| 7,163,623 B2 | 1/2007 | Knight | |
| 7,204,370 B2 | 4/2007 | Clausen et al. | |
| 7,326,342 B2 * | 2/2008 | Richmond et al. | 210/234 |
| 7,360,658 B2 | 4/2008 | Clausen et al. | |
| 7,390,407 B2 | 6/2008 | Weindorf et al. | |
| 2002/0020660 A1 | 2/2002 | Jainek et al. | |
| 2002/0170279 A1 | 11/2002 | Gustafson et al. | |
| 2004/0159600 A1 | 8/2004 | Stankowski | |
| 2004/0182777 A1 | 9/2004 | Stankowski et al. | |
| 2005/0035053 A1 | 2/2005 | Engelhard et al. | |
| 2005/0072721 A1 * | 4/2005 | Knight | 210/235 |
| 2005/0224407 A1 | 10/2005 | Hacker | |
| 2006/0006124 A1 | 1/2006 | Yates et al. | |
| 2006/0054547 A1 | 3/2006 | Richmond et al. | |
| 2007/0039864 A1 | 2/2007 | Dworatzek et al. | |
| 2007/0215561 A1 | 9/2007 | Yates et al. | |
| 2007/0267338 A1 | 11/2007 | Menez et al. | |
| 2008/0047891 A1 | 2/2008 | Roesgen | |
| 2008/0169233 A1 | 7/2008 | Pfitzer et al. | |

FOREIGN PATENT DOCUMENTS

| | | | |
|---|---|---|---|
| DE | 198 52 587 A1 | 2/2000 | |
| DE | 199 55 864 A1 | 5/2001 | |
| EP | 0 681 094 A1 | 11/1995 | |
| EP | 0 839 563 A1 | 5/1998 | |
| EP | 1 008 375 A1 | 6/2000 | |
| EP | 1 031 367 A1 | 8/2000 | |
| EP | 1 110 590 A2 | 6/2001 | |
| EP | 1 201 289 A1 | 5/2002 | |
| EP | 1 674 142 A1 | 6/2006 | |
| EP | 1 623 749 B1 | 9/2007 | |
| EP | 1 419 809 B1 | 11/2007 | |
| EP | 1 714 688 B1 | 1/2008 | |
| EP | 1 866 051 B1 | 6/2008 | |
| GB | 615250 | 1/1949 | |
| JP | 2003-320206 | 11/2003 | |
| WO | WO 02/11854 A1 | 2/2002 | |
| WO | WO 02/070869 A1 | 9/2002 | |
| WO | WO 03/080215 A1 | 10/2003 | |
| WO | WO2006012031 * | 2/2006 | B01D 35/153 |

* cited by examiner

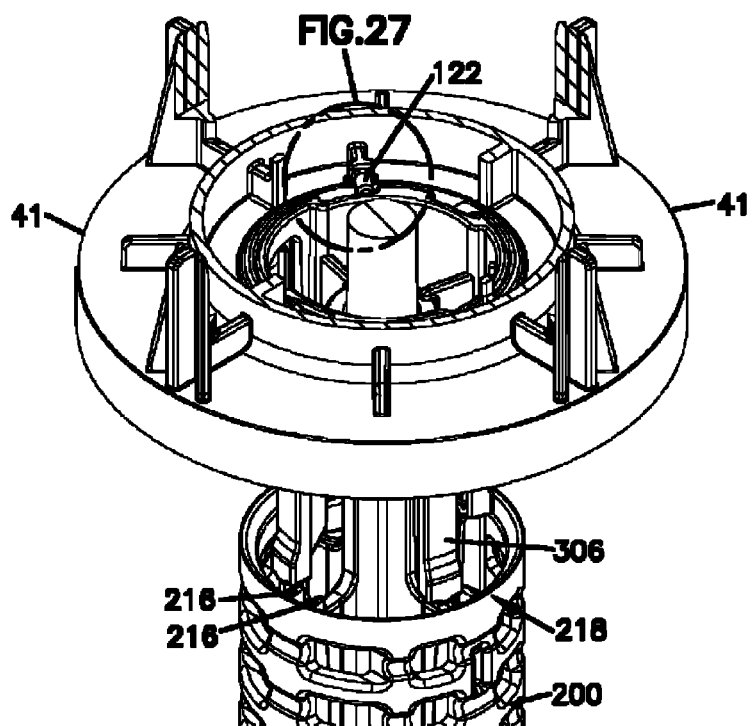
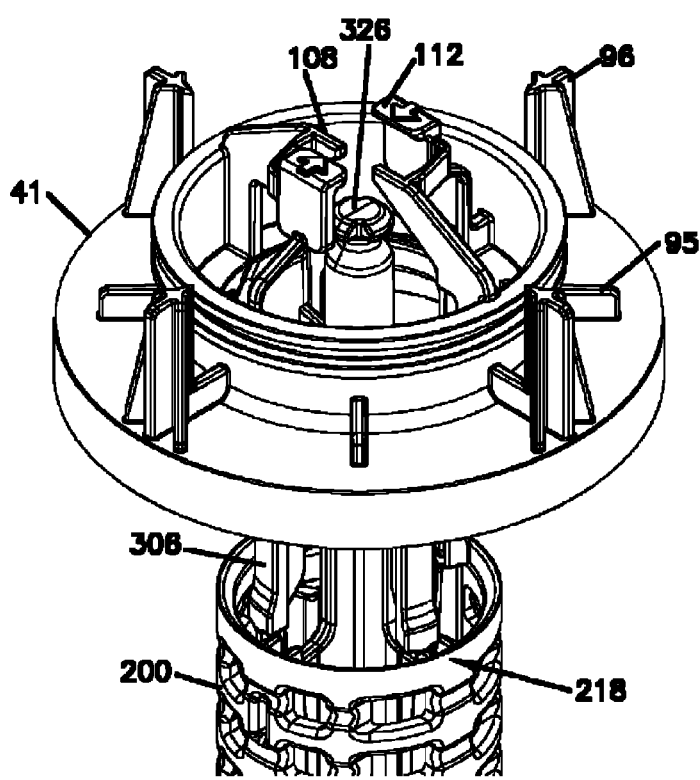

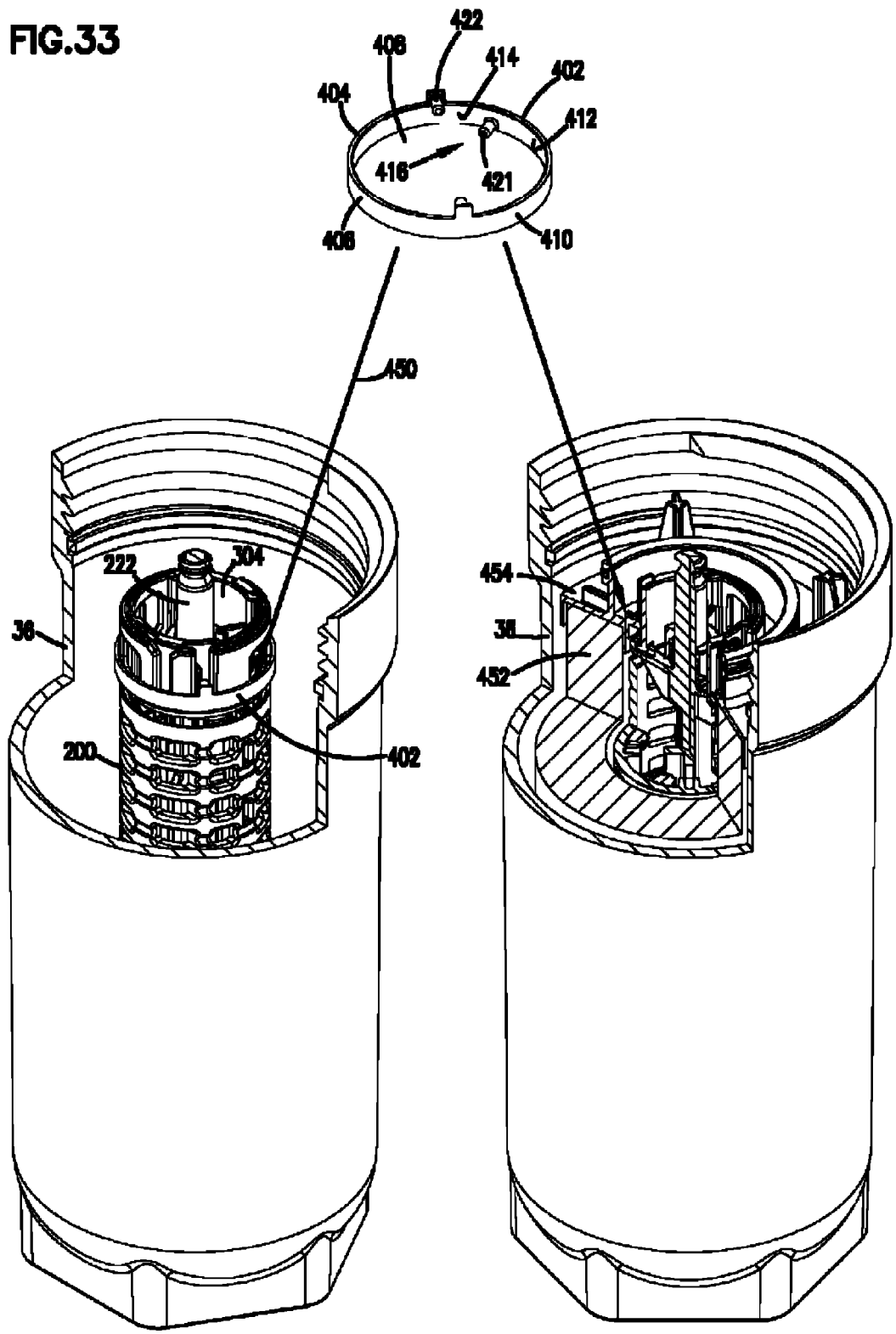

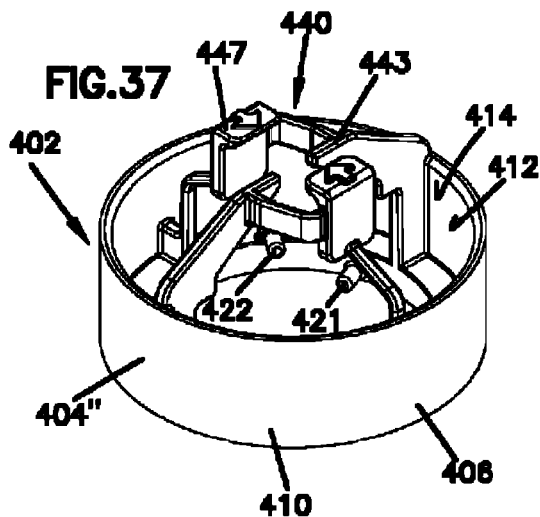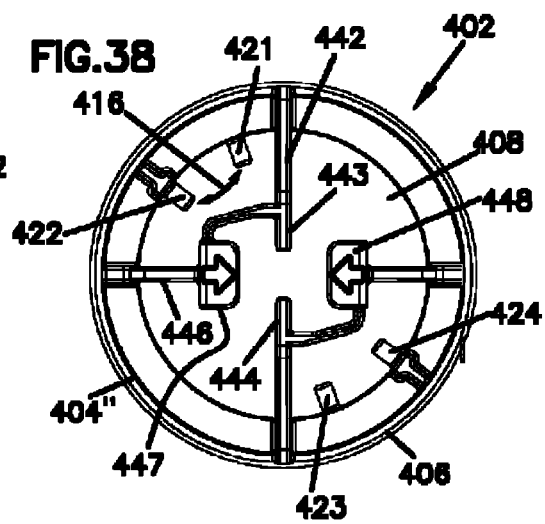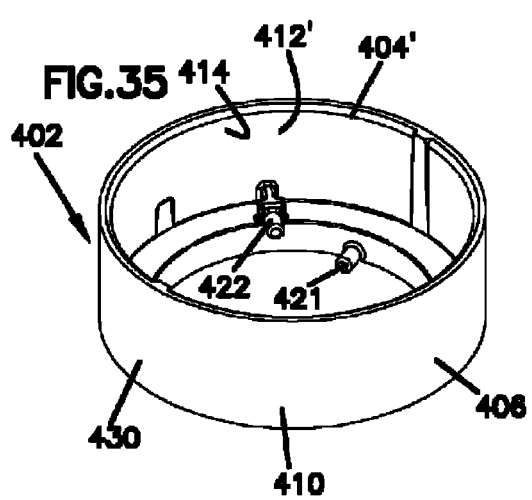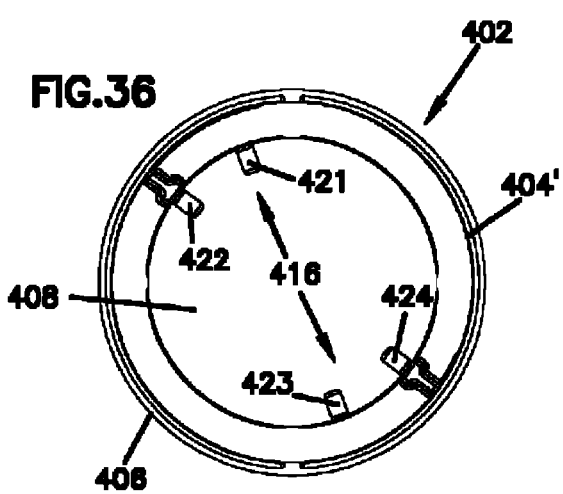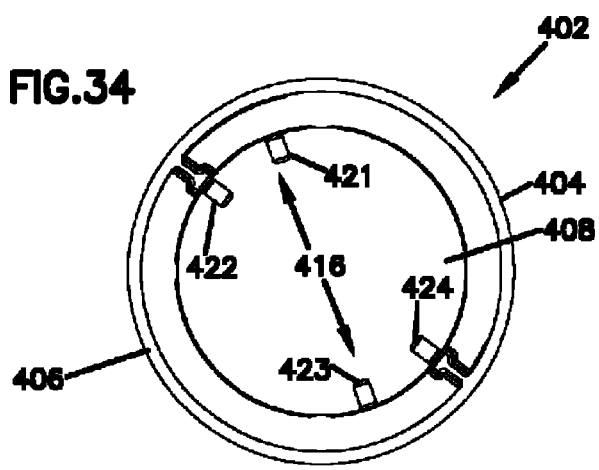

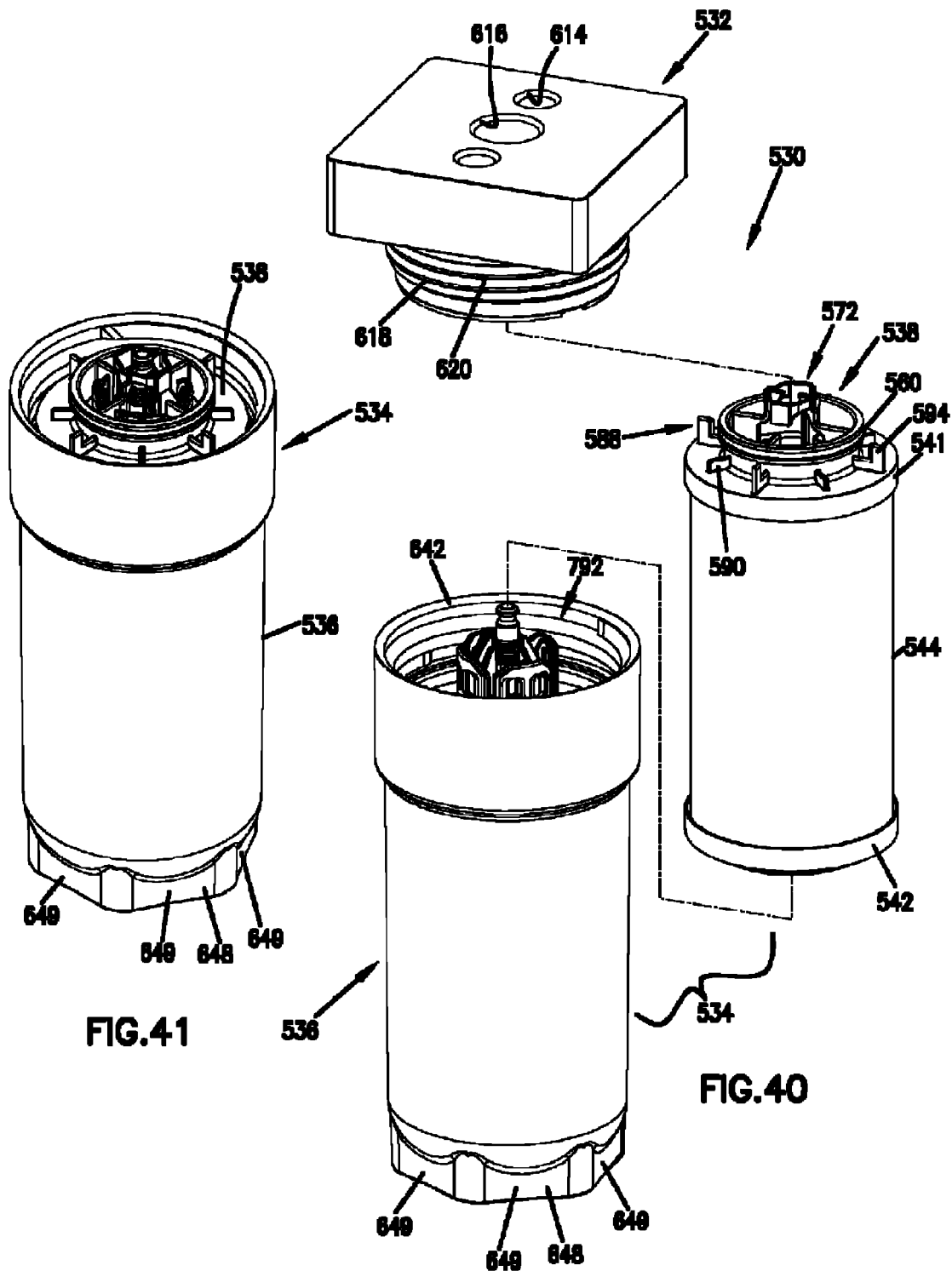

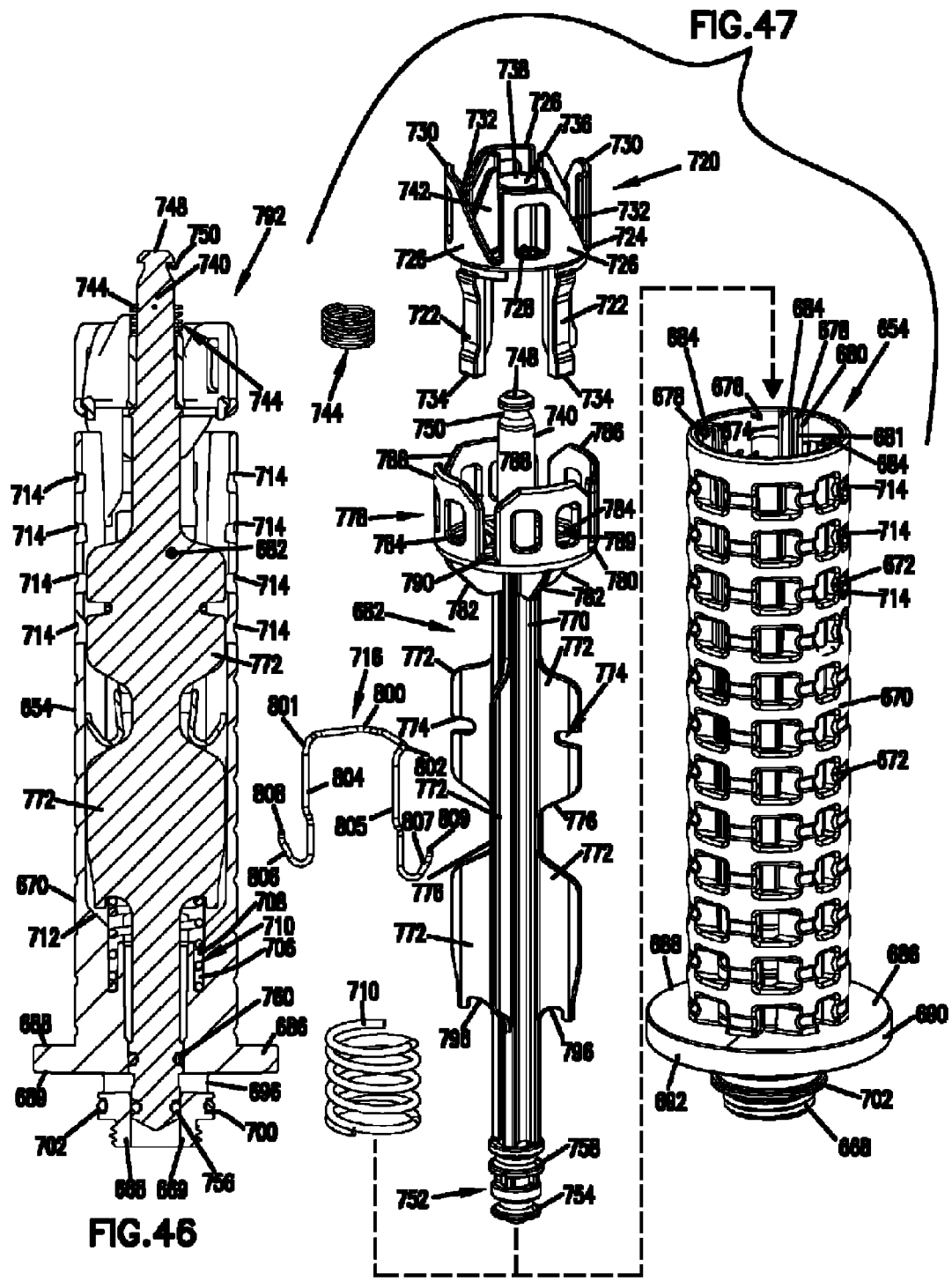

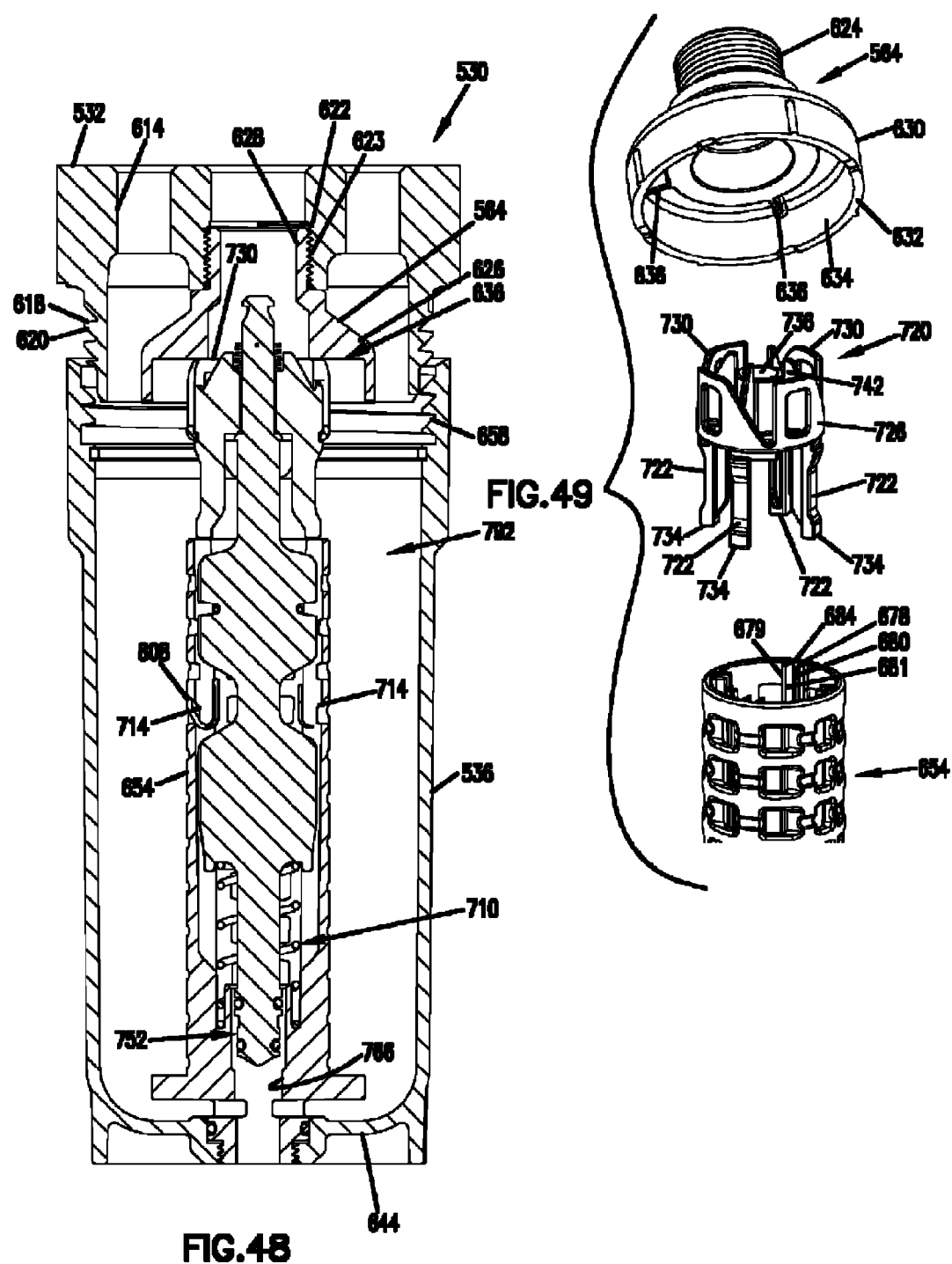

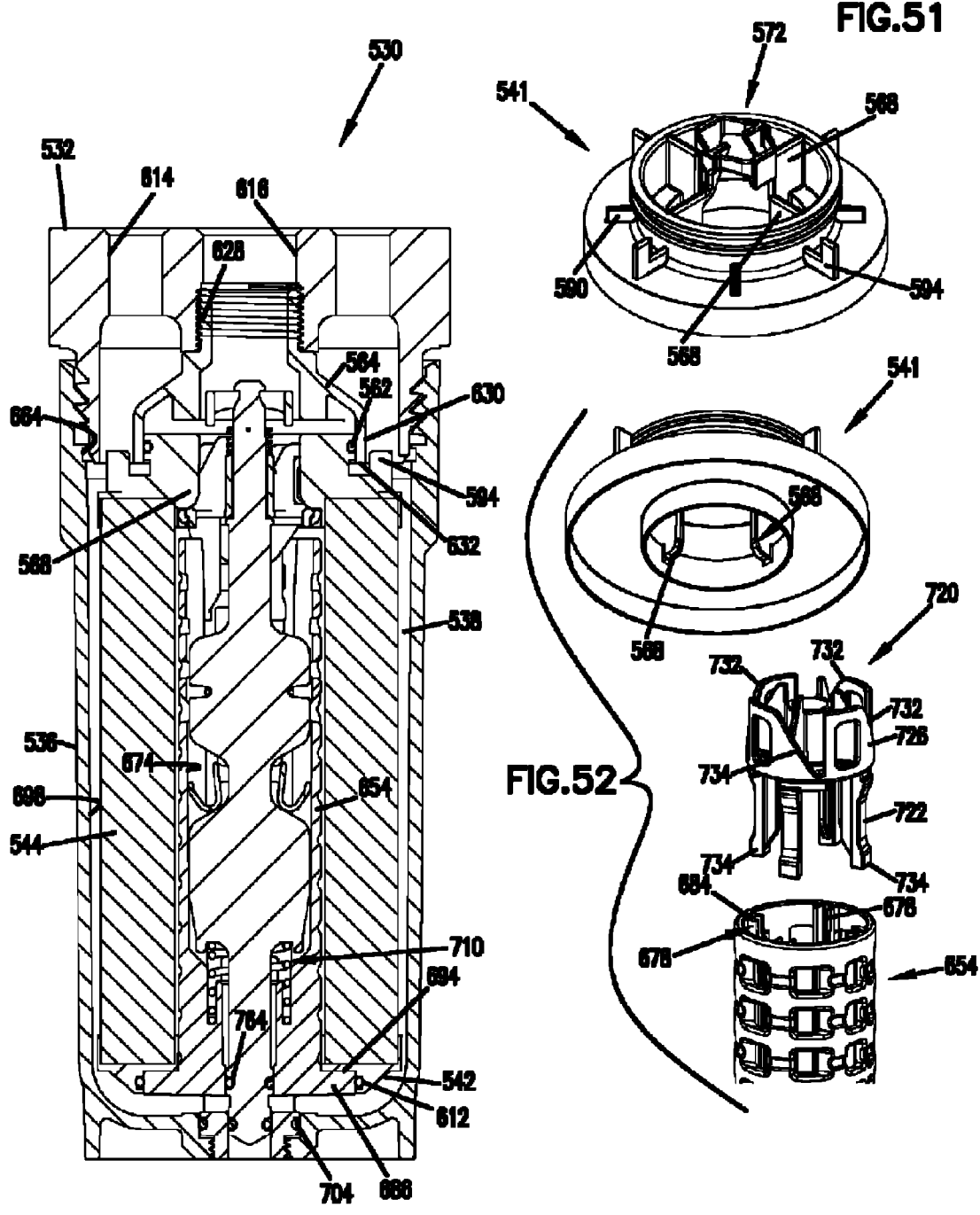

LIQUID FILTER, ASSEMBLY, SYSTEM, AND METHODS

This application is being filed on Jun. 18, 2009 as a National Stage of PCT International Application No. PCT/US2008/061539, in the name of Donaldson Company, Inc., a U.S. national corporation, applicant for the designation of all countries except the US, and Bradely S. Honermann, Kathryn A. Legault, John R. Hacker and Mark S. Emery, citizens of the U.S., applicants for the designation of the US only, and claims priority to U.S. Provisional Application Ser. No. 60/926,547, filed Apr. 27, 2007 and U.S. Provisional Patent Application Ser. No. 60/955,954 filed Aug. 15, 2007. These applications are incorporated herein by reference.

TECHNICAL FIELD

This disclosure relates to filtration assemblies and methods. In particular, this disclosure relates to filter assemblies and methods for use in liquid filtration, such as lube filters, hydraulic filters, and fuel filters.

BACKGROUND

Filters are commonly used in connection with lubrication systems and fuel systems for internal combustion engines, and hydraulic systems for heavy-duty equipment. Filters are also used in many other types of liquid systems. In these types of systems, the filter is changed periodically. In the art, there are at least two standard types of filters used. One type is a spin-on canister filter, while the other is a bowl-cartridge filter.

Bowl-cartridge filters typically include a reusable bowl holding a replaceable filter element (filter cartridge). Bowl-cartridge filters are sometimes preferred instead of spin-on canister filters due to disposal or other issues. Bowl-cartridge filters are mounted onto a filter head, and liquid to be cleaned passes through the filter head, into the bowl, through the replaceable filter cartridge, out of the bowl, and back into the filter head. After a period of use, the bowl-cartridge filter is removed from the filter head, and the replaceable filter cartridge is removed from the reusable bowl. The old filter cartridge is discarded and replaced with a new filter cartridge. The new filter cartridge is operably-mounted into the reusable bowl to provide a refurbished bowl-cartridge filter. This refurbished bowl-cartridge filter, containing the new filter cartridge, is then mounted onto the filter head.

Some problems with existing arrangements include the mess that is caused when servicing the bowl-cartridge filter. That is, when the bowl is removed from the filter head, it typically has oil, hydraulic fluid, or whatever fluid is being filtered within it. While removing the bowl from the filter head, the fact that the bowl has this liquid in it can lead to spills, drips, and inconvenience regarding disposal of this liquid. Improvements in filter design are desired to deal with these issues.

Other problems include the possibility of forgetting to replace the filter cartridge after removing the old filter cartridge. That is, after removing the old filter cartridge for servicing, it can be possible to replace the bowl back onto the filter head without operably inserting a new filter cartridge. This can lead to disastrous consequences for the equipment that needs the filtration. Furthermore, when there are multiple filter assemblies within close proximity of each other on one system, sometimes on a common filter head, the person servicing the filters can sometimes get mixed-up regarding which filter assembly goes on where—putting the wrong filter assembly onto the wrong mount on the filter head can lead to catastrophic results. Improvements to address these issues are desirable.

SUMMARY

To address these and other problems, in one aspect, a filter cartridge is provided. The filter cartridge includes a first endcap defining a first open aperture; a tubular construction of filter media; and a second endcap. The first endcap holds a first endcap seal member. The first endcap defines an aperture wall lining the first open aperture. At least first and second protrusions extend from the aperture wall and into the first open aperture. The first protrusion is spaced from the second protrusion in a vertical direction along the aperture wall. The first protrusion is also circumferentially spaced from the second protrusion along the aperture wall.

In another aspect, a filter assembly is provided including a bowl including a surrounding wall defining an interior volume; a filter cartridge removably oriented within the interior volume of the bowl; a porous inner filter support oriented within an open filter interior of the filter cartridge; and a basket. The filter support includes at least one projection extending radially inwardly therefrom. The basket includes at least one cantilevered leg extending axially in a direction toward the end of the bowl. The basket also includes a grooved wall extending axially in a direction toward the open mouth of the bowl. The basket is rotationally movable from a first locked position in which the leg axially abuts the at least one projection on the filter support and an unlocked position in which the leg is free of axial abutment with the projection and permits the basket to move in a direction toward the end of the bowl. The grooved wall is constructed and arranged to engage a portion of the filter cartridge and rotate the basket from the first locked position to the unlocked position.

In another aspect, a filter system is provided including a filter assembly, as characterized above, and further including a filter head selectively connectable to the bowl with the bowl and the filter head having mating structure permitting the bowl to be selectively removably attached to the filter head at the mouth.

In another aspect, a method of installing a filter cartridge into a filter bowl includes orienting a filter cartridge having a tubular construction of filter media into a filter bowl, the filter bowl having an inner filter support and a core piece within the inner filter support, the core piece holding a basket. While orienting, the method includes pushing the filter cartridge against the basket piece to disengage the core piece and the inner filter support. The method further includes after the step of disengaging, axially moving both the filter cartridge and the core piece relative to the inner filter support.

In another aspect, a filter assembly is provided including a bowl including a surrounding wall, an open mouth, an end opposite of the mouth, and a drainage aperture at the end opposite of the mouth that is in fluid communication with the interior volume. A filter cartridge is removably oriented within the interior volume of the bowl and includes a tubular construction of filter media defining an open filter interior. A porous inner filter support is oriented within the open filter interior. A drain valve assembly including a plug is moveably oriented between a sealed position and a drainage position. The sealed position includes the plug blocking fluid flow between the interior volume of the bowl and the drainage aperture. The drainage position includes the plug being oriented relative to the bowl to permit the flow from the interior volume of the bowl through the drainage aperture.

In another aspect, a method for draining liquid from a filter assembly includes at least partially unscrewing a bowl containing a filter cartridge from a filter head and permitting a spring to axially move a plug from a sealed position to a drainage position, the bowl having an interior volume and a fluid outlet port. The sealed position includes a plug blocking fluid flow between the interior volume of the bowl and the fluid outlet port and by blocking fluid flow between an upstream side of the filter cartridge and a downstream of the filter cartridge. The drainage position includes the plug being oriented to permit fluid flow between the interior volume of the bowl and the fluid outlet port of the bowl.

In another aspect, a filter assembly is provided including a bowl, a filter cartridge removably oriented within the bowl, a porous inner filter support oriented within the open filter interior of the filter cartridge, and a core piece operably oriented within an interior of the porous inner filter support. The core piece includes a post. The filter cartridge further includes a retention mechanism removably connected to the post.

In another aspect, a method for servicing a filter system includes removing a filter assembly, including a bowl containing a filter cartridge from a filter head. Next, the method includes during the step of removing, retaining the filter cartridge to the bowl by gripping with a pair of opposing fingers radially extending toward each other on the filter cartridge with a button on a core piece attached to the bowl.

In another aspect, an adaptor ring for use with a filter bowl is provided. The adaptor ring includes a circular band defining an open aperture. The band has an outer radial surface and an inside radial surface. The inside radial surface defines an aperture wall. At least first and second protrusions extend from the aperture wall and into the open aperture. The first protrusion is spaced from the second protrusion in a vertical direction along the aperture wall. The first protrusion is circumferentially spaced from the second protrusion along the aperture wall.

In another aspect, a method of using an adaptor ring to unlock a core piece and the filter support is provided. The method includes orienting an adaptor ring having at least first and second protrusions into a filter bowl. A filter bowl has an inner filter support mounted therein. The filter bowl further has a core piece within an inner filter support. The core piece holds a basket. The method also includes while orienting, pushing the first protrusion against the basket and then the second protrusion against the basket to disengage the core piece and the inner filter support. This allows for conducting a step, after disengaging, of axially moving the core piece relative to the inner filter support.

In another aspect, a filter assembly is provided including a bowl having an open mouth and a drainage aperture; a filter cartridge removably oriented within the interior volume of the bowl; a porous inner filter support oriented within the open filter interior of the filter cartridge; and a core piece operably oriented within the interior of the porous inner filter support. The core piece includes a plug movably oriented between a sealed position and a drainage position within the drainage aperture of the bowl. The sealed position includes the plug blocking fluid flow between the interior volume of the bowl and the drainage aperture, and the drainage position includes the plug being oriented relative to the bowl to permit flow from the interior volume of the bowl through the drainage aperture.

In another aspect, a method for draining liquid from a filter assembly includes at least partially unscrewing a bowl containing a filter cartridge from a filter head and permitting a spring to axially move a core piece having a plug from a sealed position to a drainage position. The sealed position includes the plug blocking fluid flow between the interior volume of the bowl and the fluid outlet port by blocking flow through a section of an inner filter support; and the drainage position including the plug being oriented relative to the inner filter support to permit flow through the section of the inner filter support permitting fluid flow between the interior volume of the bowl and fluid outlet port of the bowl.

BRIEF DESCRIPTION OF THE DRAWINGS

FIG. 25 is a perspective view of the arrangement of FIG. 23;

FIG. 26 is a perspective view of the arrangement of FIG. 25, but not having structure cut off in cross-section as shown in FIG. 25;

FIG. 33 is a perspective view illustrating a first embodiment of an adapter arrangement and how it would be utilized in the filter assembly;

FIG. 34 is a top plan view of the adapter of FIG. 33;

FIG. 35 is a perspective view of a second embodiment of an adapter arrangement;

FIG. 36 is a top plan view of the adapter arrangement of FIG. 35;

FIG. 37 is a perspective view of a third embodiment of an adapter arrangement;

FIG. 38 is a top plan view of the adapter arrangement of FIG. 37;

FIG. 40 is an exploded, perspective view of another filter system including a filter assembly and a filter head, constructed according to principles of this disclosure;

FIG. 41 is a perspective view of the filter assembly, including a filter bowl and a filter cartridge illustrated in FIG. 40;

FIG. 46 is a schematic, cross-sectional view of one embodiment of an inner liner assembly depicted in FIG. 45;

FIG. 47 is an exploded, perspective view of the components of FIG. 46;

FIG. 48 is a schematic, cross-sectional view of the filter bowl, inner liner assembly, and filter head of certain preferred embodiments constructed according to principles of this disclosure;

FIG. 49 is an exploded, perspective view of an adaptor, basket, and portion of an inner filter support tube that can be seen in the cross-sectional view of FIG. 48;

FIG. 50 is a schematic, cross-sectional view of a filter system including a filter head, a filter bowl, and filter cartridge operably assembled together, constructed according to principles of this disclosure;

FIG. 51 is a top-perspective view of an endcap that is utilized on one embodiment of a filter cartridge, constructed according to principles of this disclosure;

FIG. 52 is an exploded, perspective view of the endcap of FIG. 51 and the basket and inner filter support shown in FIG. 49;

DETAILED DESCRIPTION

I. The Embodiments of FIGS. 1-39

A. Overview

Figure 1:
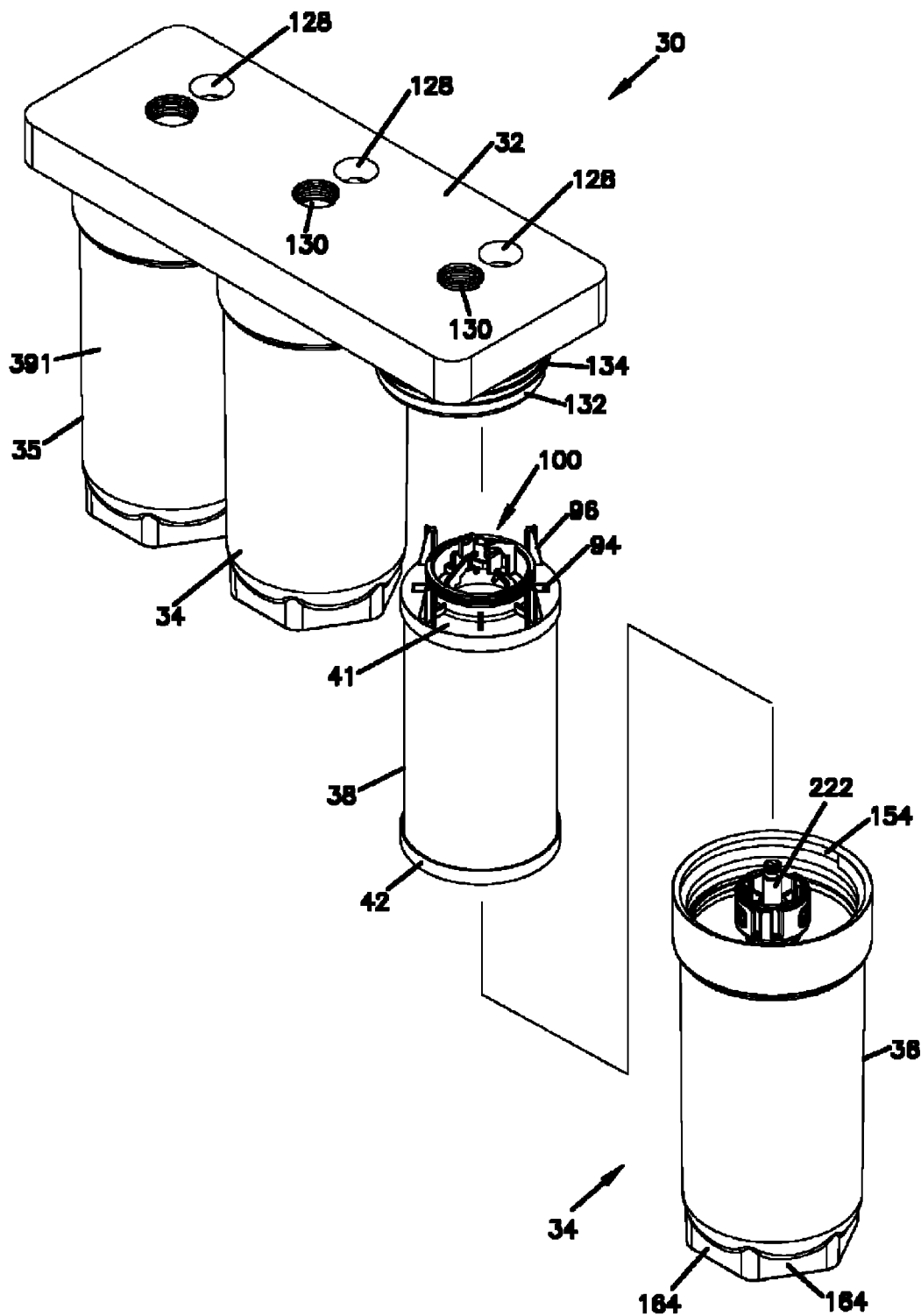
FIG. 1 is a perspective view of a filter system including a plurality of filter assemblies, one of which shows the filter cartridge removed from a filter bowl, constructed according to principles of this disclosure.
Figure 2:
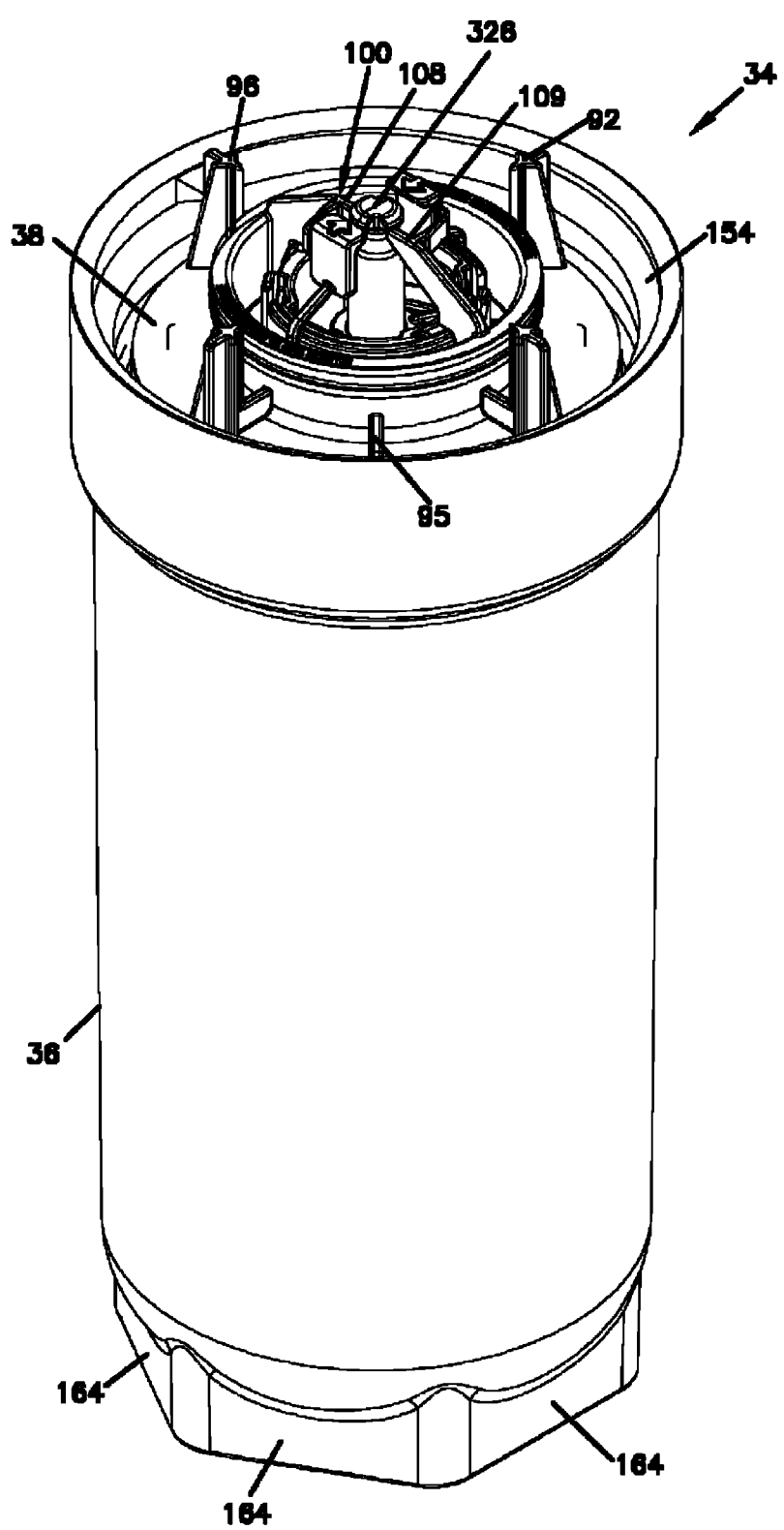
FIG. 2 is a perspective view of a filter assembly including a filter cartridge and filter bowl, constructed according to principles of this disclosure.
Figure 3:
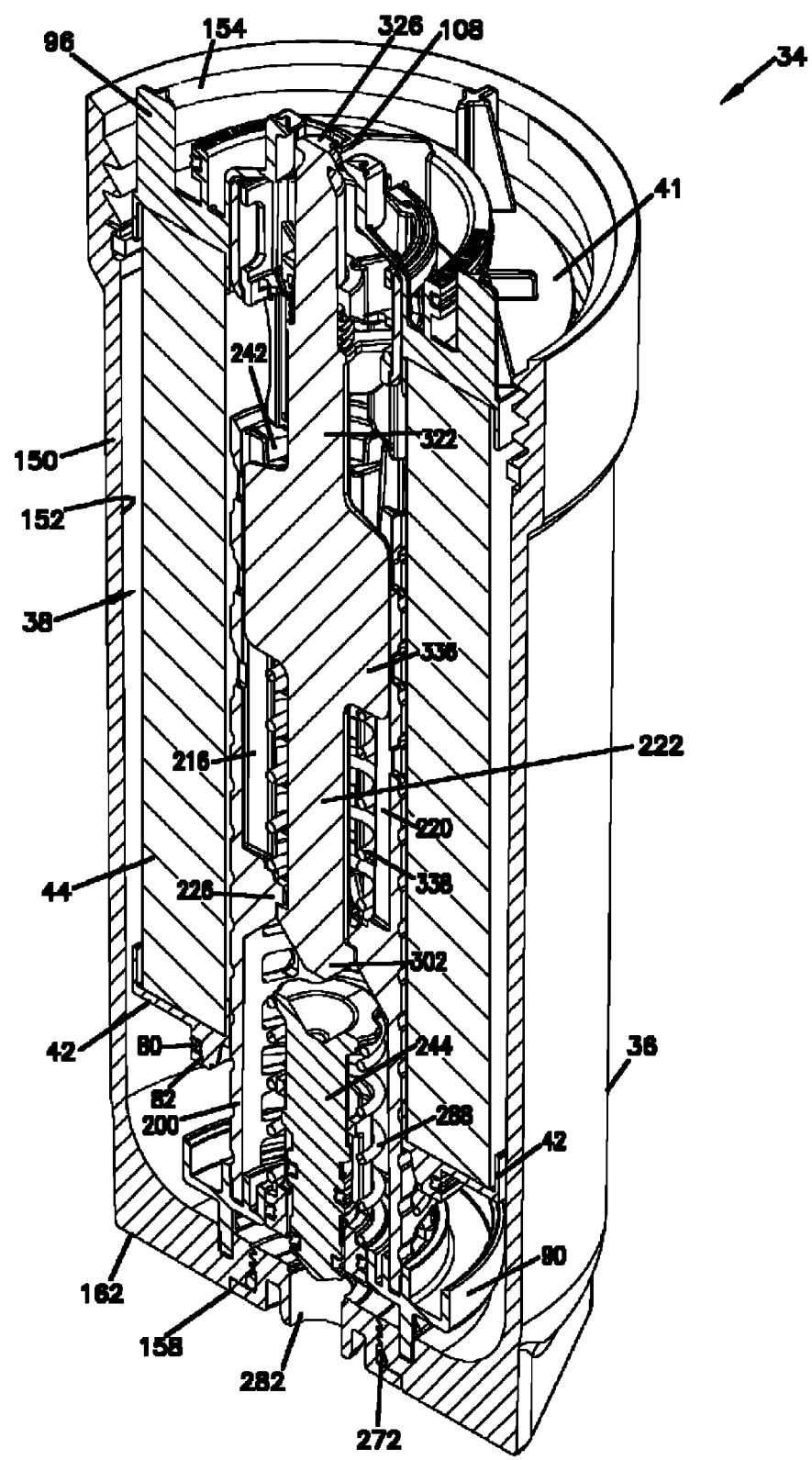
FIG. 3 is a perspective, cross-sectional view of the filter assembly depicted in FIG. 2.
Figure 4:
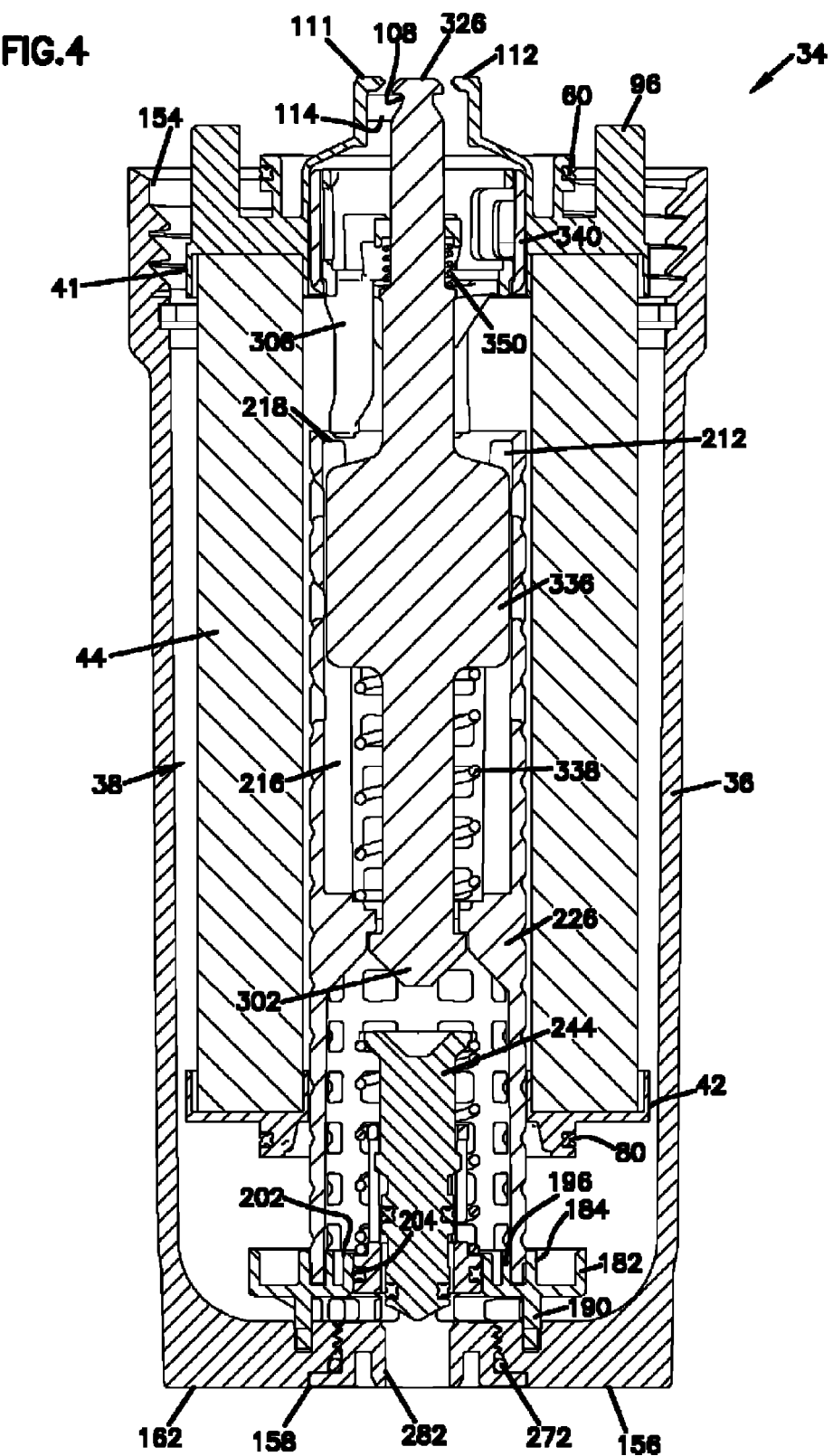
FIG. 4 is a cross-sectional view of the filter assembly depicted in FIG. 2.

An example embodiment of a filtration system including a filter assembly and a filter head is depicted in FIGS. 1-39. It should be realized that many examples are envisioned and not illustrated in the drawings. FIG. 1 shows a filter system 30, including a filter head 32 and a filter assembly 34. In the embodiment of FIG. 1, there is one common filter head 32 accommodating at least first and second filter assemblies 34. Also attached to the filter head 32 is a bypass filter assembly 35. The filter assemblies 34 are full-flow filters, while the filter assembly 35 is a bypass filter assembly.

In FIG. 1, one of the filter assemblies 34 is shown in an exploded, perspective view as including filter bowl 36 and a removable and replaceable filter cartridge 38.

Each of the filter assemblies 34, 35 is selectively connectable and mountable on the filter head 32. The filter head 32 is connected with other equipment, including a lubrication system of an engine, a fuel system for an engine, a hydraulic system for heavy-duty equipment, and generators for industrial use.

In the embodiment illustrated, the filter assembly 34 includes features including a lock-out mechanism, an auto-drain valve mechanism, and a cartridge retention mechanism. Each of these features can be implemented independently of the other features. The particular embodiment illustrated in the drawings shows all three features integrated into the same filter assembly. One skilled in the art will appreciate that each feature can be implemented independently of the others.

Figure 39:
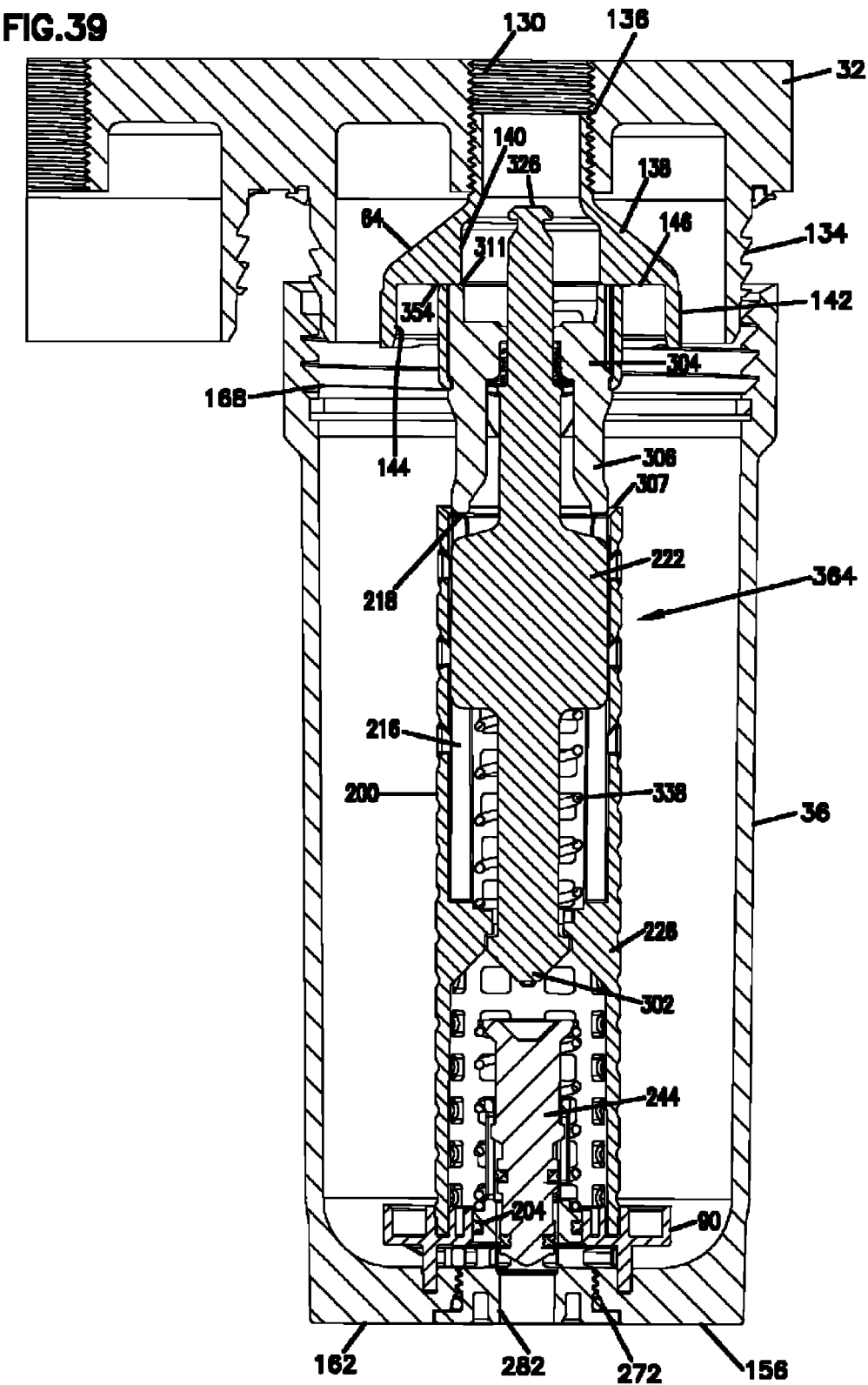
FIG. 39 is a cross-sectional view of the filter bowl not being able to mate with the filter head because of the lock-out arrangement.

In general, the lock-out mechanism ensures that the filter system 30 is not accidentally operated with equipment without the filter cartridge 38 installed therein (see FIG. 39, for example). Furthermore, in the particular system 30, the lock-out mechanism helps to ensure that the filter cartridge that goes within the bypass filter assembly 35 is not mistakenly used with the filter cartridge of the full-flow filter assemblies 34. The equipment upon which the filter system 30 is mounted is protected by ensuring that the filter head 32 and the filter bowl 36 cannot be operably connected unless there is a filter cartridge 38 operably oriented within the filter bowl 36 (FIG. 39). It also protects the equipment by ensuring that the correct filter cartridge 38 is mounted within the filter bowl 36, rather than, for example, the bypass filter cartridge utilized in the bypass filter assembly 35. Details on an example lock-out mechanism are described in Section K of this disclosure.

An auto-drain valve mechanism can be included in the filter system 30 and will allow for draining of the filtered liquid from the filter bowl 36 during servicing of the filter system 30. The auto-drain valve mechanism allows for draining of the filter bowl 36 before the filter cartridge 38 is removed from the bowl 36. An example embodiment is described in Section L of this disclosure.

The filter system 30, in this embodiment, also includes a cartridge retention mechanism. This feature allows for attachment of the filter cartridge 38 to the filter bowl 36 after the filter assembly 34 has been completely removed from the filter head 32. Section M describes an example embodiment of a cartridge retention mechanism.

For purposes of organization, it should be understood that the following description will be of various pieces of the particular, illustrated embodiment. After each of the pieces in this embodiment is described, the way in which the pieces interact to provide the above and other functions are described. Methods of operation, assembly, filtering, and servicing are also described. The following are example embodiments only. A variety of implementations can be made without departing from the scope of the disclosure. Not all of the reference numerals are shown on each FIG., for purposes of clarity.

B. Filter Cartridge 38, FIGS. 6 and 7

Figure 6:
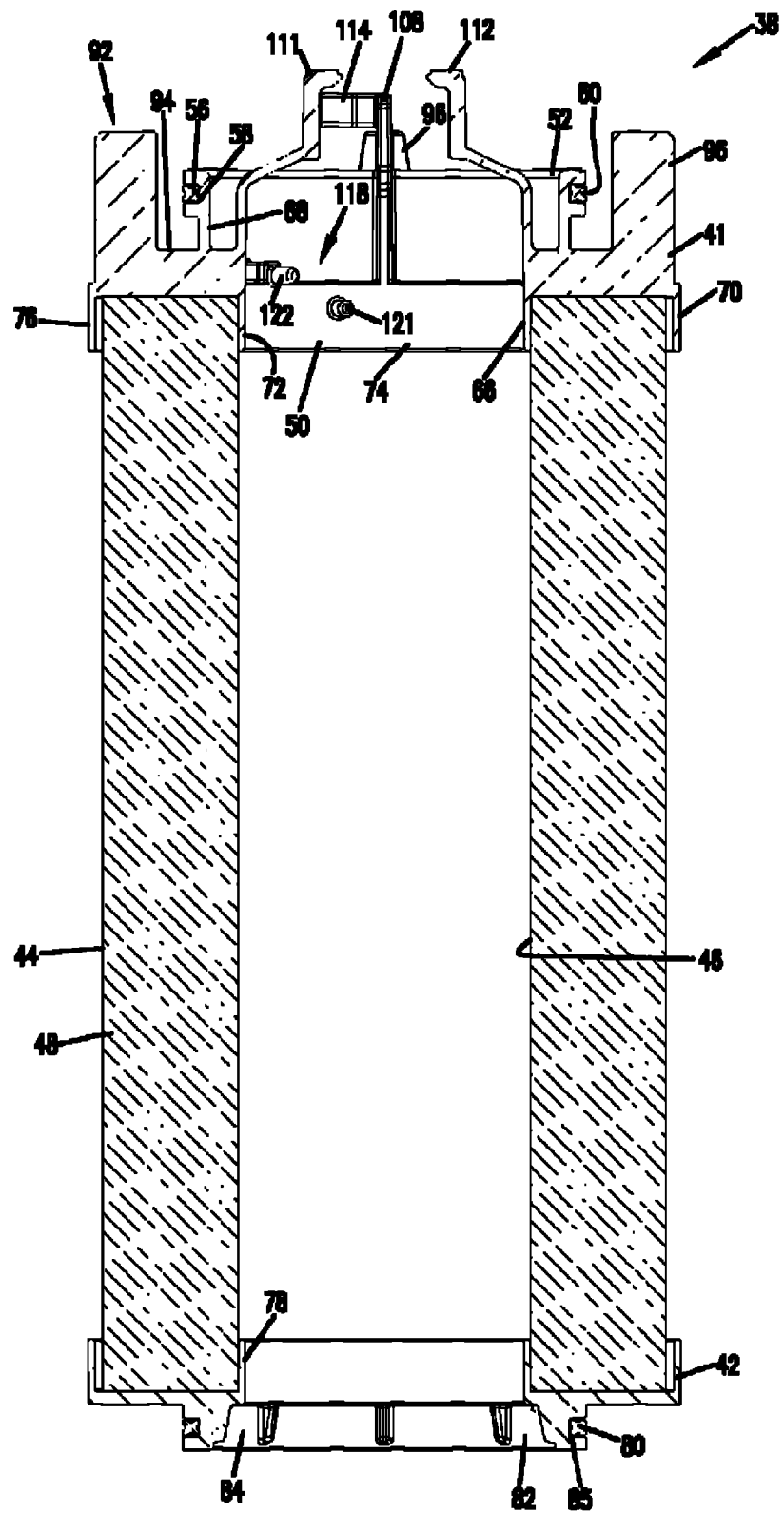
FIG. 6 is a cross-sectional view of the filter cartridge depicted in FIG. 5, the cross-section being taken along the line 6-6 of FIG. 5.
Figure 7:
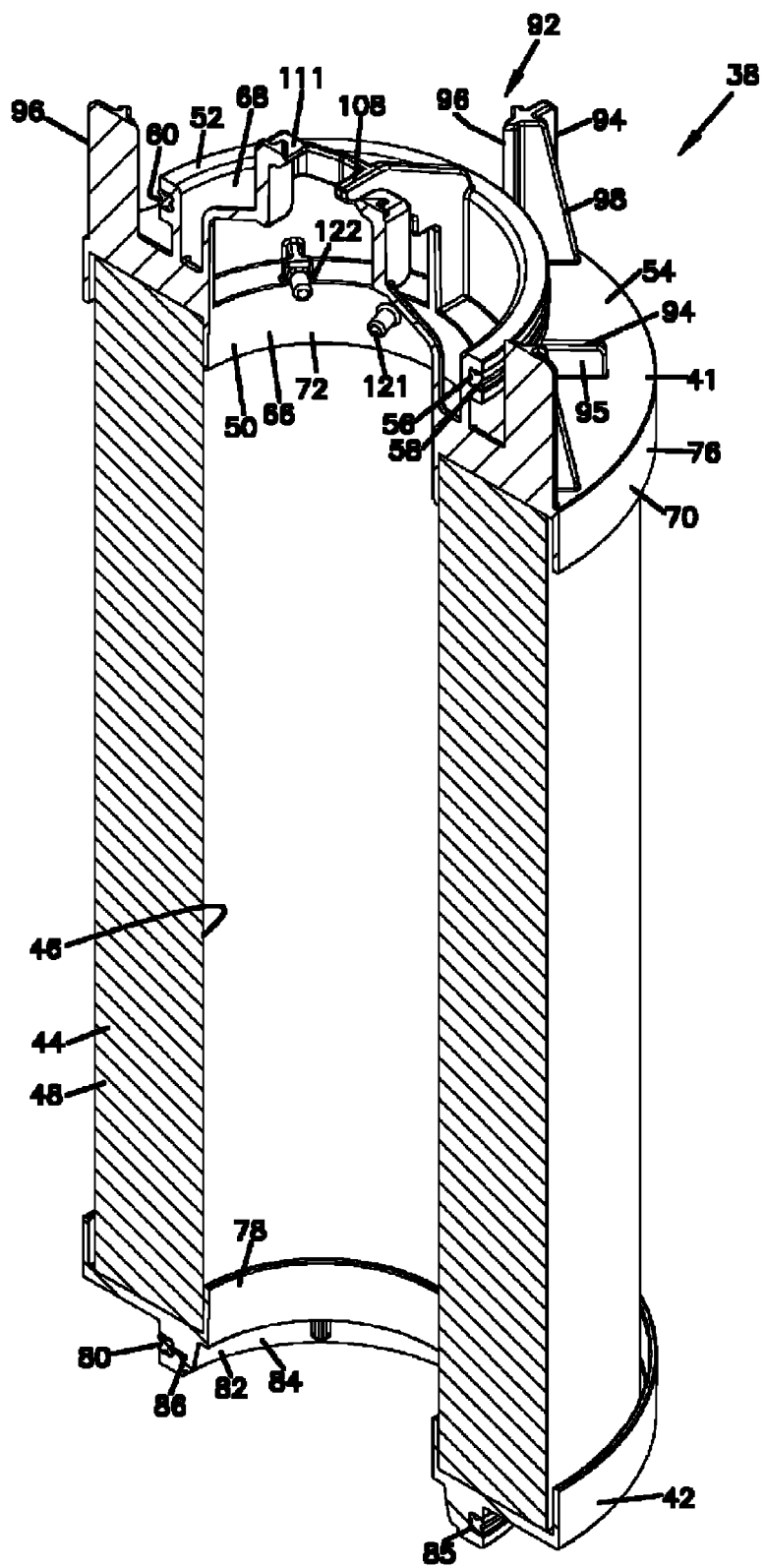
FIG. 7 is a perspective, cross-sectional view of the filter cartridge of FIGS. 5 and 6, the cross-section being taken along the line 7-7 of FIG. 5.

Reference is made to FIGS. 6 and 7, which illustrate one embodiment of filter cartridge 38 usable in this arrangement. In the embodiment shown, the filter cartridge 38 includes first and second opposite endcaps 41, 42 and a tubular construction of filter media 44 extending between the first and second endcaps 41, 42. In the embodiment shown, the media 44 is cylindrical in construction and defines an open filter interior 46. A variety of different types of media 44 can be used and will depend upon the particular fluid that is being filtered. In the embodiment shown, the media 44 is pleated media 48. The pleated media 48 can include cellulose, synthetic, and blends of synthetic and cellulose, for example.

In general, fluid to be filtered flows through the media 44, which functions to remove particulate or other debris from the fluid before flowing into the open filter 46. In some systems, it will be possible to operate the filter system 30 in a reverse-flow manner, in which the liquid to be filtered flows from the open filter interior 46, through the media 44, and to a region outside of the media 44.

The first endcap 41, depicted, defines a first open aperture 50, which is in fluid communication with the open filter interior 46. The first endcap 41 further includes an axially-extending neck 52 protruding from an outward axial surface 54. The neck 52 defines a groove 56 along an outer radial surface 58 of the neck 52. Seated within the groove 56 along the radial surface 58 is a first seal member 60. The first seal member 60 forms a releasable seal 62 (FIG. 11) with an adaptor 64 when the filter cartridge 38 is operably assembled in the filter system 30 with the filter head 32 operably engaged with the filter bowl 36.

The first endcap 41 defines an aperture wall 66 lining the first open aperture 50. The first open aperture 50 in the embodiment shown, is circular and defines an inner diameter. The neck 52 defines an inner radial surface 68 that is on an opposite side as the outer radial surface 58. In the embodiment shown, the first endcap 41 further defines a filter media holding section 70. The filter media holding section 70 is the portion of the first endcap 41 that is secured to the filter media 44 and contains the media 44 on radial sides thereof. In the embodiment shown, the filter media section 70 includes an inner media wall 72 defining an inner radial surface 74, which forms part of the aperture wall 66. The inner wall surface 74 of the inner media wall 72 is spaced radially inwardly relative to the neck inner radial surface 68. The filter media holding section 70 further includes an outer media wall 76 that circumscribes remaining portions of the first endcap 41. The first endcap 41 further includes other features, in the embodiment shown, and those features will be further described below after the second endcap 42 is described.

Second endcap 42 is at an end of the filter cartridge 38 opposite from the first endcap 41. The second endcap 42 is secured to a second end of the filter media 44. It defines a second open aperture 78 in communication with the open filter interior 46. The second endcap 42 holds a second endcap seal member 80.

In the embodiment shown, the second endcap 42 defines a second axially extending neck 82. The neck 82 defines inner and outer radial surfaces 84, 85. The second endcap seal member 80 is held by the second axially extending neck 82 on one of the radial surfaces, and in the embodiment shown, is held by the outer radial surface 85. In the embodiment shown, the neck 82 includes a groove 86 in the radial surface 85, which holds the second seal member 80. The second seal member 80 forms a releasable seal 88 (FIG. 12) with a disk 90. The disk 90 is secured to the bowl 36, and is further described below.

Figure 11:
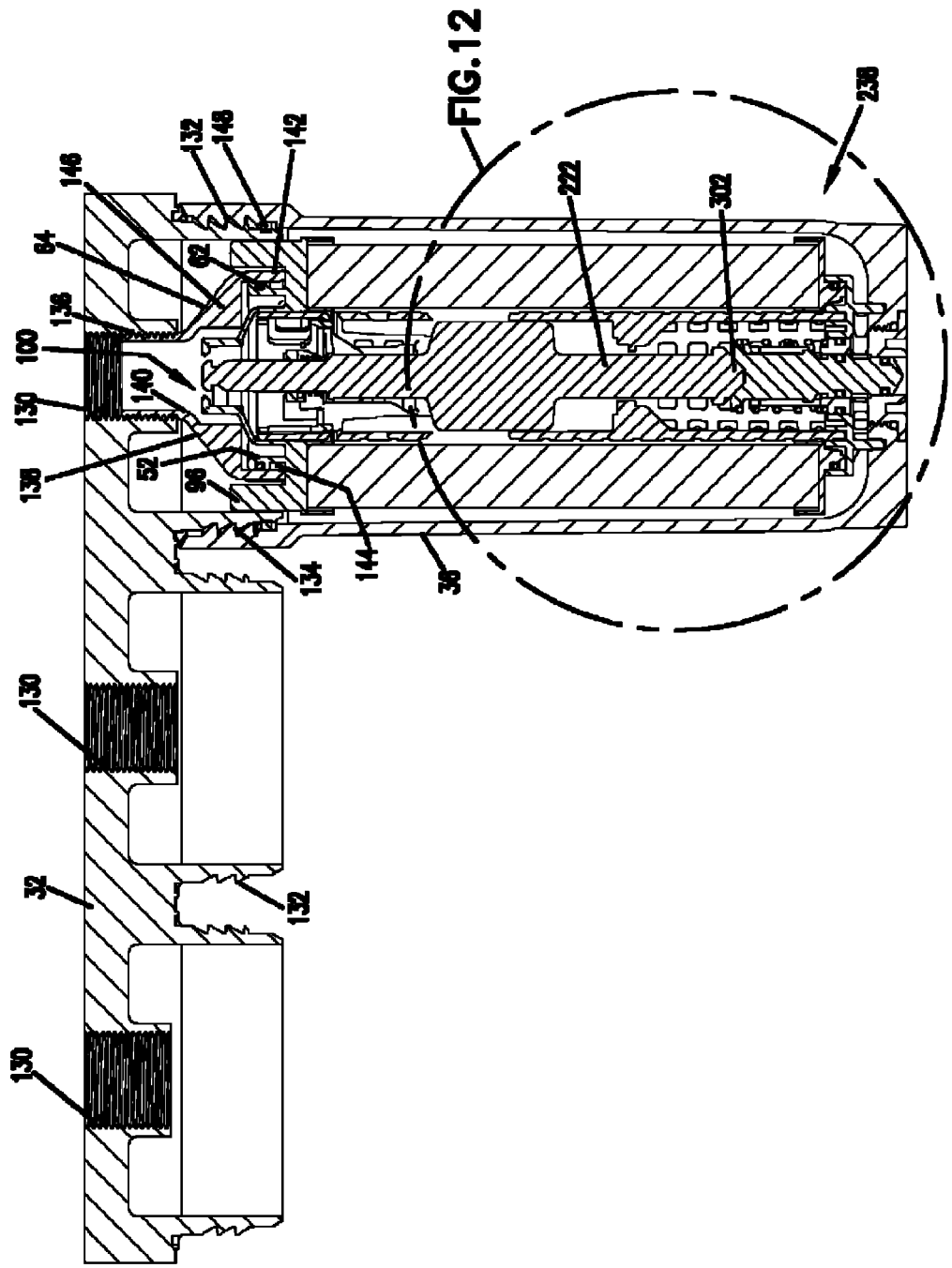
FIG. 11 is a cross-sectional view of a filter system, similar to FIG. 1, but depicting only a single filter assembly connected to a filter head.

The filter cartridge 38 further includes, in the embodiment shown, a centering arrangement 92 (FIG. 5) to assist with positioning and centering the filter cartridge 38 relative to the filter head 32. In the embodiment shown, the centering arrangement 92 includes a plurality of stand-offs or projections 94 extending axially from the outward axial surface 54 of the first endcap 41. In the embodiment shown, the projections 94 include both first projections 95 and second projections 96. The second projections 96 are taller than the first projections 95. The second projections 96, in cross section, have an L-shaped cross section and in preferred embodiments have ribs or flanges 98 to add strength. The second projections 96 assist in holding the filter cartridge 38 in place relative to the adaptor 64 (FIG. 11). As can be seen in FIG. 11, the adaptor 64 is contained between the second projections 96 and the first neck 52.

In the illustrated embodiment, the filter cartridge 58 further includes a retention mechanism 100. In the embodiment shown, the retention mechanism 100 is spaced both axially and radially from the neck 52. The retention mechanism 100 cooperates with other structure to retain the cartridge 38 with the filter bowl 36 during servicing. Details on this operation are discussed later below in Section M of this disclosure.

In the embodiment shown, the retention mechanism 100 is radially centered within the first open aperture 50. While a variety of implementations are contemplated, in the embodiment shown, the retention mechanism 100 includes a flexible semi-tubular arrangement 102 (FIG. 5) secured to a portion of the endcap 41, for example, the neck 52. By the term "semi-tubular", it is meant that when viewing in top plan, such as FIG. 5, overall it may be generally tubular in shape, but not necessarily have a closed perimeter, and the perimeter can form an irregular, non-circular shape, or it may also form a circle, in some embodiments shown.

Figure 5:
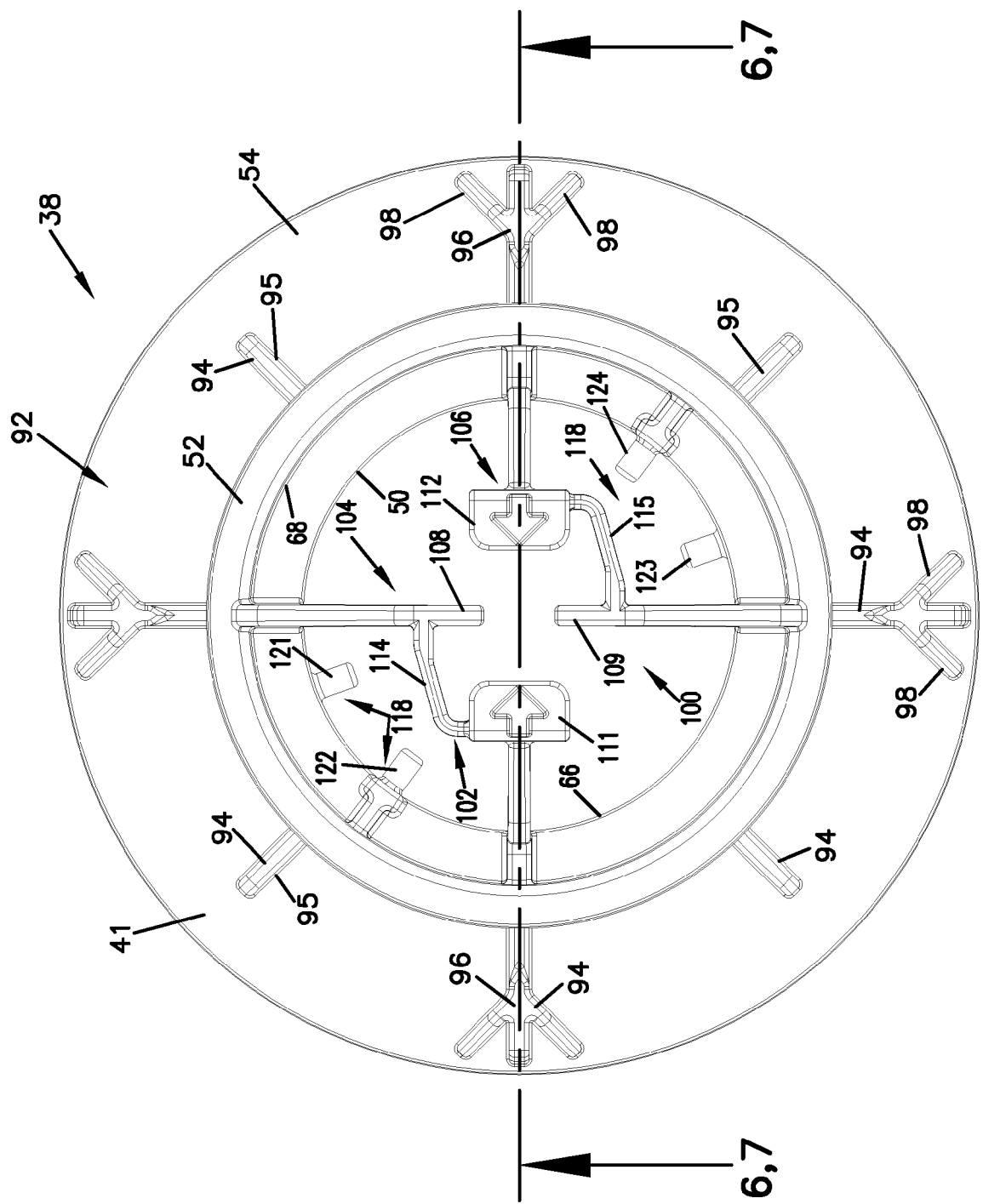
FIG. 5 is a top plan view of a filter cartridge utilized in the filter assembly of FIG. 2.

Still in reference to FIG. 5, the semi-tubular arrangement 102 has a gripper arrangement 104 and a release arrangement 106. In general, the gripper arrangement 104 is useful in providing a releasable connection with other structure in the filter bowl 36 to allow for the cartridge 38 to remain retained in the filter bowl 36 when servicing system 30. The release arrangement 106 is useful in providing a convenient, quick, and easy to use mechanism to release the filter cartridge 38 from the filter bowl 36, during servicing, and allow the cartridge 38 to be removed from the bowl 36.

As embodied herein, the gripper arrangement 104 includes a pair of opposing fingers 108, 109 radially extending into the end cap aperture 50. As will be explained below, in Section M of this disclosure, the fingers 108, 109 engage structure (a button 326, which is part of a core piece 222) in the filter bowl 36.

As embodied herein, the release arrangement 106 includes a pair of opposing tabs 111, 112. In the embodiment shown, each tab 111, 112 is located about 90 degrees relative to the fingers 108, 109. Tab 111 is connected to finger 108 by way of rib 114, while tab 112 is connected to finger 109 by way of rib 115.

The tabs 111, 112 are depressible or compressible in a direction toward each other, and because of the connection of the tabs 111, 112 to the fingers 108, 109 by way of the ribs 114, 115, upon squeezing the tabs 111, 112 toward each other, the ribs 114, 115 move the fingers 108, 109 away from each other. Moving the fingers 108, 109 away from each other will release the filter cartridge 38 from the corresponding structure in the filter bowl 36.

The filter cartridge 38 further includes a protrusion arrangement 118 (FIG. 5) extending into the first open aperture 50. The protrusion arrangement 118 cooperates, in one embodiment with the lock-out arrangement described in Section K below. In the embodiment shown, the protrusion arrangement 118 includes at least first and second protrusions 121, 122 extending from the aperture wall 66 and into the first open aperture 50. By reviewing FIGS. 6 and 7, it can be seen how in the preferred embodiment, the first protrusion 121 is spaced from the second protrusion 122 in a vertical direction along the aperture wall 66. That is, in the embodiment shown, the first protrusion 121 is vertically lower than the second protrusion 122. By reviewing FIGS. 6 and 7, it can further be appreciated that the first protrusion 121 is circumferentially-spaced from the second protrusion 122 along the aperture wall 66. In preferred embodiments, the vertical distance between first and second protrusions is between 2-30% of the distance of the inner diameter of the first open aperture 50.

In preferred embodiments, the first protrusion 121 extends into the first open aperture 50 no greater than 40% of the inner diameter of the first open aperture 50. Similarly, the second protrusion 122 extends into the first open aperture 50 no greater than 40% of the inner diameter of the first open aperture 50. In the preferred embodiment illustrated, the first and second protrusions 121, 122 extend a same amount into the first open aperture 50. In other embodiments, one of the first and second protrusions 121, 122 can be longer than the other.

Attention is directed to FIG. 5. In FIG. 5, there is a top plan view of the filter cartridge 38. In the embodiment shown, the protrusion arrangement 118 further includes at least a third protrusion 123 extending from the aperture wall 66 and into the first open aperture 50. The third protrusion 123 is circumferentially-spaced from the first protrusion 121 and the second protrusion 122. The third protrusion 123 is vertically spaced from only one of either the first protrusion 121 or the second protrusion 122; in other words, the third protrusion 123 is evenly spaced at the same vertical distance along the aperture wall 66 with only one of either the first protrusion 121 or the second protrusion 122.

In FIG. 5, it can be seen that the protrusion arrangement 118, in the embodiment shown, further includes at least a fourth protrusion 124. The fourth protrusion 124 is shown extending from the aperture wall 66 and into the first open aperture 50. The fourth protrusion 124 is circumferentially-spaced from the first protrusion 121, the second protrusion 122, and the third protrusion 123. The fourth protrusion 124 is vertically-spaced from only two of the first protrusion 121, the second protrusion 122, or the third protrusion 123. In other words, the fourth protrusion 124 is vertically even with only two of the first protrusion 121, the second protrusion 122, and the third protrusion 123.

In the particular embodiment illustrated, the third protrusion 123 is vertically-spaced from the second protrusion 122 and the fourth protrusion 124, while it is vertically even with the first protrusion 121. Also, in the specific illustrated embodiment, the fourth protrusion 124 is vertically even with the second protrusion 122, while being vertically spaced from the first protrusion 121 and the third protrusion 123.

While the embodiment of FIG. 5 identifies the first protrusion at 121, it could also be located at the physical location of the third protrusion 123. Likewise, while the second protrusion is shown in FIG. 5 at reference numeral 122, it could also be at the location shown at fourth protrusion 124. In other words, in one contemplated embodiment, the protrusion arrangement 118 can include only a protrusion located at 121 and a protrusion located at 122. Another variation includes the protrusion arrangement 118 as including a protrusion only at 121 and only at 124. Another variation of the protrusion arrangement 118 includes a protrusion only at 123 and 122. Another variation includes the protrusion arrangement 118 as including a protrusion only at 123 and only at 124. The particular embodiment illustrated has the protrusion arrangement 118 as including four protrusions at 121, 122, 123, and 124. Additional protrusions can be utilized to help cooperate with the other features of the assembly 34, but in the embodiment of FIG. 5, there are only four protrusions depicted.

In the embodiment shown, for the protrusion arrangement 118, two of the first protrusion 121, second protrusion 122, third protrusion 123, and fourth protrusion 124 are circumferentially-spaced within 45 degrees of each other (for example, 10-20 degrees), and a remaining two of the first protrusion 121, second protrusion 122, third protrusion 123, and fourth protrusion 124 are located within 45 degrees of each other (for example, 10-20 degrees). In the embodiment illustrated in FIG. 5, the first protrusion 121 and second protrusion 122 are circumferentially-spaced within 45 degrees of each other, while the third protrusion 123 and fourth protrusion 124 are circumferentially-spaced within 45 degrees of each other. In general, in preferred embodiments, the first protrusion 121 and the second protrusion 122 are circumferentially-spaced within 50 degrees of each other.

In some arrangements, one of the protrusions will be located greater than 45 degrees relative to the other protrusion. For example, consider an embodiment in which the protrusion arrangement 118 includes a first protrusion at 121, and the second protrusion is located where the fourth protrusion 124 is located—in such an embodiment, the protrusions are located greater than 45 degrees relative to each other. In such a case, it could be said that the first protrusion 121 and the second protrusion located at reference numeral 124 are circumferentially-spaced greater than 45 degrees of each other. An analogous embodiment would include a first protrusion at reference numeral 123 and a second protrusion at reference numeral 122.

C. The Filter Head 32 and Adaptor 64

In FIGS. 1, 11, and 39, a schematic depiction of filter head 32 is shown. The filter head 32 in the embodiment shown has an inlet conduit 128 (FIG. 1) and an outlet conduit 130. As mentioned above, in the particular example shown in FIG. 1, the filter head 32 shows connections with three filter assemblies, two of which are full-flow filter assemblies 34, and one of which is a bypass filter assembly 35. Of course, this is just an example, and other arrangements can include only a single filter assembly 34 connected to a filter head 32. The filter head 32 is connected to other equipment, such that liquid to be filtered flows into the filter head 32 through the inlet conduit 128 and then exits the filter head 32 by flowing through the outlet conduit 130. In some example arrangements, the filter head 32 is constructed of a cast metal part.

The filter head 32 includes mating structure 132 for selective engagement with the filter bowl 36. In the embodiment shown, the mating structure 118 includes threads 134. The threads 134 are illustrated as being along an outer radial surface of the filter head 32. Of course, the threads 134 can also be located on an inner radial surface of the filter head 32. In addition, other ways of connecting the bowl 36 to the filter head 32 are contemplated, as conventionally known in the art.

In FIG. 11, it can be seen that the adaptor 64 is connected to the outlet conduit 130, in this example, by way of threads 136. In this manner, the adaptor 64 can be selectively secured to the filter head 32 through engagement through the threads 136. Other ways can also be used to attach the adaptor 64 to the filter head 32, including, for example, press-fit, adhesive, welding, or making the adaptor 64 integral to the head 32.

In the embodiment shown, the adaptor 64 includes a funnel 138 circumscribing a central, open aperture 140. Extending from the funnel 138 is a cylindrical wall 142. The wall 142 becomes positioned between the first neck 52 and the second projection 96 of the first endcap 91. The wall 142 defines an inner radial surface 144, which provides a surface against which seal 62 (FIG. 11) is formed between the filter cartridge 38 and the adaptor 64.

Extending from an inner wall of the funnel surface 138 is a plurality of ribs 146. The ribs 146, in this embodiment, cooperate with the lock-out mechanism (Section K, below) in that they interfere with a portion of the filter bowl 36 when the cartridge 38 is not operably oriented within the filter bowl 36, and the engagement between the ribs 146 and the structure within the filter bowl 36 prevents the filter head 32 from threadably engaging the filter bowl 36. See FIG. 39 for an example of when the ribs 146 engage end rims 311, 354 of an inner assembly 364, as described more fully below in Section K of this disclosure.

From reviewing FIG. 11, it can also be seen how the filter head 32 forms a seal 148 with the bowl 36, when the seal 136 is operably-mounted on the filter head 132.

D. Filter Bowl 36

Figure 8:
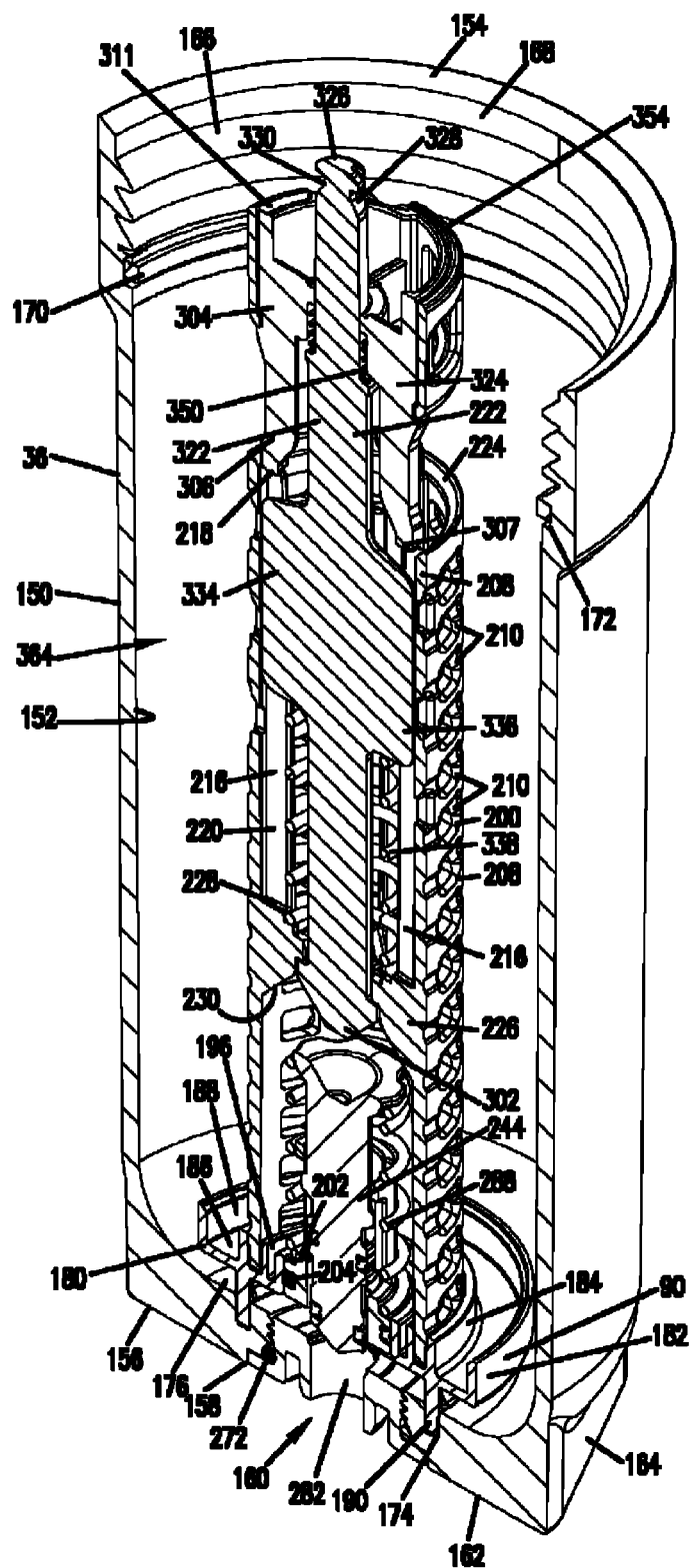
FIG. 8 is a perspective, cross-sectional view of only the filter bowl and inner assembly, with the filter cartridge being removed therefrom.

Attention is directed to FIG. 8, in which a perspective, cross-sectional view of the filter bowl 36 is illustrated. In the embodiment shown, the filter bowl 36 includes a surrounding wall 150 defining an open interior volume 152 for receiving and holding filter cartridge 38 therein.

The bowl 36 has, at one end, an open mouth 154 for allowing the filter cartridge 38 to be selectively inserted and removed from the bowl 36. At an end opposite of the open mouth 154 is a closed end 156 defining an opening 158. In preferred embodiments, the opening 158 cooperates to form part of a drainage aperture arrangement 160.

The closed end 156 in the embodiment shown generally has a flat base 162 to allow the bowl 36 to be stood on a horizontal surface, such as a shop bench, without tipping. In this embodiment, the end 156 further includes flat side surfaces 164 (FIG. 1) to be used in conjunction with a tool, such as a wrench.

Adjacent to the mouth 154 is mating structure 156, illustrated herein as threads 168. The threads 168 are selectively engageable with the threads 134 of the filter head 132 to allow for attachment and removal of the bowl 36 with the filter head 32. Of course, the threads 168 could also be on an exterior wall with threads 134 on the head 132 on an interior wall. Also viewable in FIG. 8 is a seal member 170 held on an inner radial surface of the surrounding wall 150 within a groove 172. The seal member 170 forms seal 148 (FIG. 11) with the filter head 32.

The closed end 156 of the bowl 36, in the embodiment shown, includes a disk-holding groove 174. The disk-holding groove 174 is defined by a floor 176 on an inner surface of the wall 150 at the closed end 156. The disk-holding groove 174 supports the disk 90 extending axially from the floor 176 of the inside surface of the wall 150 of the bowl 36.

In the embodiment shown in FIG. 8, the disk 90 includes a cartridge-receiving tray 180 constructed and arranged to receive at least a portion of the filter cartridge 38. In preferred embodiments, the cartridge receiving tray 180 receives the second axially-extending neck 82 of the filter cartridge 38 and forms seal 88 (FIG. 12) therewith. In FIG. 8, the cartridge receiving tray 180 includes an outer ring 182, an inner ring 184, and a base 186 therebetween. In the embodiment shown in FIG. 12, the seal 88 is formed between and against neck 82 and an inner radial surface 188 of the outer ring 182.

Figure 12:
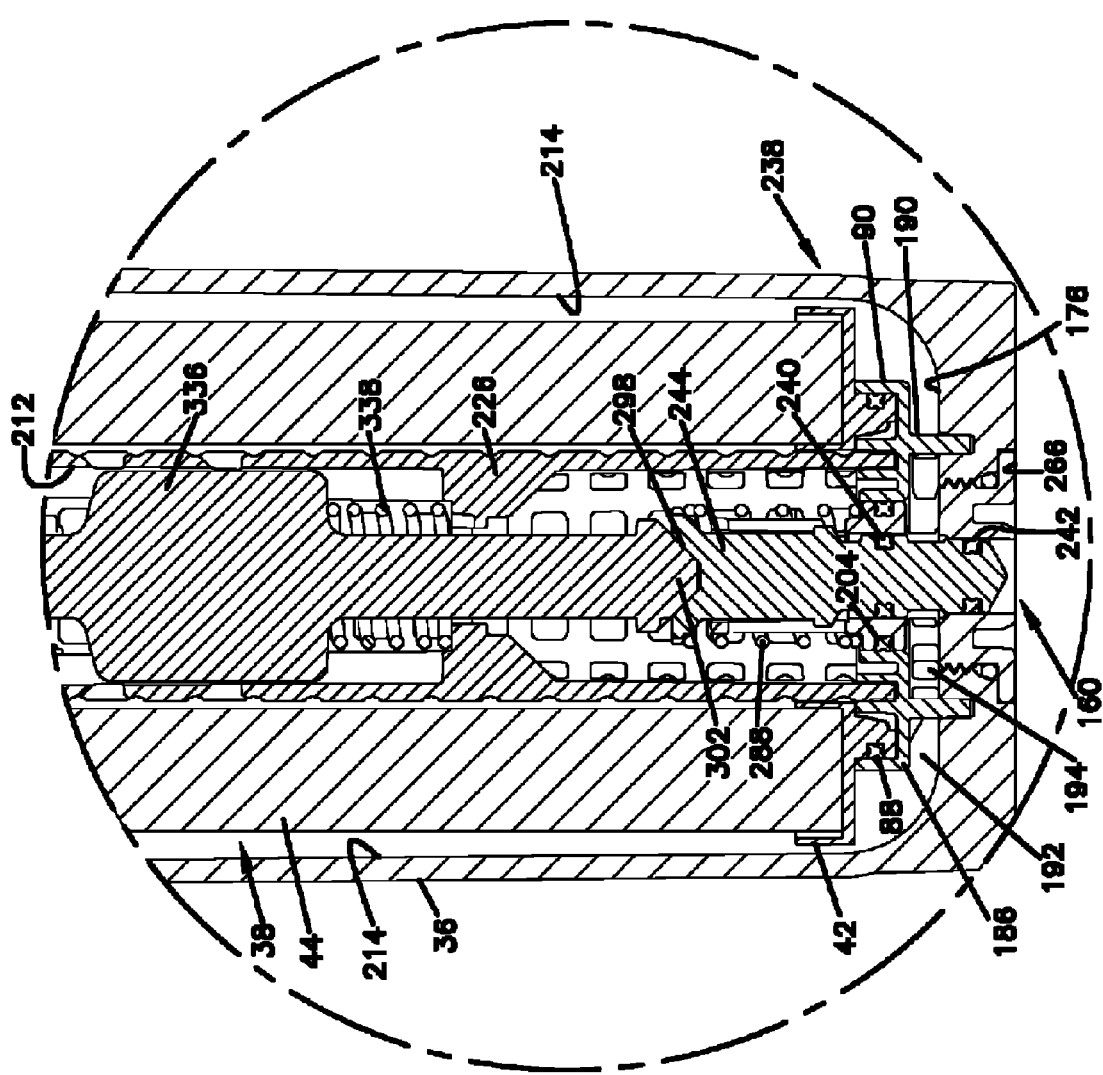
FIG. 12 is an enlarged, cross-sectional view of the drain valve feature depicted in FIG. 11.

Extending axially below the cartridge-receiving tray 180 is a base ring 190, which is held by and fixed within the disk-holding groove 174. As can be seen in FIGS. 8 and 12, the base ring 190 holds a remaining portion of the disk 90 from the floor 176 to allow for a flow of liquid in the volume 192 (FIG. 12) between the base 186 and the floor 176. The base ring 190 includes through-holes 194 (FIG. 12) to allow for the flow of fluid to flow from volume 192 through the base ring 190, and in a direction toward the drainage aperture arrangement 160.

In the embodiment shown in FIG. 8, the disk 90 further includes a second inner ring 196. The second inner ring 196 is spaced radially inwardly of the inner ring 184. The space located between the inner ring 184 and the second inner ring 196 accommodates a porous inner filter support 200, described further below. In the embodiment shown, the disk 90 further includes a third inner ring 202 located radially inwardly of the second inner ring 196. The third inner ring 202 has an inner radial surface that provides a seal surface for forming a seal 204 between a drain valve housing 206 (FIGS. 13 and 15) and the disk 90.

E. Porous Inner Filter Support 200

One embodiment of a porous inner filter support 200 is illustrated in various FIGS. including, for example, FIGS. 3, 4, 8, 9, 11, and 18. Portions of the filter support 200 can be seen in several of the other figures. The porous inner filter support 200 is oriented within the open filter interior 46 (FIG. 6) of the filter cartridge 38. Further, in the embodiment shown, the porous inner filter support 200 is oriented within the open interior volume 152 of the bowl 36. In the specific embodiment illustrated, the inner filter support 200 is secured to the filter bowl 36 by being secured to the disk 90 between inner ring 184 and second inner ring 196. In other embodiments, the support 200 can be secured directly to the bowl 36 at, for example, the floor 176 of the bowl 36. Filter support 200 can be permanently secured to the disk 90 through a variety of techniques including adhesive, press-fit, staking, welding; or, the support 200 and the bowl 36 can be the same integral piece. In another embodiment, the disk 90 and the filter support 200 can be the same integral piece.

In the embodiment illustrated, the inner filter support 200 includes a porous wall 208. The porous wall 208 defines a plurality of flow passages 210 (FIGS. 8, 9 and 18) therethrough. In use, the filter support 200 functions to help support the filter media 44 by lining the open filter interior 46 of the media 44, and the flow passages 210 allow for the filtered liquid to flow into a filtered liquid volume 212 (FIGS. 3 and 4) with in the porous wall 208.

In preferred embodiments, the porous wall 208 of the filter support 200 includes a plurality of guide rails 216 projecting radially inwardly in a direction toward an inside volume of the filter support 200. In the cross section of FIGS. 8 and 9, a cross-section of the guide rails 216 is depicted, so that only half of the guide rail 216 is viewable. In FIGS. 19-22, the upper ends of the guide rails 216 can be seen. In FIGS. 19-22, the upper ends of the guide rails 216 function as projections 218 extending from a remaining portion of the porous wall 208; the projections 218 cooperate with the lock-out mechanism, explained below. Between the guide rails 216, a slide channel 220 (FIG. 8) is formed, which helps to slidably hold a portion (e.g., fins 336) of a core piece 222, described further below. As can be seen in FIG. 8, the guide rails 216 extend at least a partial length along the wall 208 of the filter support 200. In FIG. 8, the guide rails 216 are shown extending from a free end 224 of the filter support 200 about half way down the full length of the filter support 200.

In the embodiment shown, the porous inner filter support 200 further includes an inwardly extending shoulder or support 226. The inwardly extending support 226 extends radially inwardly from the wall 208 and includes an upper surface 228 and a lower surface 230. The support 226 defines a throat or opening 232, as it extends circumferentially along and within the wall 208 of the filter support 200. The opening 232 within the inwardly extending support 226 allows for a portion of the core piece 222 to slide therewithin and also cooperates with a portion (e.g., the head 302) of the core piece 222 to help hold the core piece 222 in place. It also helps to cooperate with the auto-drain mechanism, which is described in Section L below.

F. Drain Valve Assembly

The filter system 30 depicted also has a drain-valve assembly 236 (FIG. 13) to allow liquid in the complete assembly to automatically be drained during the servicing of the system 30. The drain-valve assembly 236 can be implemented independently of other features in the example embodiment. For example, the drain valve assembly 236 can be implemented independently of the lock-out mechanism and cartridge retention mechanism 100.

Figure 13:
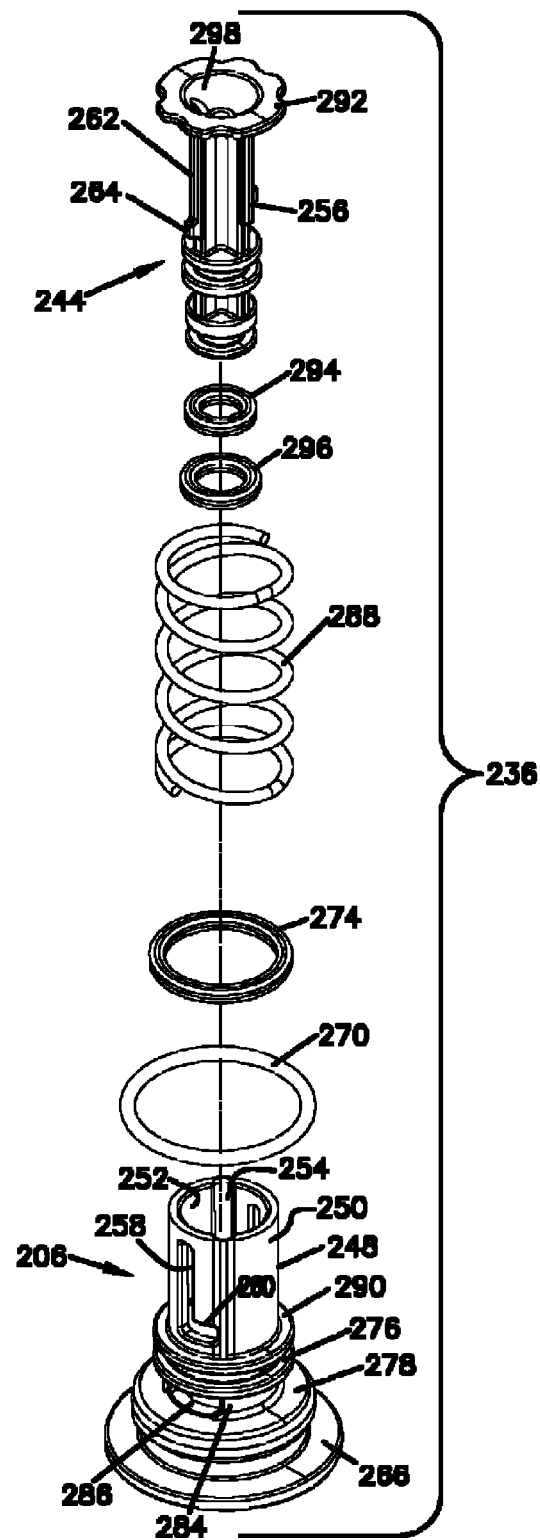
FIG. 13 is an exploded, perspective view of a drain valve assembly utilized in the filter assembly of FIGS. 1-12.

Attention is directed to FIGS. 12 and 13. In FIGS. 12 and 13, the filter cartridge 38 is operably positioned in the filter bowl 36, and the bowl 36 is fully-threaded on the filter head 32. In this condition, the drain-valve assembly 236 is in a sealed position 238. In the sealed position 238, there is in place a first plug seal 240 and a second plug seal 242.

Figure 9:
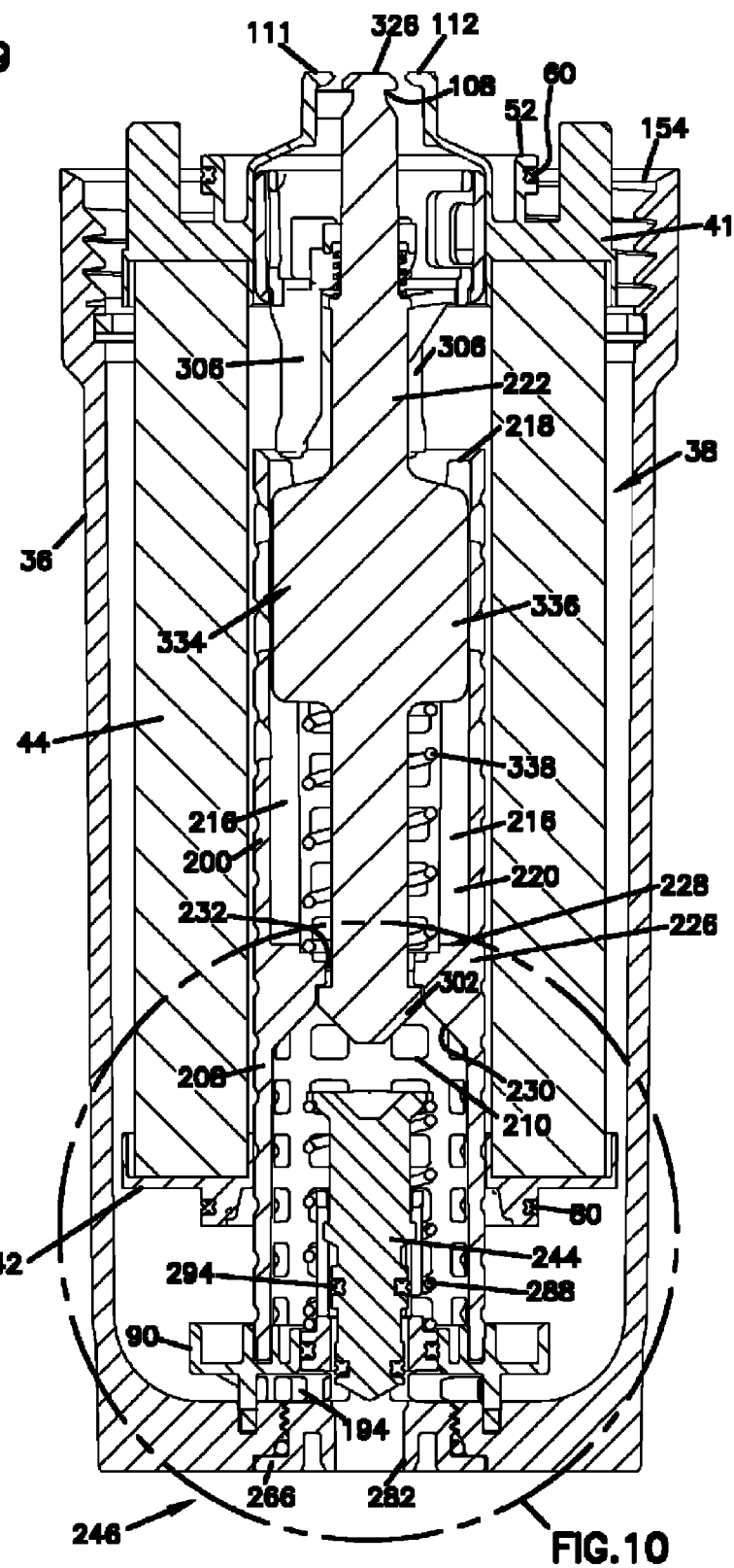
FIG. 9 is a cross-sectional view of the filter assembly similar to FIG. 4 and highlighting a drain valve feature.
Figure 10:
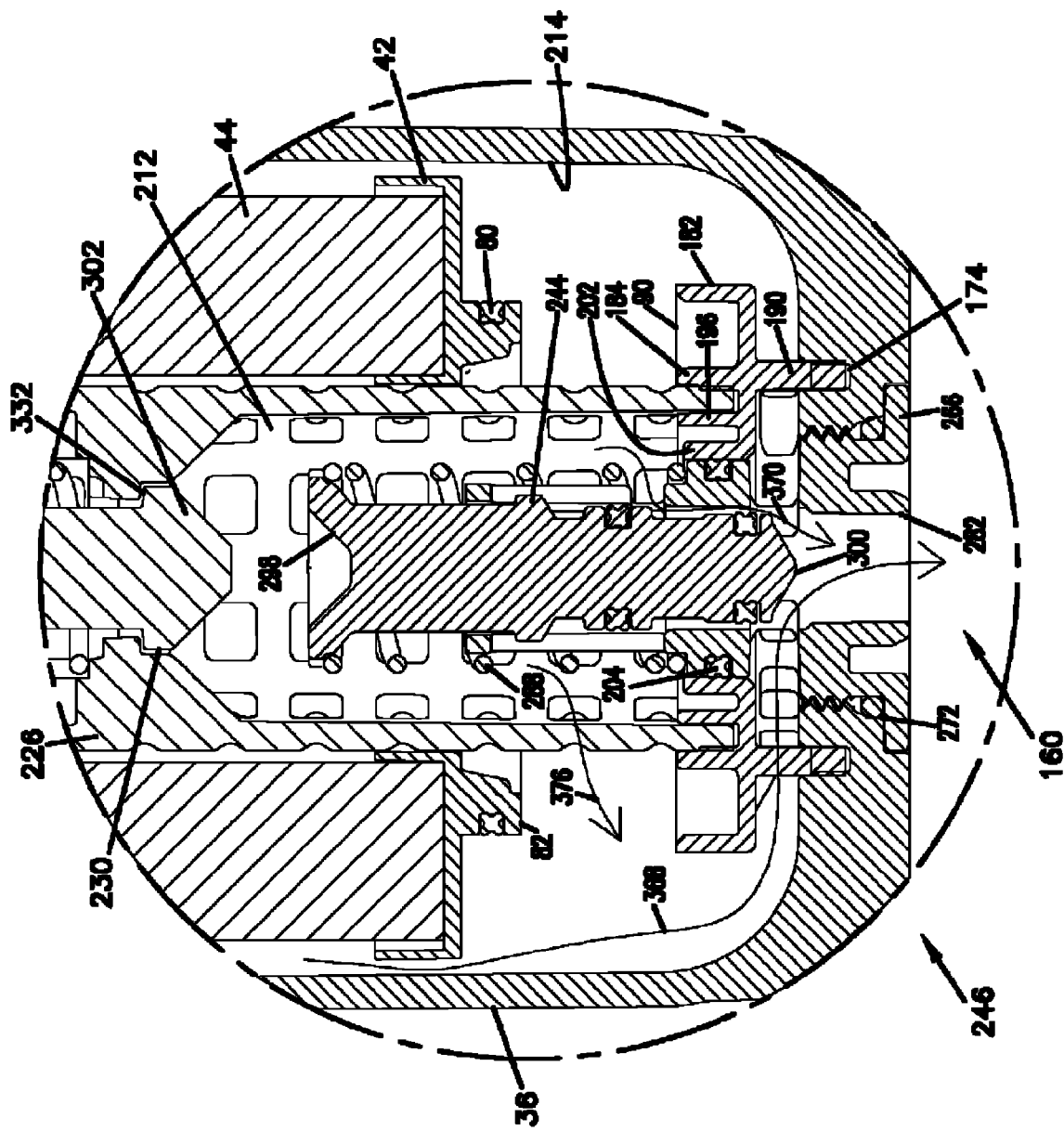
FIG. 10 is an enlarged cross-sectional view of the region of the drain valve feature of FIG. 9.

The drain-valve assembly 236 includes a plug 244. The plug 244 is movably oriented between the sealed position 238 (FIGS. 11 and 12) and a drainage position 246 (FIGS. 9 and 10, for example). The sealed position 238 includes the plug 244 blocking fluid flow between the interior volume 152 of the bowl 36 and the drainage aperture arrangement 160. The drainage position 246 includes the plug 244 being oriented relative to the bowl 36 to permit flow from the interior volume 152 of the bowl 36 through the drainage aperture arrangement 160.

Figure 14:
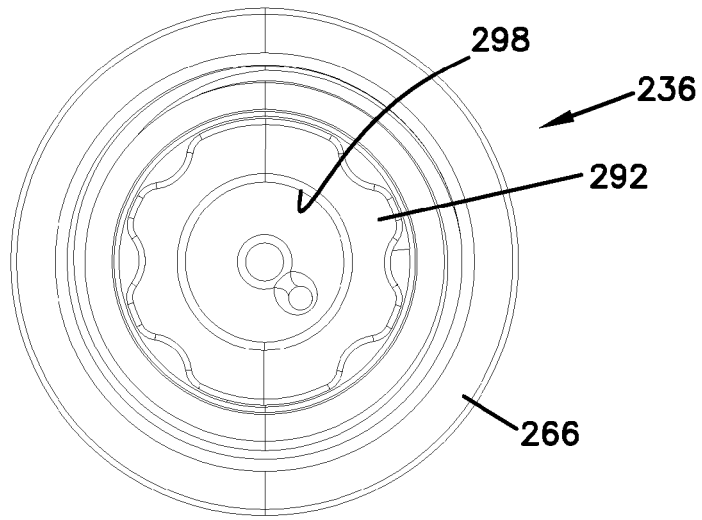
FIG. 14 is a top plan view of the drain valve assembly of FIG. 13, when assembled together.
Figure 15:
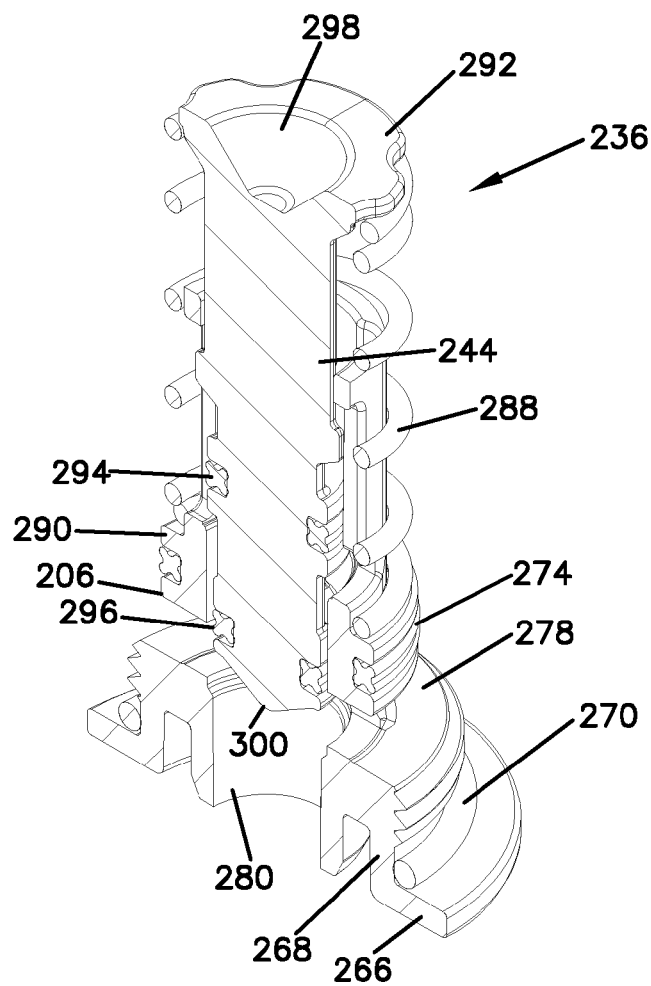
FIG. 15 is a perspective, cross-sectional view of the assembled drain valve assembly of FIGS. 13 and 14.
Figure 16:
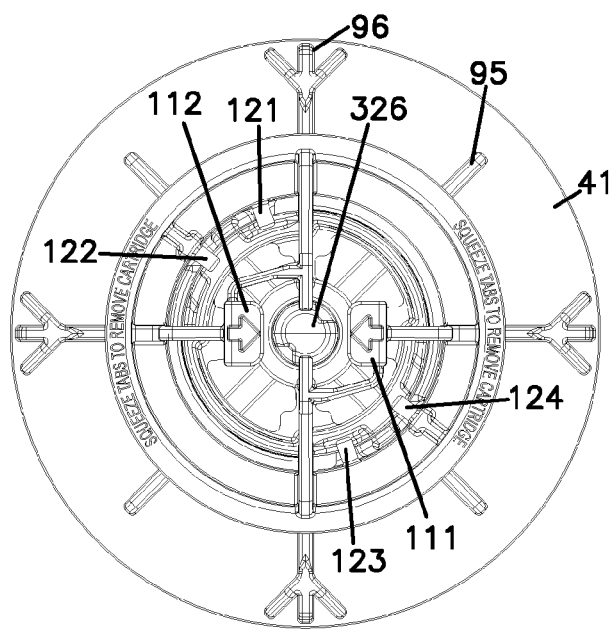
FIG. 16 is a top plan view of an endcap of the filter cartridge as it is ready to engage a core piece and filter support, remaining portions of the filter cartridge being omitted for purposes of explanation.
Figure 17:
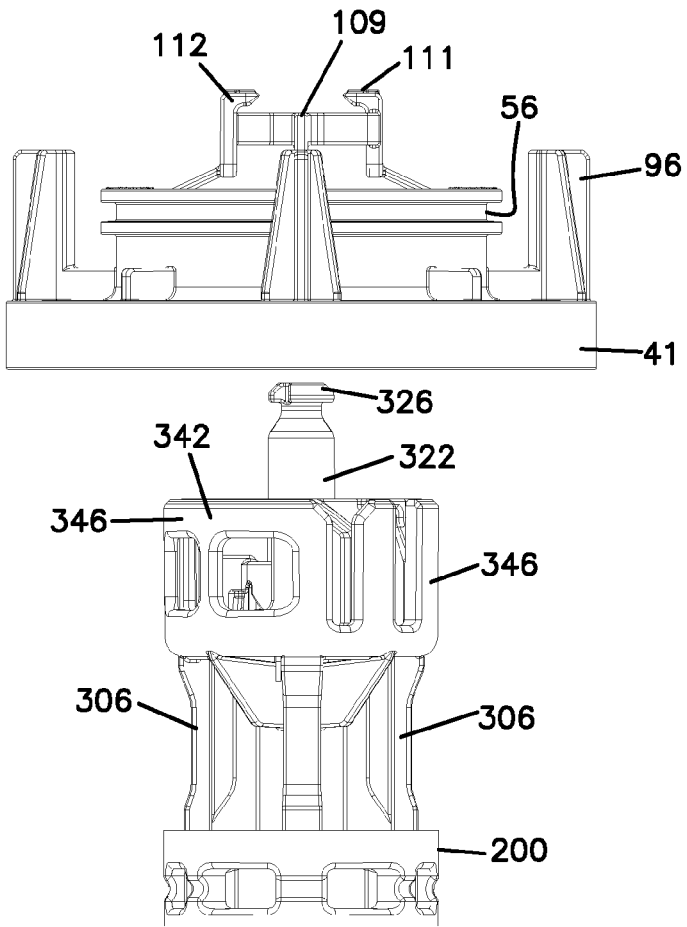
FIG. 17 is a side elevational view of the view of FIG. 16, showing the endcap, core piece, and a portion of the filter support.
Figure 18:
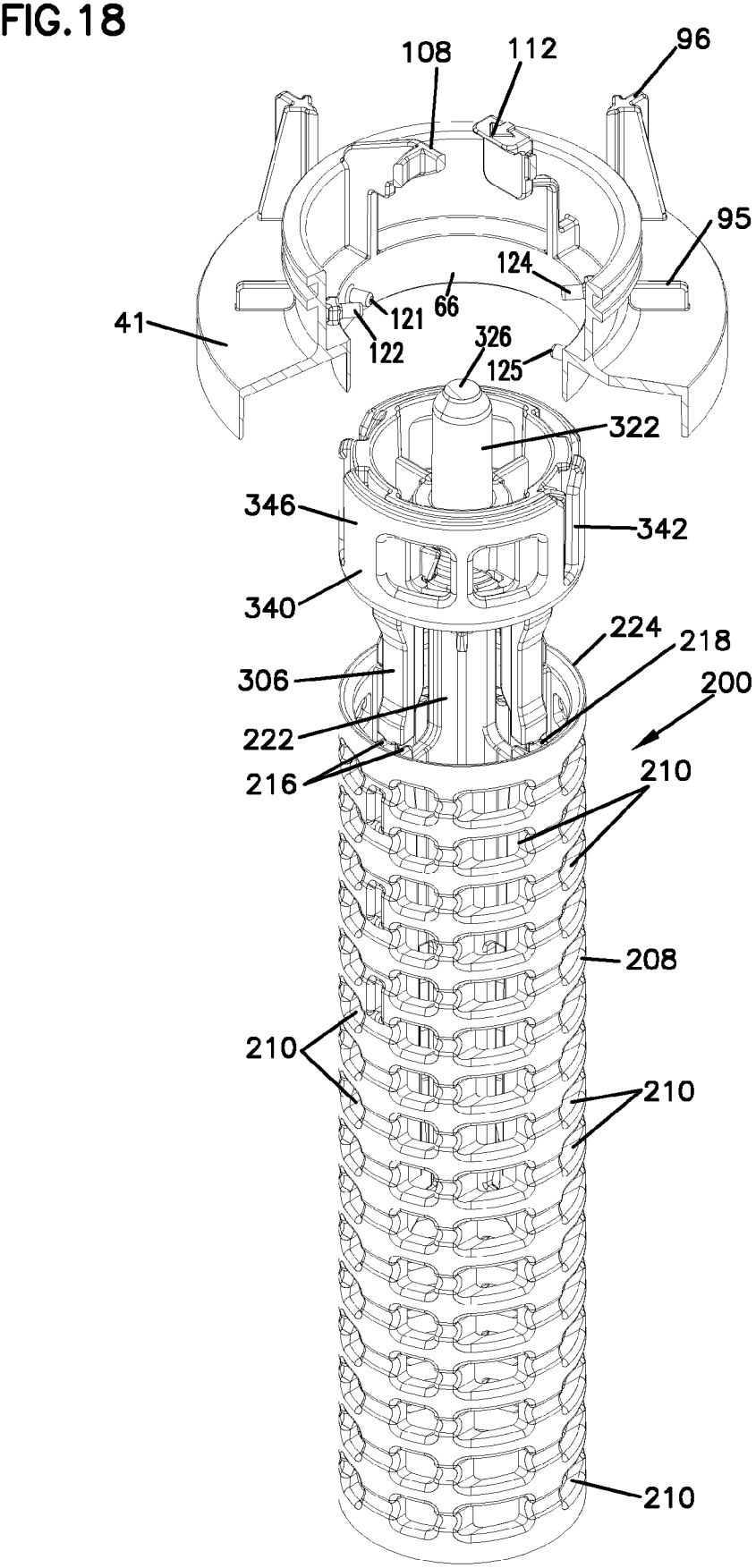
FIG. 18 is a perspective view of FIG. 17 and showing the full extension of the filter support, while having a portion of the endcap broken away.

FIGS. 13-15 show one example embodiment of drain valve assembly 236. FIG. 13 shows an exploded, perspective view of the drain-valve assembly 236, while FIG. 14 is a top plan view of the assembly 236 after it has been assembled. FIG. 15 is a cross-sectional perspective view of the drain valve assembly 236, after it has been assembled.

While a variety of embodiments can be used, in the embodiment pictured in FIGS. 13-15, the drain valve assembly 236 includes a valve housing 248. The valve housing 248 includes a generally tubular wall 250 defining an opening 252. The opening 252 receives the plug 244, such that the plug 244 is axially moveable therewithin. The wall 250 defines a pair of grooves 254 extending longitudinally, and constructed and arranged to receive corresponding ribs 256 on the plug 244. The wall 250 further includes an elongated slot 258 including a transverse portion 260. The elongated slot 258 receives ribs 262 emanating from the plug 244. The ribs 262 have hooks or extensions 264 that help to keep the plug 244 from popping out of the valve housing 248 through opening 252.

Still in reference to FIGS. 13-15, the valve housing 248 depicted further includes a base 266. The base 266 is held within the opening 158 (FIG. 8) of the bowl 36, and when properly oriented therein forms a part of the flat base 162 of the bowl 36. Extending vertically from the base 266 is a wall 268 (FIG. 15). The wall 268, in the embodiment shown, is threaded such that it can be removably mounted within the opening 158 of the bowl 36. Along the wall 268 is a valve seal member 270. The seal member 270 forms a second valve seal 272 (FIG. 8) with the bowl 36. The second valve seal 272 prevents fluid from flowing from the bowl 36 through the opening 158.

The first valve seal 204 was described above. The first valve seal 204 is formed by seal member 274 which is held within a groove 276 of the valve housing 248. The seal member 274 forms first valve seal 204 (FIG. 8) with the disk 90 connected to the bowl 36 to prevent unfiltered fluid from bypassing the filter media 44 and flowing into the open filter 46.

Still in reference to FIG. 15, in the valve housing 248 depicted, extending from the wall 268 is an upper base 278. The upper base 278, in the embodiment shown, is generally parallel to the base 266, but is radially spaced and vertically spaced therefrom. Extending downwardly from the upper base 278 is an inner wall 280. The inner wall 280 forms the drain port 282 (FIG. 8) of the drainage aperture arrangement 160.

Extending upwardly from the upper base 278 is a slotted wall 284 (FIG. 13). The slotted wall 284 has apertures 286 to allow liquid to flow through the wall 284.

Still in reference to FIGS. 13-15, a spring 288 is operably oriented around the valve housing wall 250 and pushes against a portion of the plug 244. Specifically, the spring 288 is located between an outwardly extending rib 290 extending outwardly from the wall 250 of the valve housing 248. The spring 288 engages rib 290 and against flange 292 of the plug 244. The spring 288 biases the plug 244 to be in the position in FIG. 15, which corresponds to drainage position 246. The plug 244 is moveable within the opening 252 of the valve housing 248 in a direction toward the sealed position 238 by compression of the spring 288.

The drain valve assembly 236 further includes a first plug seal member 294 secured to the plug 244 to form first plug seal 240 (FIG. 12). The first plug seal 240 prevents unfiltered fluid from bypassing the filter media 44 and then flowing into the open filter interior 246, when the plug 244 is in the sealed position 238 (FIG. 12). The drain valve assembly 236 further includes a second plug seal member 296 secured to the plug 244 to form the second plug seal 242 (FIG. 12) with the inner wall 280 of the valve housing 248. The second plug seal 242 prevents liquid from flowing from the bowl 36 through the drain port 282 of the drainage aperture arrangement 160.

Still in reference to FIGS. 13-15, in the embodiment shown, the plug 244 includes a receiver 298, which is circumscribed by the flange 292. The receiver 298 is at an end of the plug 244 that is opposite from a sealing end 300 (FIG. 15) of the plug 244. The receiver 298 is generally bowl-shaped and is constructed and arranged to engage and receive a portion (head 302) of the core piece 222, described further below.

Details of the core piece 222 are described further below. One portion of the core piece 222 includes a core piece head 302 (FIGS. 8, 11, and 12). The head 302 engages the plug 244 when the drain valve assembly 236 is in its sealed position 238. When the head 302 moves away from the plug 244, this allows the plug 244 to move axially within the interior of the filter support 200, with the spring 288, to allow the plug 244 to move to the drainage position 246.

Further details on operation of the auto drain valve assembly 236 are described further below in Section L.

G. Basket 304

Figure 24:
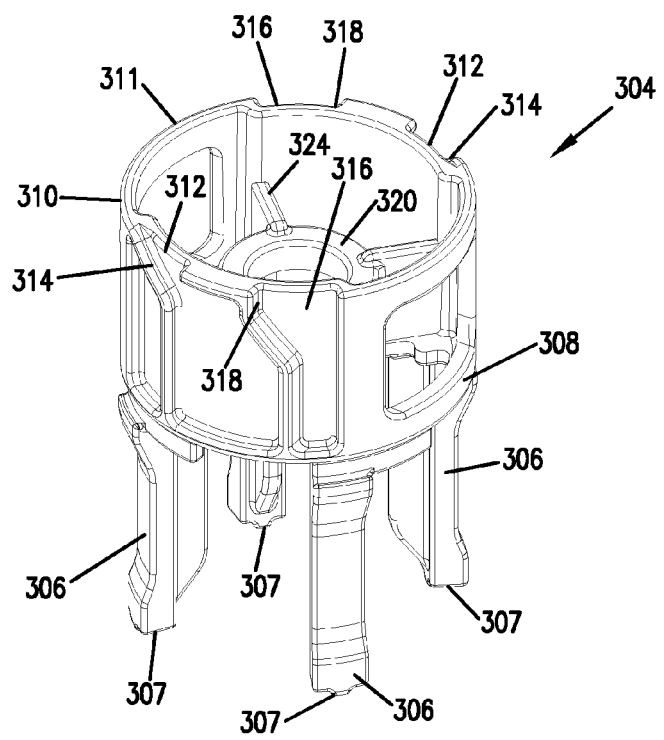
FIG. 24 is a perspective view of the basket.

Attention is directed to FIG. 24. A basket 304 is illustrated in perspective view. The basket 304 can be seen in various other views, and the FIG. 24 perspective view is an example implementation. The basket 304 is part of the lock-out mechanism, and its function will be more fully-described below in Section K.

In the embodiment illustrated, the basket 304 includes at least one cantilevered leg 306 extending from a basket base 308. The leg 306 extends axially in a direction toward the closed end 156 of the bowl 36. In preferred embodiments, the basket 34 includes a plurality of legs 306, and in the example embodiment shown, there are four legs 306, evenly and circumferentially spaced relative to each other.

Figure 19:
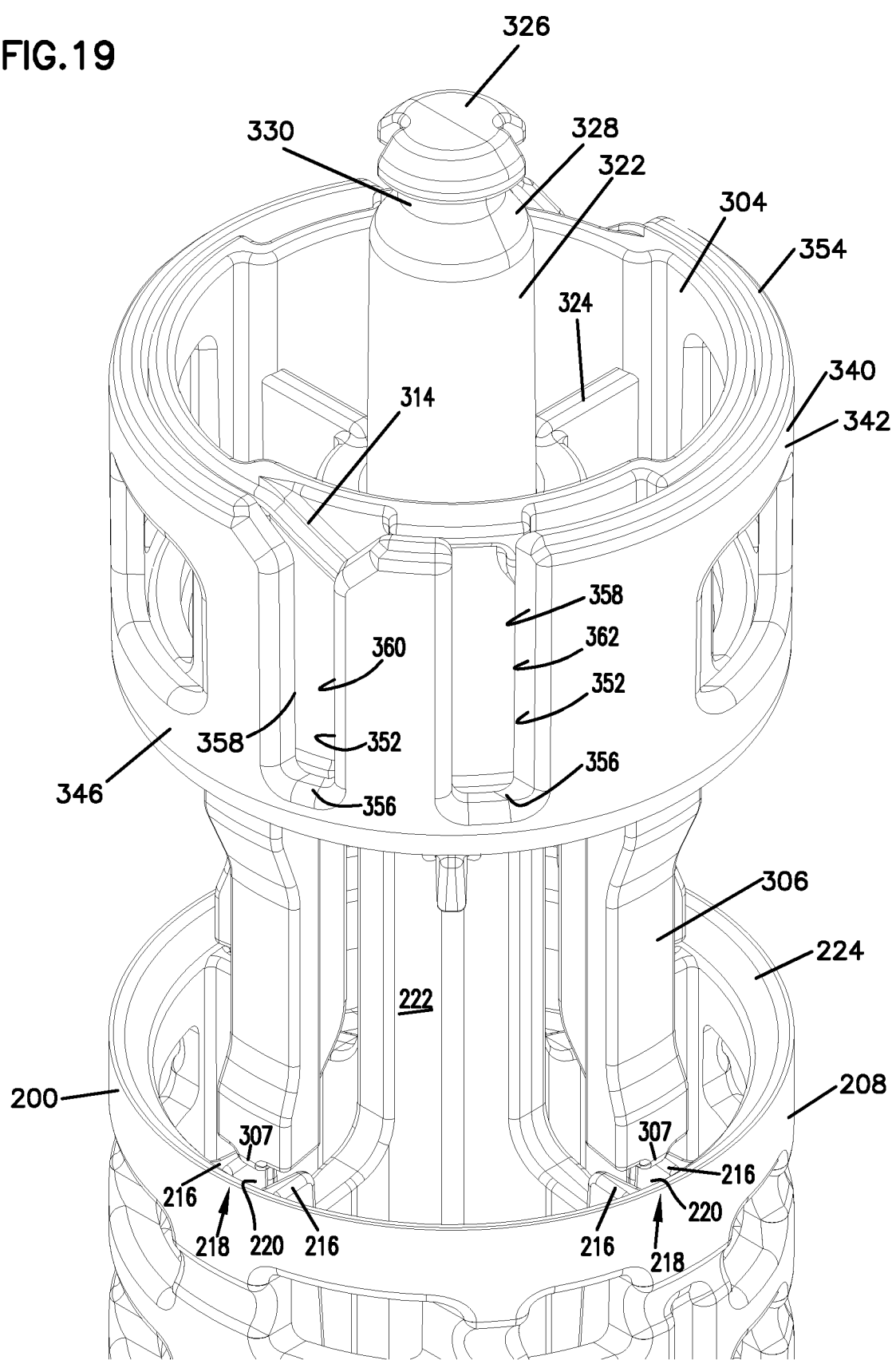
FIG. 19 is a perspective view showing the basket within a basket holder of the core piece and in a first locked position relative to the filter support.
Figure 21:
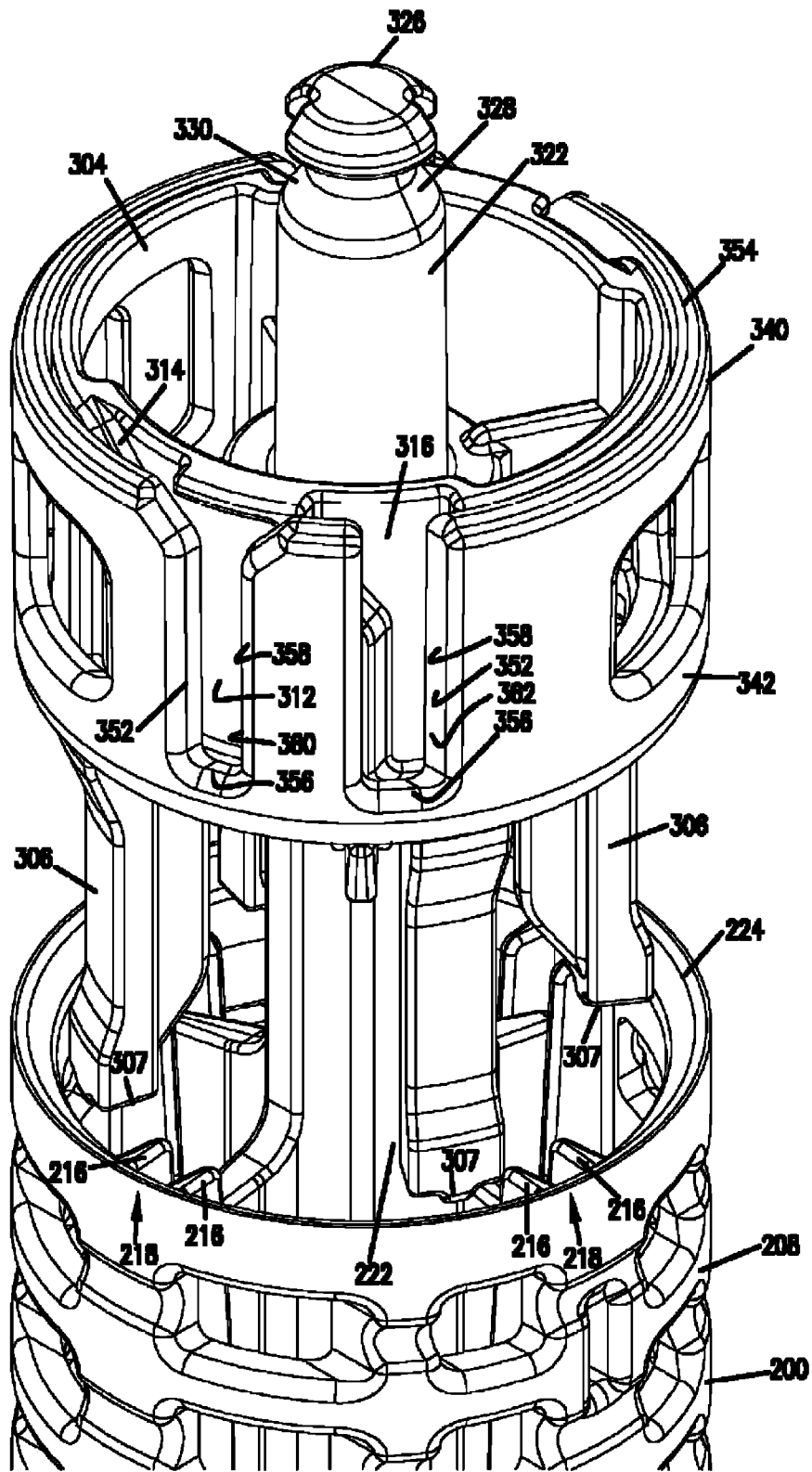
FIG. 21 is a perspective view analogous to FIGS. 19 and 20 but showing the basket in an unlocked position relative to the filter support.

The embodiment of the basket 304 depicted further includes a grooved wall 310. The groove wall 310 forms, generally, a cylinder and extends axially in a direction toward the open mouth 154 of the bowl 36. In general, the grooved wall 310 is constructed and arranged to engage a portion of the filter cartridge 38 such that the engagement with the filter cartridge 38 will rotate the basket 304 from a first locked position to an unlocked position. The first locked position is a position in which the at least one leg 306 axially abuts the projection 218 on the filter support 200 (FIG. 19). The unlocked position is a position in which the at least one leg 306 is free of the axial abutment with the projection 218 and permits the basket 304 to move in a direction toward the end 156 of the bowl 36 (FIG. 21).

Figure 20:
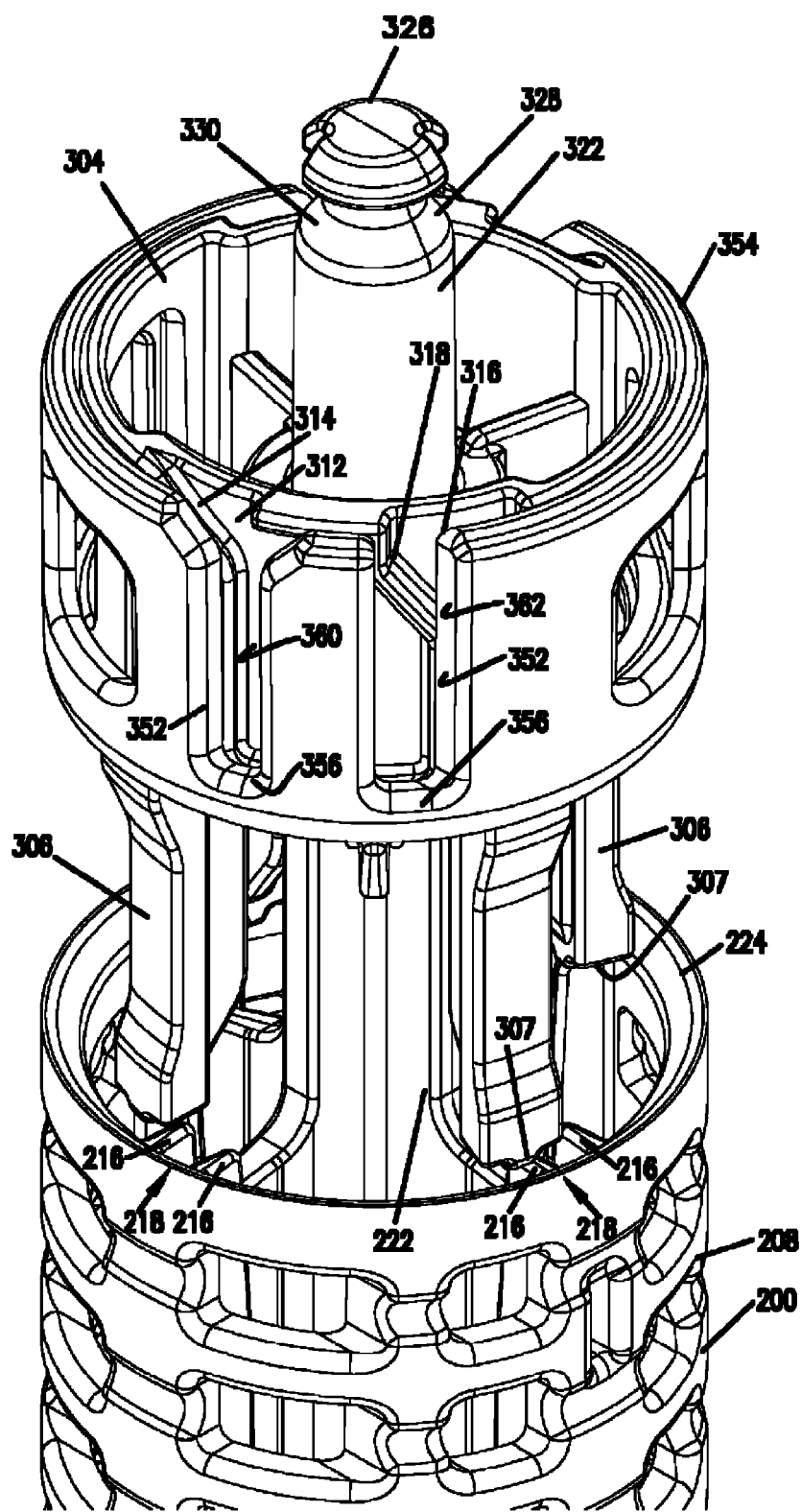
FIG. 20 is a perspective view analogous to FIG. 19, but showing the basket in a second locked position relative to the filter support.

In preferred embodiments, the basket 304 is rotationally moveable from the first locked position (FIG. 19) to a second locked position (FIG. 20). In the second locked position (FIG. 20), the at least one leg 306 is partially free of the abutment against the at least one projection 218 on the filter support 200, but there is still axial interference therebetween.

The grooved wall 310 has at least a first groove 312 with a first slide surface 314, and a second groove 316 with a second slide surface 318. In the preferred embodiment, the grooved wall 310 includes a pair of first grooves 312, each having a first slide surface 314, and a pair of second grooves 316, each having a second slide surface 318. As can be seen in FIG. 24, the pair of first grooves 312 are located about 180 degrees relative to each other while the pair of second grooves 316 are located about 180 degrees relative to each other.

The first slide surface 314 of the first groove 312 is constructed and arranged to engage the filter cartridge 38 and rotate the basket 304 from the first locked position to the second locked position. This rotation of the basket 304 also exposes the second slide surface 318 of the second groove 316 to engagement with the filter cartridge 38. An example can be seen by comparing FIGS. 19 and 20. In FIG. 19, the basket 304 is in the first locked position. The first slide surface 314 is exposed to engagement with the filter cartridge 38. In particular, and as explained further below in Section K, the first slide surface 314 engages the first protrusion 121 of the filter cartridge 38. The third protrusion 123 will engage the other first slide surface 314, in preferred embodiments. The first protrusion 121 engages the first slide surface 314, which rotates the basket 304 clockwise when viewed from above. The basket 304 is rotated to the second locked position, depicted in FIG. 20. The second locked position then exposes the second slide surface 318. The second slide surface 318, in preferred embodiments, has the second protrusion 122 engage against it, which causes the basket 304 to further rotate clockwise, when viewed above, to the unlocked position as shown in FIG. 21. In preferred embodiments, the fourth protrusion 124 will engage the other second slide surface 318.

In FIG. 24, in the embodiment shown, the basket 304 further includes a hollow column circumscribed by the grooved wall 310. In use, as explained further below, the column 320 receives a post 322, which is part of the core piece 222, explained in Section H below. The basket 304 further includes webs or flanges 324 extending between the column 320 and the grooved wall 310.

Further operation of the basket 304 is described below in connection with the lock-out mechanism, Section K.

H. Core Piece 222 and Spring

Several FIGS. show an embodiment of the core piece 222. The core piece 222 is operably-oriented within the interior of the wall 208 of the filter support 200, and within the filtered liquid volume 212.

As mentioned above, in the embodiment shown, the core piece 222 includes post 322. At one free end of the post 322, a button 326 is defined. Adjacent to the button 326 is a reduced dimension 328 in the form of a neck 330. The post 322 is received by the column 320 of the basket 304. The retention mechanism 100 engages the post 322 at the button 326. Specifically, the gripper arrangement 104 holds the post 322 at the button 326 by having fingers 108, 109 engage the neck 330 of the post 322. Further operational details of the retention arrangement 100 are discussed below in Section M.

As mentioned previously, the post 322 further includes, at an end opposite of the button 326, the head 302. In the embodiment shown, the head 302 is mushroom-shaped and constructed and arranged to engage the inwardly extending shoulder or support 226 of the filter support 200.

The head 302 of the core piece 222 is movably oriented between an engaged position and a released position. The engaged position includes the head 302 being oriented against the receiver 298 of the plug 244 to push the plug 244 into the sealed position 238. The released position includes the head 302 being spaced away from the receiver 298 of the plug 244 to allow the plug 244 to move to the drainage position 246. When the head 302 is in the released position, a radial flange 332 (FIG. 10) on the head 302 is engaged against lower surface 230 of the inwardly extending support 226. When the head 302 is in its engaged position (FIG. 12), the head 302 is engaged against the plug 244 and received within the receiver 298.

In the embodiment shown, the core piece 222 further includes a fin arrangement 334. The fin arrangement 334 includes a plurality of fins 336 projecting radially from a center longitudinal axis of the post 322. In preferred embodiments, the fins 336 slide within respective channels 220 defined by guide rails 216. The fins 336, in cooperation with the channels 220 within the guide rails 216, ensure that the core piece 222 will maintain operable orientation and sliding orientation within the porous inner filter support 200. A core piece spring 338 is operably oriented between the fin arrangement 334 and the upper surface 228 of the support 226 (FIG. 10). The spring 338 will exert a pushing force on the core piece 222 in a direction axially upwardly relative to the porous inner filter support 200 and in a direction toward the open mouth 154 of the bowl 36.

In reference now to FIGS. 17-22, the core piece 222 further includes a basket holder 340. The basket holder 340 supports the basket 304 and allows the basket 304 to move between its first locked position (FIG. 19), to its second locked position (FIG. 20), and to its unlocked position (FIG. 21). In the embodiment shown, the basket holder 340 includes an apertured frame 342. The apertured frame 342 defines leg-receiving apertures 344 (FIG. 22), such that the legs 306 of the basket 306 can penetrate the basket holder 340 by having legs 306 pass through the leg-receiving apertures 344. The basket holder frame 342 includes a slotted wall 346 circumscribing the post 322 and also includes spokes 348 (FIG. 22) joining the slotted wall 346 to the post 322. Adjacent spokes 348 define the leg-receiving apertures 344.

Figure 22:
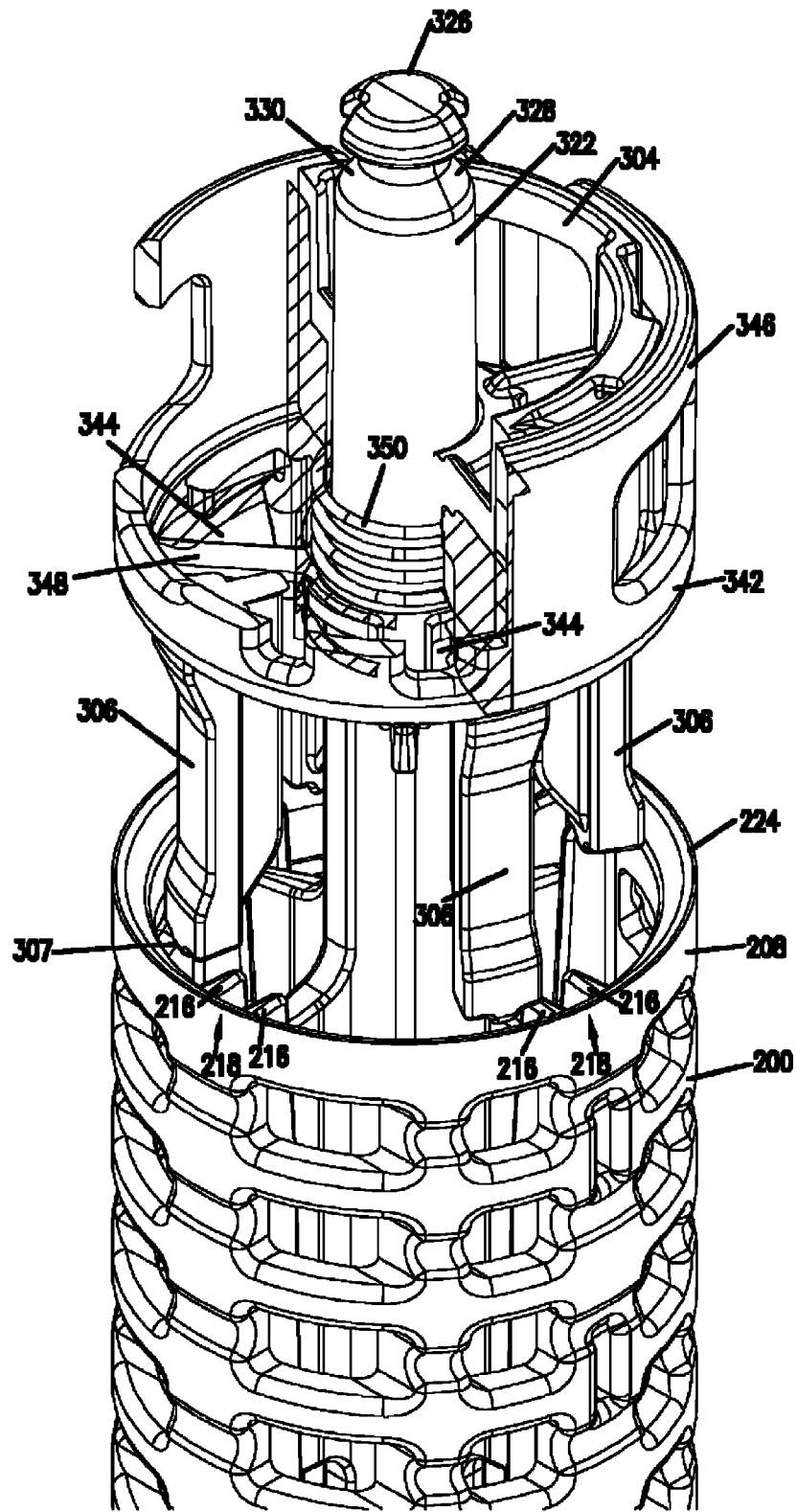
FIG. 22 is a the same perspective view as FIG. 21, but showing a portion of the basket and basket holder broken away in order to show other parts.

In reference to FIG. 22, the assembly includes a spring 350 oriented around the post 322 and operably oriented between the webs or flanges 324 of the basket 304 to bias the basket 304 rotationally within the basket holder 340 and into the locked position (FIG. 19).

The slotted wall 346 includes a plurality of slots 352. The slots 352 are open at one end and closed at an opposite end; that is, the slots 352 are open at the end rim 354 of the slotted wall 346 and have closed ends 356 adjacent to a bottom portion of the slotted wall 346. The slots 352 function as a slide channel 358 for cooperating structure on the filter cartridge 38.

In particular, the first slot 360 forms slide channel 358 for the first protrusion 121 or the third protrusion 123, after the first protrusion 121 or third protrusion 123 engages the first slide surface 314 of the basket 304, rotating the basket 304 from the first locked position. This rotation of the basket 304 then aligns the first slot 360 with the first groove 312 of the basket 304.

The second slot 362 will be put in alignment with the second groove 316, to allow either the second protrusion 122 or the fourth protrusion 124 slide therewithin slide channel 358 after the basket 304 has been rotated from the second locked position to the unlocked position (FIG. 21).

I. Bypass Filter Cartridge FIG. 32

Figure 32:
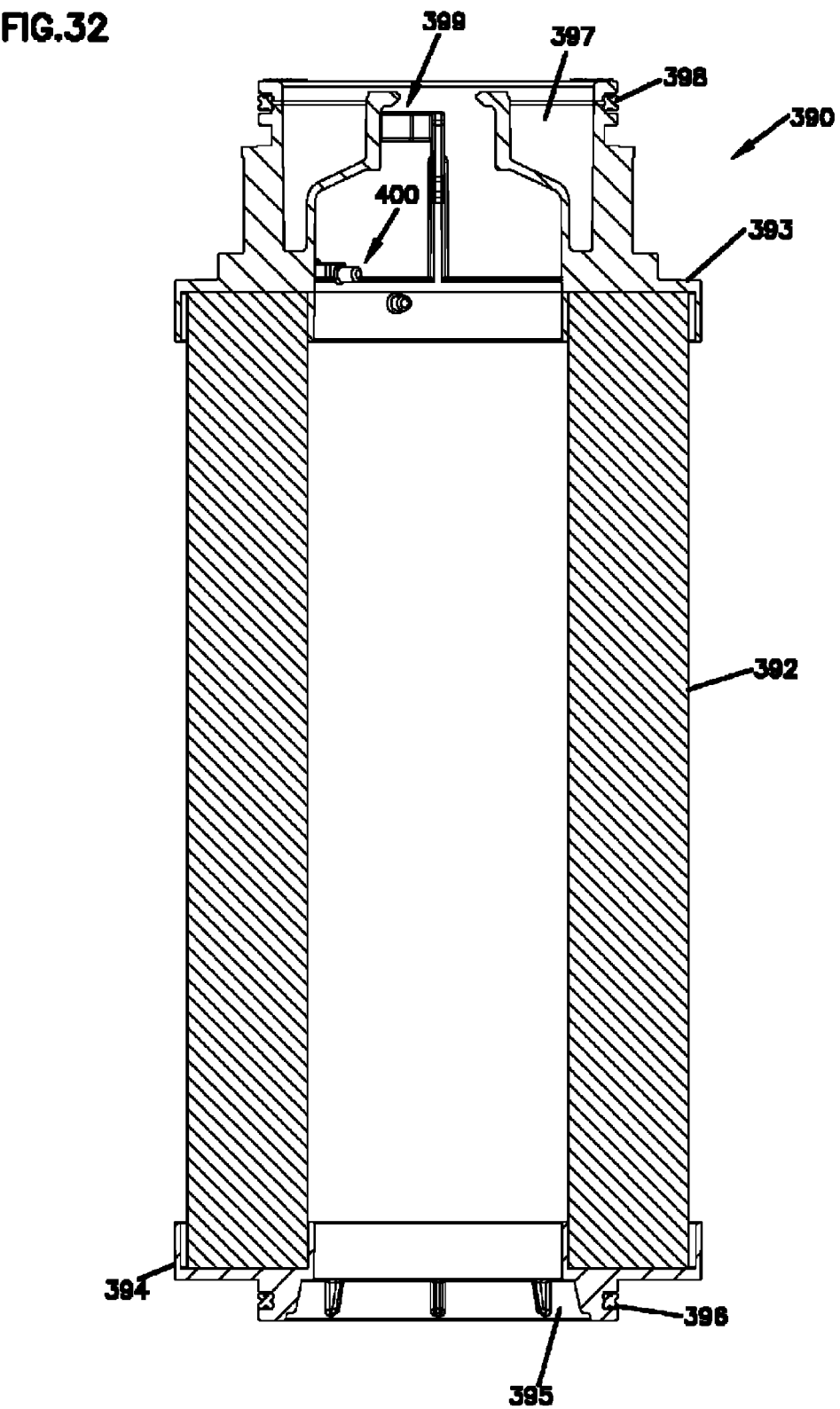
FIG. 32 is a cross-sectional view of a bypass filter cartridge utilized with the system of FIG. 1.

FIG. 32 shows a cross-sectional view of one embodiment of a bypass filter cartridge 390. The bypass filter cartridge 390 is usable with a bowl 391 (FIG. 1) in the system 30. The bypass filter cartridge 390 includes a region of filter media 392 attached between a first endcap 393 and a second endcap 394. The second endcap 394 has an axially extending neck 395 holding a seal member 396.

The first endcap 393 is preferably constructed and arranged in a manner that will prevent it from operably fitting within the bowl 36 for the full flow filter assembly 34. Switching the bypass filter cartridge 390 and the full-flow filter cartridge 38 could have catastrophic results. Therefore, structure is built in to prevent this mix-up. One structure is the lock-out mechanism, described herein and further below. Another such mechanism is the structure of the first endcap 393. The first endcap 393 includes an upstanding projection 397 that holds seal member 398. The height of the projection 397 is such that it will not be allowed to operably-engage the filter head 32 in the location of the full-flow filter assemblies 34.

In the bypass filter cartridge 390, it can optionally include a cartridge retention mechanism 399, analogous to the retention mechanism 100 described above. Further, it may also include a protrusion arrangement 400 analogous to the protrusion arrangement 118, described above.

J. Adaptor Arrangements, FIGS. 33-38

Attention is directed to FIGS. 33-38, which illustrate various embodiments of an adaptor arrangement 402. FIG. 33 illustrates one method for using, including installing an adaptor arrangement 402.

A first embodiment of an adaptor arrangement 402 is shown in FIGS. 33 and 34 as adaptor ring 404. A second embodiment is shown in FIGS. 35 and 36 as 404', and a third embodiment is shown in FIGS. 37 and 38 as 404". Each of the adaptor rings 404, 404', and 404" have common features, and will utilize common reference numerals. Differences will be indicated by different reference numerals.

The adaptor ring 404, 404', 404" includes a circular band 406 defining an open aperture 408. In the embodiment shown, the band 406 is generally circular, defining a generally circular open aperture 408. The band 406 has an outer radial surface 410 and an opposite inside radial surface 412. The inside radial surface 412 defines an aperture wall 414, because it lines the open aperture 408.

A protrusion arrangement 416 extends from the band 406. Preferably, the protrusion arrangement 416 includes at least first and second protrusions 421, 422 extending from the aperture wall 414 and into the open aperture 408. The first protrusion 421 is spaced from the second protrusion 422 in a vertical direction along the aperture wall 414. The first protrusion 421 is also circumferentially spaced from the second protrusion 422 along the aperture wall 414.

Preferably, the first protrusion 421 extends into the open aperture 408 no greater than 40% than the inner diameter of the open aperture 408. Similarly, it is preferred that the second protrusion 422 extends into the open aperture 408 no greater than 40% of the inner diameter of the open aperture 408. Preferably, the vertical distance between the first protrusion 421 and the second protrusion 422 is 2-30% of the inner diameter of the open aperture 408.

The first protrusion 421 and the second protrusion 422 are circumferentially spaced within 50 degrees of each other. It is also possible to arrange the first protrusion 421 and the second protrusion 422 such that they are located greater than 45 degrees relative to each other.

In the embodiment shown, the protrusion arrangement 416 further includes a third protrusion 423 extending from the aperture wall 414 and into the open aperture 408. The third protrusion 423 is circumferentially spaced from the first protrusion 421 and the second protrusion 422. The third protrusion 423 is also vertically spaced from only one of either the first protrusion 421 or the second protrusion 422.

In the illustrated embodiments, there is also at least a fourth protrusion 424 extending from the aperture wall 414 and into the open aperture 408. The fourth protrusion 424 is circumferentially spaced from the first protrusion 421, the second protrusion 422, and the third protrusion 423. The fourth protrusion 424 is also vertically spaced from only two of the first protrusion 421, the second protrusion 422, or the third protrusion 423; that is, the fourth protrusion 424 is vertically even with only two of the first protrusion 421, second protrusion 422, and third protrusion 423.

In the embodiments shown, two of the first protrusion 421, second protrusion 422, third protrusion 423, and fourth protrusion 424 are circumferentially-spaced within 15 degrees of each other, while a remaining two are circumferentially-spaced within 15 degrees of each other.

The embodiment of adaptor ring 404' illustrated in FIGS. 35 and 36 differs from the embodiment of adaptor ring 402 in FIGS. 33 and 34, in that the band 406 has a longer vertical wall 430. This longer vertical wall 430 can be useful in certain arrangements.

The embodiment of the adaptor ring 404" of FIGS. 37 and 38 further includes cartridge retention mechanism 440. The retention mechanism 440 is analogous to the retention mechanism 100 and includes a gripper arrangement 442 including fingers 443, 444. Further, the retention mechanism 440 includes a release arrangement 446, including opposing tabs 447, 448.

FIG. 33 demonstrates a technique for using the adaptor arrangements 402 in order to unlock the core piece 222 and the inner filter support 200. Adaptor arrangements 402 are useful in that it is sometimes helpful to be able to use a filter cartridge that does not have the protrusion arrangement 118 on the endcap 41. For example, in the laboratory and out in the field, it may be desirable to test filter cartridges that have different filtration performance but do not have the protrusion arrangement 118. In such situations, the adaptor arrangements 402 are useful.

In FIG. 33, the arrow 450 shows where the adaptor ring 404 is mounted relative to the filter support 200. The adaptor ring 404 is generally mounted over the filter support 200, to engage the basket 304. The filter cartridge 452 may then be mounted thereon. The adaptor ring 404 is generally located between the filter cartridge 452 and the filter support 200. In the embodiment shown, the adaptor ring 404 is then located within the aperture of the first endcap 454 of the cartridge 452.

In use, the adaptor ring 404 is oriented into the filter bowl 36, and the first protrusion 421 is pushed against the basket 304 to then allow the second protrusion 422 to engage the basket 304. Engagement of the second protrusion 422 against basket 304 then rotates the basket 304 relative to the projections 218 (FIG. 19) on the filter support 200. This frees the legs 306 of the basket 304 relative to the projections 218. When the legs 306 are free of interference with the projections 218, the core piece 222 may move axially relative to the inner filter support 200.

K. Methods of Operation of the Lock-Out Mechanism

As mentioned above, it may be desirable to have in the filter system 30 a mechanism that ensures that the filter system 30 cannot be operated unless the filter cartridge 38 has been operably assembled within the filter bowl 36. In addition, in the particular system 30 depicted, there is more than one type of filter assembly and it would be disastrous if a user were to mix up filter cartridges. A lock-out mechanism will achieve both objectives.

Reference is first made to FIG. 39 which depicts filter bowl 36, inner filter support 200, core piece 222, and filter head 32. In FIG. 39, the filter cartridge 38 is not within the filter bowl 36. During servicing, for example, the bowl 36 would not have the filter cartridge 38 installed therewithin. FIG. 8 also depicts the bowl 36 without the filter cartridge 38 installed within.

In FIGS. 8, 18, 19, and 39, the basket 304 is fitted around the post 322, and the basket 304 is oriented in its locked position by the bias of spring 350. In particular, the spring 350 is oriented such that it biases the basket 304 into the locked position by rotational force exerted between the flanges 324 and the resistance to that force because of engagement between the legs 306 and the leg-receiving apertures 344 (FIG. 22). In FIG. 19, when the basket 304 is in its locked position, each of the legs 306 has its free end 307 in engagement with the projections 218 formed by the ends of the guide rails 216.

In this position, without filter cartridge 38 installed in the filter bowl 36, the upper rim 311 of the basket 304 and the upper rim 354 of the basket holder 340 will contact or engage against ribs 146 of the adaptor 64. See FIG. 39. Because the legs 306 are resting on top of the projections 218 (in this embodiment, shown as an end of the guide rails 216), the core piece 222 and the basket 304 cannot move axially downwardly in a direction toward the closed end 156 of the bowl 36. The entire inner assembly 364 is in an extended and rigidly fixed position. As can be seen in FIG. 39, in this rigidly fixed position, the filter head 32 cannot operably connect with the bowl 36 by connection between the threads 134 on the filter head 32 and the threads 168 on the bowl 36.

During servicing, when a new filter cartridge 38 has been provided, the filter cartridge 38 is oriented in the bowl 36 by placing it through the open mouth 154. When the filter cartridge 38 is properly and operably positioned in the filter bowl 36, the first protrusion 121 comes in contact or engages the ramped first slide surface 314 of the basket 304. See FIGS. 19, 28, 29, and 30. In embodiments that have more than two protrusions, one possibility is that both the first protrusion 121 and the third protrusion 123 will engage a corresponding first slide surface 314 on the basket 304. As the first protrusion 121 engages this first slide surface 314, it causes the basket 304 to rotate against the spring 350. In preferred embodiments, the rotation will be less than 45 degrees, for example, 5-20 degrees. This rotates the basket 304 from the first locked position (FIGS. 19 and 30) to the second unlocked position (FIG. 20). The first groove 312 in the basket 304 become aligned with the first slot 360 of the basket holder 340, which will eventually allow the first protrusion 121 to slide down.

Figure 23:
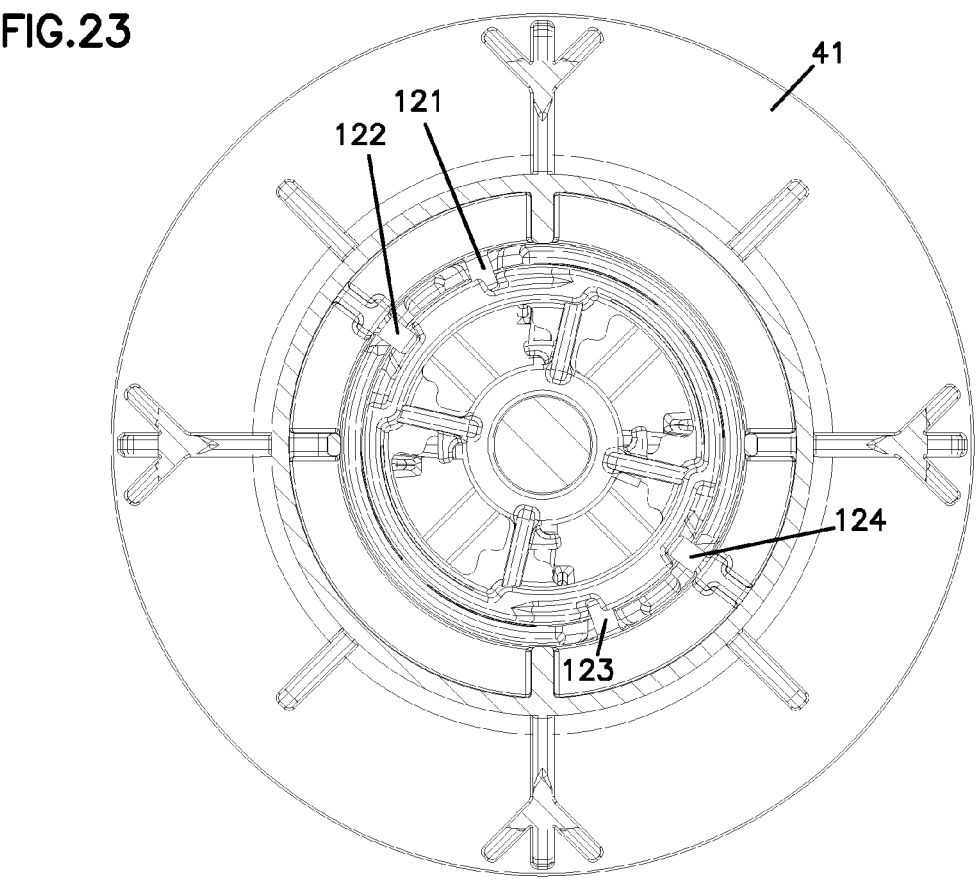
FIG. 23 is a partial cross-section, top plan view showing the endcap engaged against the basket and basket holder as the basket is rotated from its first locked position to its second locked position.
Figure 27:
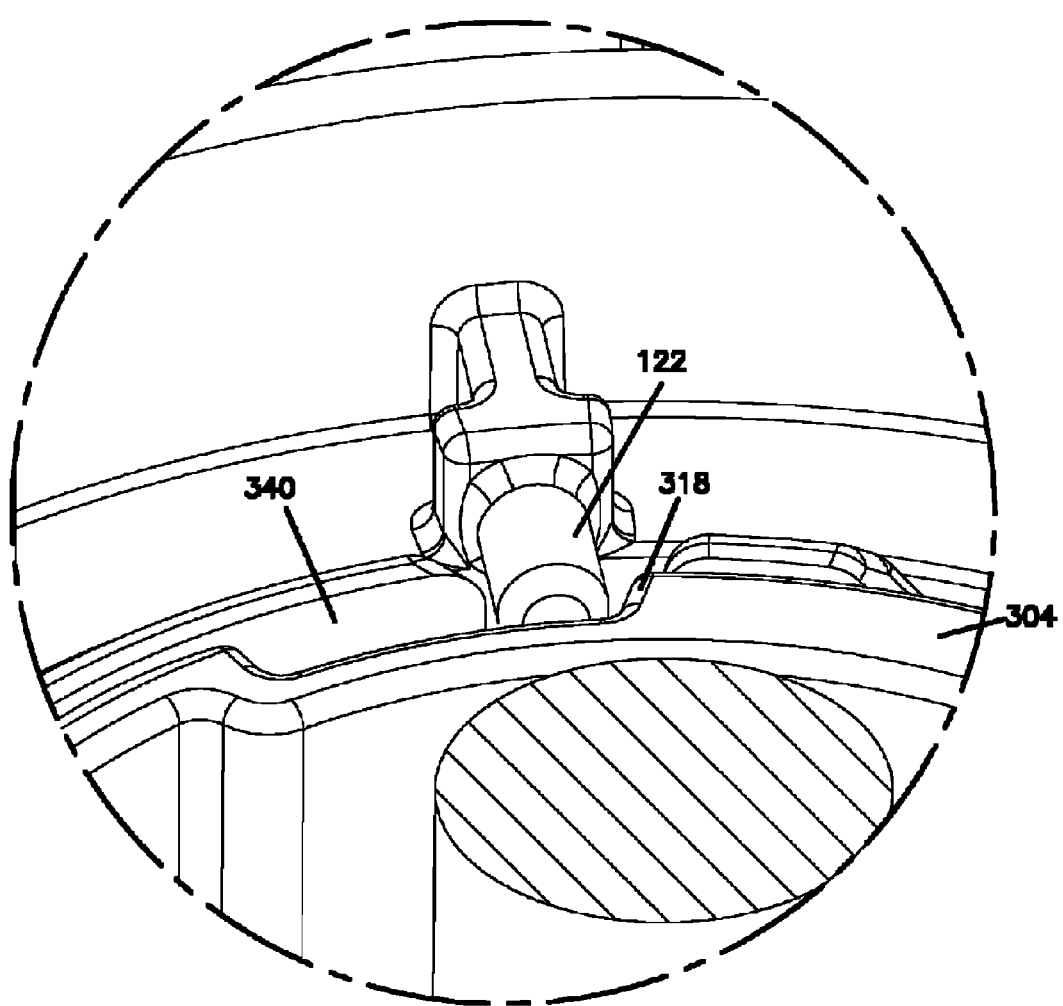
FIG. 27 is an enlarged, perspective, partially cross-sectional view of the arrangement of FIG. 25 at the portion shown in FIG. 25.
Figure 28:
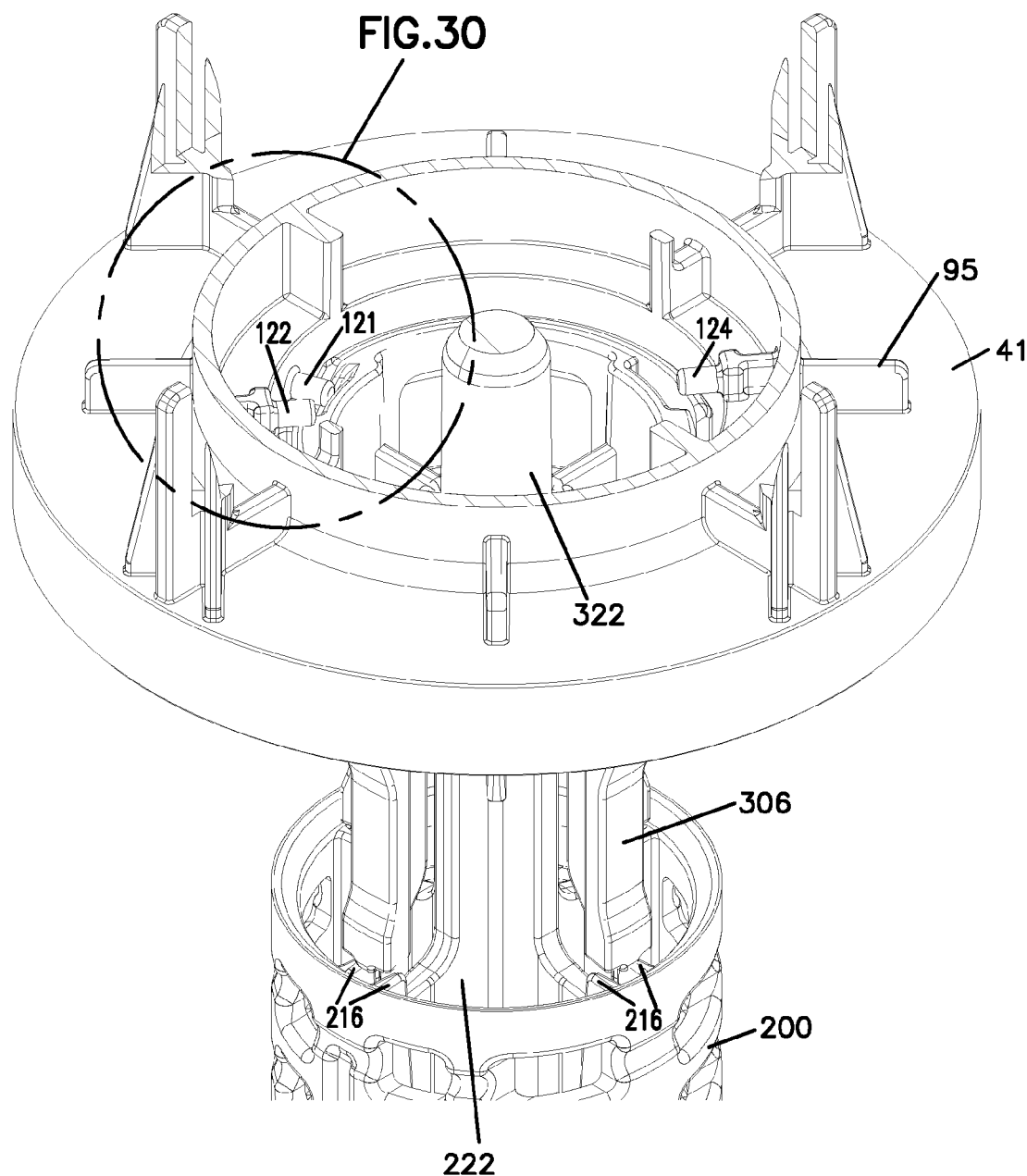
FIG. 28 is a perspective, partially cross-sectional view of the cartridge end cap in engagement with the basket and basket holder, analogous to the view of FIG. 25, but showing the basket in the first locked position.
Figure 29:
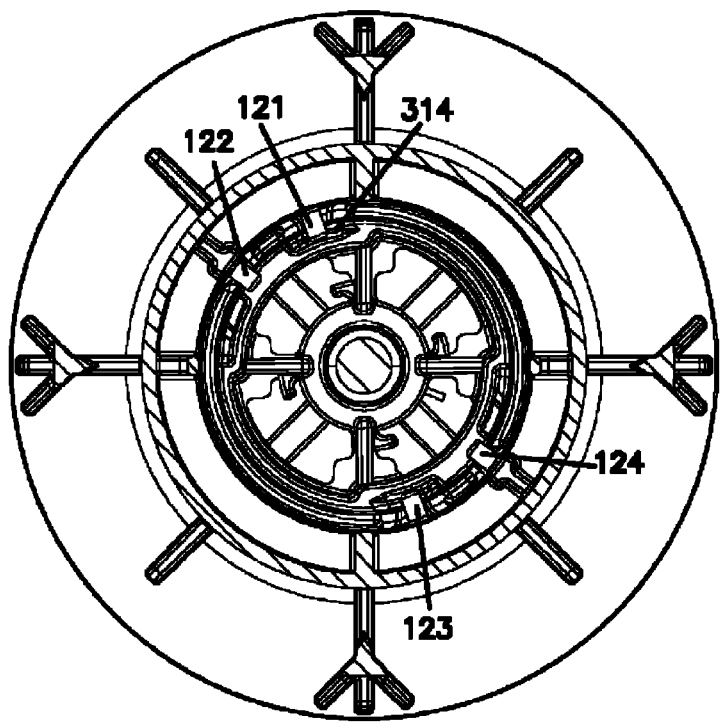
FIG. 29 is a top plan view of the arrangement of FIG. 28.
Figure 30:
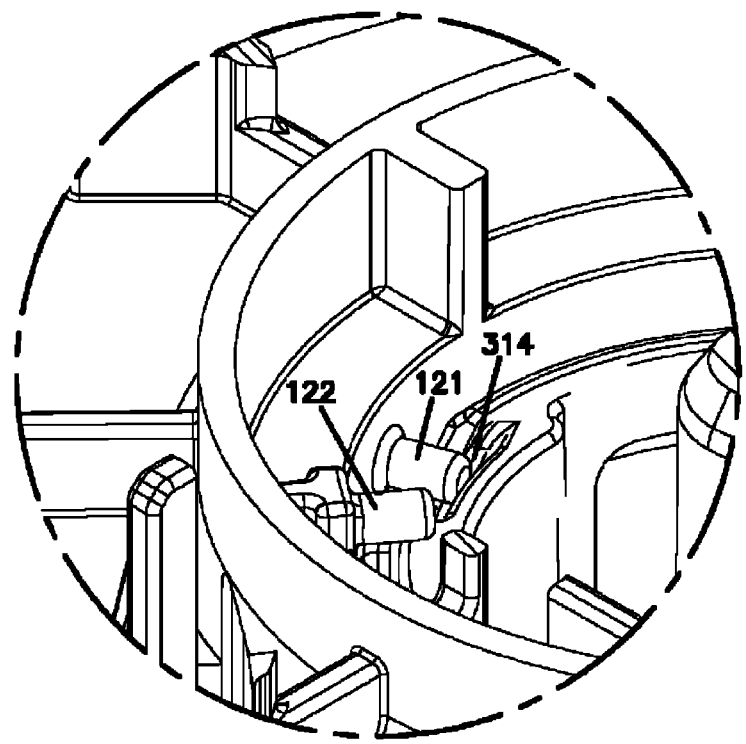
FIG. 30 is an enlarged, perspective view of the portion shown in FIG. 28.
Figure 31:
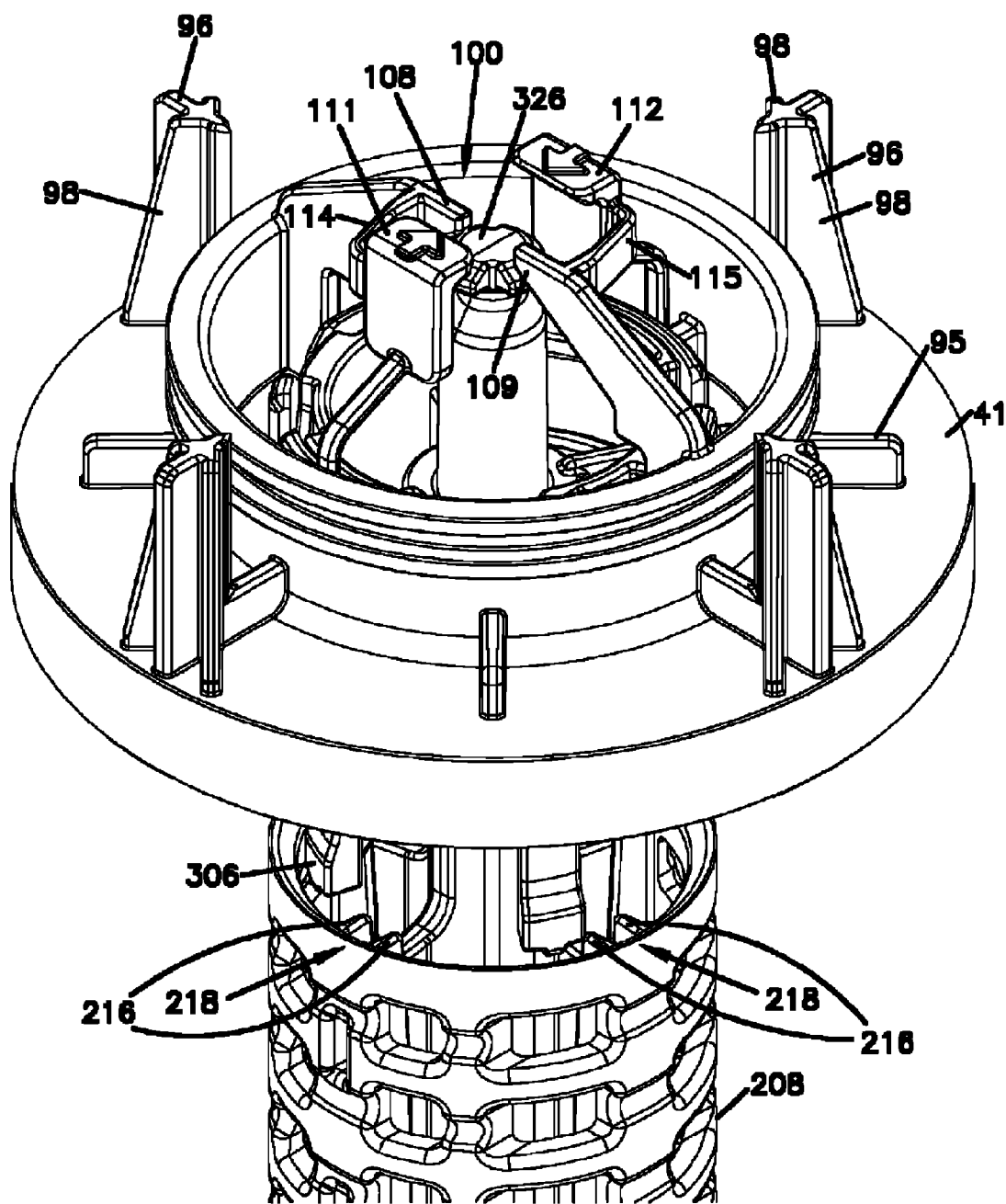
FIG. 31 is a perspective view of the cartridge endcap engaged with the basket, when the basket is in the unlocked position.

When the basket 304 is rotated to the second locked position (FIG. 20), this exposes the second slide surface 318. The second protrusion 122 is oriented such that it will contact or engage the second slide surface 318. The contact with the second slide surface 318 can be made through a protrusion located in the location of the fourth protrusion 124, as well. In embodiments that have protrusions at both locations of the second protrusion 122 and fourth protrusion 124, then both the second protrusion 122 and the fourth protrusion 124 will contact the corresponding second slide surface 318. The initial contact between the second protrusion 122 and the second slide surface 318 causes the basket 304 to rotate against the spring 350 from its second locked position to its unlocked position (FIG. 21). FIGS. 23, 25, and 27 illustrate engagement of the second protrusion 122 against the second slide surface 318. The rotation of the basket 304 from the second locked position (FIG. 20) to the unlocked position (FIG. 21) is preferably less than 45 degrees, for example, 5-20 degrees. Rotation to the unlocked position aligns second groove 316 and second slot 362, which will eventually allow axial sliding of the second protrusion 122 therein downwardly.

As the basket 304 moves to the unlocked position, the legs 306 also rotate, moving away from engagement against the projections 218 created by the end of the guide rails 216. When the legs 306 are completely clear of the projections 218, any additional movement of the filter cartridge 38 in a downwardly axial direction toward the closed end 156 will cause the basket 304 and the core piece 222 to also move in that direction against the core piece spring 338. The core piece spring 338 normally biases the basket 304 and the core piece 222 in the extended position of FIGS. 8 and 39.

When the filter assembly 34 is mounted onto the filter head 32, the adaptor 64 will exert force on the first end cap 41 of the filter cartridge 38, moving the filter cartridge 38 downwardly relative to the bowl 36 and the inner filter support. Moving the filter cartridge 38 downwardly toward the closed end 156 of the bowl 36 also moves downwardly the core piece 222. The filter head 32 will then be able to matably engage the threads 168 on the bowl 36 for secure attachment, as shown in FIG. 11.

It should be appreciated that the lock-out mechanism as characterized above can be utilized in a method of installing a filter cartridge into a filter bowl such as a filter cartridge 38 into filter bowl 36. In such a method, filter cartridge 36 is oriented into filter bowl 36. The filter cartridge 36 will have a tubular construction of filter media, such as media 44. The filter bowl 36 will have a porous inner filter support 200 mounted therein and a core piece 222 within the inner filter support 200. The core piece 200 will be holding a basket 304. The method further includes while orienting, pushing the filter cartridge 38 against the basket 304 to disengage the core piece 222 and the inner filter support 200. For example, this can be implemented by pushing a protrusion arrangement 118 against the basket 304. In particular, first protrusion 121 can be pushed against the first slide surface 304 to rotate the basket 304 from the first locked position to the second locked position. Then, the second protrusion 122 will be oriented to be in a position to engage the second slide surface 318 and cause further rotation of the basket 304 from the second locked position to the unlocked position. The unlocked position will cause the legs 306 to move from engagement against projections 218 to a position in which they are free of interference with the projections 218. This disengages the interference between the core piece 222 and the filter support 200. Next, after disengaging, the method includes axially moving both the filter cartridge 38 and the core piece 222 relative to the inner filter support 200.

This method of installing can be incorporated into a method for servicing, in which, first, the bowl 36 is removed from the filter head 32. Next, the bowl filter cartridge 38 is removed from the bowl 36. This method can employ the method of using the retention mechanism 100, which is described further below (Section M). During services, the bowl can be drained, which is also described in Section L.

Next, a new filter cartridge 38 is provided. The method of installing the filter cartridge, as described above, is then utilized. In preferred such methods, after the cartridge 38 unlocks the engagement between the basket 304 and inner filter support 200, and the cartridge 38 with the basket 304 and core piece 222 is allowed to move axially downwardly.

L. Drain Valve Mechanism

The filter system 30 depicted also has a drain valve mechanism to allow liquid in the complete assembly to automatically be drained during the servicing of the system 30. The drain valve mechanism can be implemented independently of other features in the example embodiment.

When the filter cartridge 38 is operably positioned in the filter bowl 36 with the bowl 36 being fully-threaded on the filter head 32 as shown in FIG. 11, the plug 244 is in the closed and sealed position. In this position, the first plug seal 240 and the second plug seal 242 are in place (FIG. 12).

The first plug seal 240 seals off liquid located on the clean side in the filtered liquid volume 212 (FIG. 12), from allowing unfiltered liquid in the unfiltered liquid volume 214 from flowing through holes 194 (FIG. 12). The second plug seal 242 seals off liquid from the unfiltered liquid volume 214 from the drain port 282 that is directed to the outside environment. Also, the seal 204 (FIG. 10) prevents liquid from the unfiltered liquid volume 214 to be able to reach the filtered liquid volume 212.

With the filter cartridge 38 operably positioned in the bowl 36 and the head 32 fully engaged and connected to the bowl 36, the adaptor 64 presses against the first endcap 41, which pushes the cartridge 38 and the core piece 222 holding the basket 304 and legs 306 downward axially relative to the porous inner filter support 200. As the core piece 222 moves in a direction toward the closed end 156 of the bowl 36, the head 302 of the core piece 222 is moved away from the inwardly extending support 226 and engages the receiver 298 of the plug 244. This axial force presses the plug 244 against the valve spring 288 to move the plug into the sealed position of FIG. 12.

When it is time to service the filter cartridge 38, because of wear or because of occlusion, the filter assembly 34 will be rotated about its central axis relative to the filter head 32. As this occurs, the filter assembly 34 moves downwardly along the central axis due to the unthreading action between the bowl 36 and the filter head 32. While this downward action is occurring, the core spring 338 pushes against fins 336 on the core piece 222. This moves the cartridge 38 holding the core piece 222 axially upwardly relative to the bowl 36. The axial motion upwardly of the core piece 222 stops when the head 302 is stopped by engagement with the lower surface 230 of the inwardly extending support 226. When the head 302 is not acting against the plug 244, it allows the plug 244 to move with the valve spring 288 away from drain port 282 to the position of FIG. 10. This allows liquid to drain from both the unfiltered liquid volume 214, shown by drain path arrow 368, as well as drain from the filtered liquid volume 212 shown by drain path arrow 370 through the drain port 282 into the outside environment where it can be captured by some kind of container for proper disposal. This drainage can occur while the assembly 34 remains attached to the filter bowl 36.

It should be appreciated that with the described drainage system, a method for draining liquid from the filter assembly 34 can be employed. One such method would include at least partially unscrewing the bowl 36 containing the filter cartridge 38 from the filter head 32 to permit the spring 338 to move the plug 244 from the sealed position to a drainage position. The bowl 36 has an interior volume 152 and drainage aperture arrangement 160. The sealed position includes the plug 244 blocking fluid flow between the interior volume 152 of the bowl 36 and the fluid outlet port 282 in the drainage arrangement 160 and by blocking fluid flow between an upstream side of the filter cartridge 38 and a downstream side of the filter cartridge 38. The upstream side of the filter cartridge 38 corresponds to the unfiltered liquid volume 214. The downstream side of the filter cartridge 38 corresponds to the filtered liquid volume 212. The drainage position includes the plug 244 being oriented to permit fluid flow between the interior volume 152 of the bowl 36 and fluid outlet port 282 of the bowl 36. The fluid outlet port 282 of the bowl is part of the drainage aperture arrangement 160, in which in the embodiment shown, holds the valve housing 248 having drain port 282 therein. The step of partially unscrewing the bowl 36 includes permitting core piece spring 338 to move the core piece 222 having head 302 axially out of engagement with the plug 244, permitting valve spring 248 to move the plug 244 from the sealed position to the drainage position.

When the assembly 34 is mounted onto the filter head 32, engagement between a portion of the filter head (such as adaptor 64) and the cartridge (such as end cap 41), pushes the filter cartridge 38 and structure connected to it, axially downwardly against the core piece spring 338 in a direction toward the closed end 156 of the bowl 36. The structure connected to the cartridge 38 will include the core piece 222, having head 302. The core piece 222 moves axially relative to the filter support 200, and the fins 336 will slide within channels 220 between the guide rails 216. As the core piece 222 moves in a direction toward the closed end 156, the head 302 moves toward the valve assembly 236. Eventually, the head 302 engages the receiver 298 of the plug 244 and pushes the plug 244 against spring 288 to move the plug 244 into the sealed position 238, in which first plug seal 240 is formed and second plug seal 242 is formed.

M. Cartridge Retention Mechanism 100

In the preferred embodiment, illustrated, the filter system 30 includes cartridge retention mechanism 100 to releasably hold the filter cartridge 38 within the filter bowl 36 during servicing. The cartridge retention mechanism 100 can be implemented independently of the other features in the filtration system, including independent of the lock-out mechanism and the drain valve mechanism.

FIGS. 2, 3, 4, 9, and 11 each shows the retention mechanism 100 engaged with the gripper arrangement 104 connected to the core piece 222, specifically, the neck 330 of the button 326. Specifically, the fingers 108, 109 are gripping the neck 330, which causes the filter cartridge 38 to remain in the bowl 36, rather than stay connected to the adaptor 64 in the filter head 32.

When the filter assembly 34 is removed from the head 32, the filter cartridge 38 remains captured in the bowl 36 by engagement between the fingers 108, 109 of the gripper arrangement 104 and the button 326 of the post 322. In order to release the filter cartridge 38 from the bowl 36, the release arrangement 106 is actuated. Specifically, the tabs 111, 112 are squeezed together in a direction toward each other and toward the post 322, by using, for example, the thumb and forefinger of the person providing the servicing. This causes the fingers 108, 109 to move away from the neck 330 of the post 322, allowing the fingers 108, 109 to clear the button 326. The thumb and forefinger of the service person is on the tabs 111, 112, and the service person can now pull the filter cartridge 38 clear of the button 326 and remove the filter cartridge 38 from the bowl 36.

The retention mechanism 100 can be made from a material flexible enough to provide deflection of the fingers 108, 109 away from each other when the tabs 111, 112 are squeezed. This material may be plastic, although it may be other materials as well.

The retention system 100 can be used in a method for servicing the filter system 30 including removing the filter assembly 34, including bowl 36 containing filter cartridge 38, from filter head 32. Next, during the step of removing, the method includes retaining the filter cartridge 38 to the bowl 36 by gripping the button 326 with opposing fingers 108, 109, radially extending toward each other. After the step of retaining, opposing tabs 111, 112 may be gripped and squeezed toward each other to release the fingers 108, 109 from the button 326 and thereby release the filter cartridge 38 from the bowl 36. The method further includes the step of, while still gripping the opposing tabs 111, 112, pulling the filter cartridge 38 from the bowl 36. The step of gripping includes using opposing fingers 108, 109 that are integral with the filter cartridge 38. The step of gripping may also include using opposing fingers 443, 444 that are part of an adaptor 404" between the filter cartridge 38 and the core piece 222.

II. The Embodiment of FIGS. 40-57

A. Overview

FIGS. 40-57 illustrate an example embodiment of a filtration system including a filter assembly and filter head. The particular embodiment illustrated depicts one example, but it should be realized, that many examples are envisioned and not illustrated in the drawings. FIG. 50 shows a filter system 530 including a filter head 532 and a filter assembly 534. In FIG. 40, it can be seen that the filter assembly 534 includes a filter bowl 536 and a removable and replaceable filter cartridge 538. FIG. 40 shows this embodiment of the filter system 530 in an exploded, perspective view. In FIG. 41, a perspective view of the filter assembly 534 including filter bowl 536 and filter cartridge 538 is illustrated.

In the embodiment illustrated in FIGS. 40-57, the filter assembly 534 has features including a lock-out mechanism, an auto-drain valve mechanism, and a cartridge retention mechanism. Each of these features can be implemented independently of the other features. The particular embodiment illustrated in the drawings shows all three features integrated into the same filter assembly 534. One skilled in the art will appreciate that each feature can be implemented independently of the others.

In general, the lock-out mechanism ensures that the filter system 530 is not accidentally operated with equipment without the filter cartridge 538 installed therein. Thus, it is a mechanism to protect the equipment being filtered by ensuring that the filter head 532 and filter bowl 536 cannot be operably connected unless there is a filter cartridge 538 operably oriented within the filter bowl 536. Details on an example lock-out mechanism are described in Section H of this disclosure.

An auto-drain valve mechanism can be included in the filter system 530 and will allow for draining of the filtered liquid from the filter bowl 536 during a servicing of the filter system 530. The auto-drain valve mechanism allows for draining of the filter bowl 536 before the filter cartridge 538 is removed from the bowl 536. An example embodiment is described in Section I of this disclosure.

The filter system 530, in this embodiment, also includes a cartridge retention mechanism. This feature allows for attachment of the filter cartridge to the filter bowl 536 after the filter head 532 has been completely removed from the filter assembly 534. Section J describes an example embodiment of a cartridge retention mechanism.

For purposes of organization, it should be understood that the following description will be of various pieces of the particular, illustrated embodiment. After each of the pieces in this embodiment is described, the way in which the pieces interact to provide the above and other functions is described. Methods of operation, assembly, filtering, and servicing are then described. The following are example embodiments only. A variety of implementations can be made without departing from the scope of this disclosure.

B. The Filter Cartridge 538

Reference is made to FIGS. 40, 42, 50, 51, and 52, which illustrate one embodiment of filter cartridge 538 usable in this arrangement. In the embodiment shown, the filter cartridge 538 includes first and second opposite endcaps 541, 542 and a tubular construction of filter media extending between the first and second endcaps 541, 542. In the embodiment shown, the media 544 is cylindrical in construction and defines an open filter interior 546. A variety of different types of media can be used and may depend upon the particular liquid that is being filtered. In the embodiment shown, the media 544 is pleated media 548. The pleated media 548 can include cellulose, synthetic, blends of synthetic and cellulose, for example. In general, liquid to be filtered flows through the media 544, which functions to remove particulate or other debris from the liquid before flowing into the open interior 546. In some systems, it will be possible to operate the filter system 530 in a reverse-flow manner, in which the liquid to be filtered flows from the open filter interior 546, through the media 544, and to a region outside of the media 544.

The first endcap 541 defines a first open aperture 550, which is in fluid communication with the open filter interior 546. The first endcap 541 further includes a first neck 552 protruding from an outward axial surface 554. The first neck 552 defines a groove 556 along a radial surface 558 of the neck 552. Seated within the groove 556 along the radial surface 558 is a first seal member 560. The first seal member 560 forms a releasable seal 562 (FIG. 50) with an adaptor 564 (FIGS. 49 and 50) when the filter cartridge 538 is operably assembled in the filter system 530 with the filter head 532 operably engaged with the filter bowl 536.

The first endcap 541 further includes a rib arrangement 566 (FIG. 43) extending into the first open aperture 550. In the embodiment shown, the rib arrangement 566 extends from the first neck 552 into the first open aperture 550. As described below, the rib arrangement 566 (which, the example embodiment shown, contains at least one rib 568) cooperates, in one embodiment, with the lock-out arrangement. Another function of the rib arrangement 566 is to cooperate with the cartridge retention mechanism. In the embodiment shown, the rib arrangement 566 includes a plurality of ribs 568 extending radially from an inner wall 569 (FIG. 42) of the neck 552. In the embodiment shown, each of the ribs 568 is illustrated as a relatively thin projection 570 (FIG. 42) extending radially into the first open aperture 550 from the inner wall 569 of the neck 552.

In this embodiment of the filter cartridge 538, the cartridge 538 further includes a retention mechanism 572 that is spaced both axially and radially from the first neck 552. The retention mechanism 572 cooperates with other structure to retain the cartridge 538 with the filter bowl 536 during servicing. The details on this operation is discussed later below in Section J of this disclosure.

In the embodiment shown, the retention mechanism 572 is radially centered within the first open aperture 550. While a variety of implementations are contemplated, in the embodiment shown, the retention mechanism 572 includes a flexible semi-tubular arrangement 574 (FIG. 42) connected to the rib arrangement 576. By "semi-tubular", it is meant that it may be tubular in shape, having a closed perimeter, and the perimeter can form a circle or not form a circle (i.e., the perimeter may be irregular or any other non-circular shape). The flexible semi-tubular 574 has a gripper arrangement 576 and a release arrangement 578. In general, the gripper arrangement 576 is useful in providing a releasable connection with other structure in the filter bowl 536 to allow for the cartridge 538 to remain retained in the filter bowl 536 when servicing the system 530. The release arrangement 578 is useful in providing a convenient, quick, and easy to use mechanism to release the filter cartridge 538 from the filter bowl 536, during servicing, and allow the cartridge 538 to be removed from the bowl 536.

As embodied herein, the gripper arrangement 576 includes a pair of opposing fingers 580, 581 radially extending into the flexible semi-tubular 574. As will be explained below, in conjunction with FIGS. 56 and 57 and in Section J of this disclosure, the fingers 580, 581 engage structure in the filter bowl 536.

As embodied herein, the release arrangement 578 includes a pair of opposing tabs 582, 583, with each tab being located about 590 degrees relative to the fingers 580, 581. The tabs 582, 583 are connected to the fingers 580, 581 to form a flexible ring defining a receiving aperture 586. The receiving aperture 586 receives structure in the filter bowl 536 for retaining the cartridge 538 to the bowl 536.

The tabs 582, 583 are depressible or compressible in a direction toward each other, and because of the connection of the tabs 582, 583 to the fingers 580, 581 by way of the flexible ring 584, upon squeezing the tabs 582, 583 toward each other, the ring 584 moves the fingers 580, 581 away from each other. Moving the fingers 580, 581 away from each other will release the filter cartridge 538 from the corresponding structure in the filter bowl 536.

The filter cartridge 538 further includes, in the embodiment shown, a centering arrangement 588 to assist with positioning and centering the filter cartridge 538 relative to the filter head 532. In the embodiment shown, the centering arrangement 588 includes a plurality of projections 590 (FIG. 42) extending radially from an exterior wall 592 of the first neck 552 and axially from the outward axial surface 554 of the first endcap 541. In the embodiment shown, selected ones of the projections 590 are L-shaped members 594, which assist in holding the filter cartridge in place relative to the adaptor 564 (FIG. 11). As can be seen in FIG. 50, the adaptor 564 is contained between the L-shaped member 594 and the first neck 552.

Figure 43:
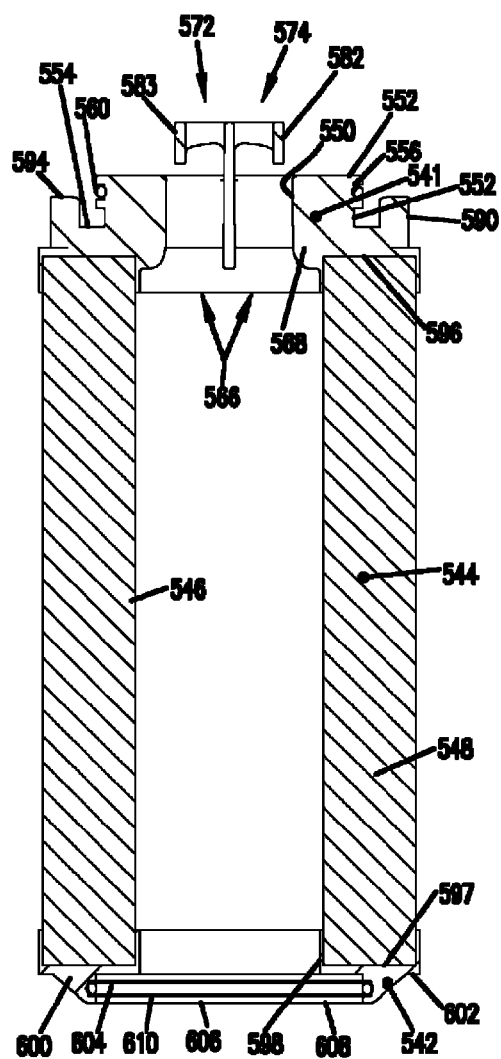
FIG. 43 is a schematic, cross-sectional view of the filter cartridge depicted in FIG. 42.
Figure 42:
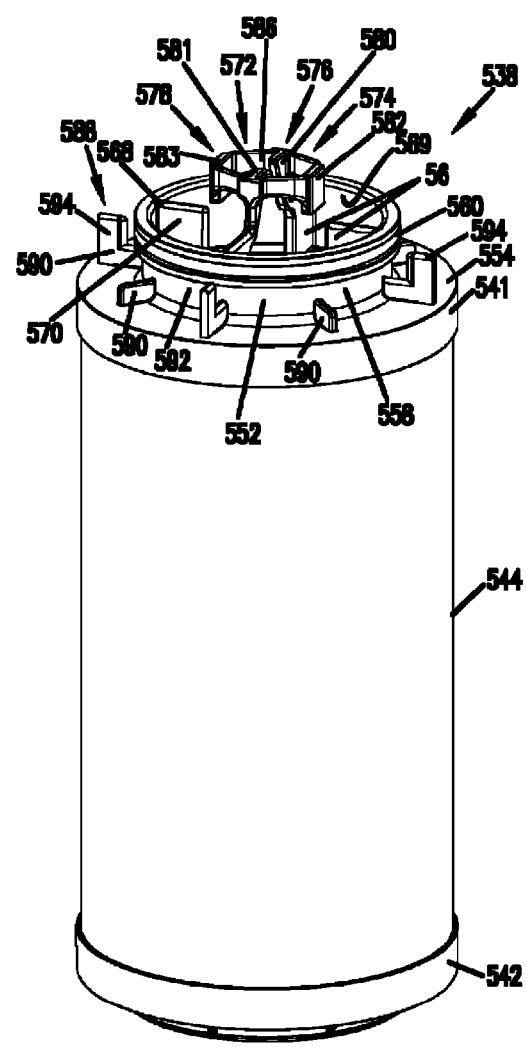
FIG. 42 is a perspective view of the filter cartridge illustrated in FIG. 40.

As mentioned above, the filter media 544 extends between and is secured to the first endcap 541 and second endcap 542. As shown in FIG. 43, the filter media 544 has a first end 596 that is secured to the first endcap 541 through a conventional techniques. The media 544 has a second end 597 that is secured to the second endcap 542.

In FIG. 43, the second endcap 542 defines a second open aperture 598 in communication with the open filter interior 546. In the embodiment shown, the second endcap 542 includes a second neck 600 extending from an outward axial surface 602 of the second endcap 542.

A second seal member 604 is oriented on a radial surface 606 of the second neck 600. In the embodiment shown, the second seal member 604 is oriented on an inner radial surface 608 of the second neck 600. As can be seen in FIG. 43, the second seal member 604 is oriented within a groove 610 defined in the inner radial surface 608 of the second neck 600. When the filter cartridge 538 is operably assembled in use with the filter bowl 536, the second seal member 604 forms a seal 612 (FIG. 50) with structure in the filter bowl 536.

C. The Filter Head 532 and Adaptor 564

In FIGS. 40, 48, 50, and 54, a schematic depiction of filter head 532 is shown. The filter head 532, in the embodiment shown, has a conduit 614, typically functioning as an inlet conduit, and a conduit 616, typically functioning as an outlet conduit. The filter head is connected to other equipment such that liquid to be filtered flows into the filter head 532 through the inlet conduit 614 and then exits the filter head 532 by flowing through the outlet conduit 616. In many typical arrangements, the filter head 532 is constructed of a cast metal part.

The filter head 532 includes mating structure 618 for selective engagement with the filter bowl 536. In the embodiment shown, the mating structure 618 are threads 620. The threads 620 are illustrated as being along an outer radial surface of the filter head 532. Of course, the threads can also be located on an inner radial surface of the filter head 532.

Lining the outlet conduit 616, the filter head 532 includes mating structure 622 for engagement with the adaptor 564. In the embodiment shown, the mating structure 622 are threads 623 that connect to external threads 624 on the adaptor 564. In this manner, the adaptor 564 can be selectively secured to the filter head 532 through engagement between the threads 623 and 624. Other ways can be used to attach the adaptor 564 to the head 532 by, for example, press fit, adhesive, or welding, or making the adaptor 564 integral to the head 532.

Figures 54, 55:
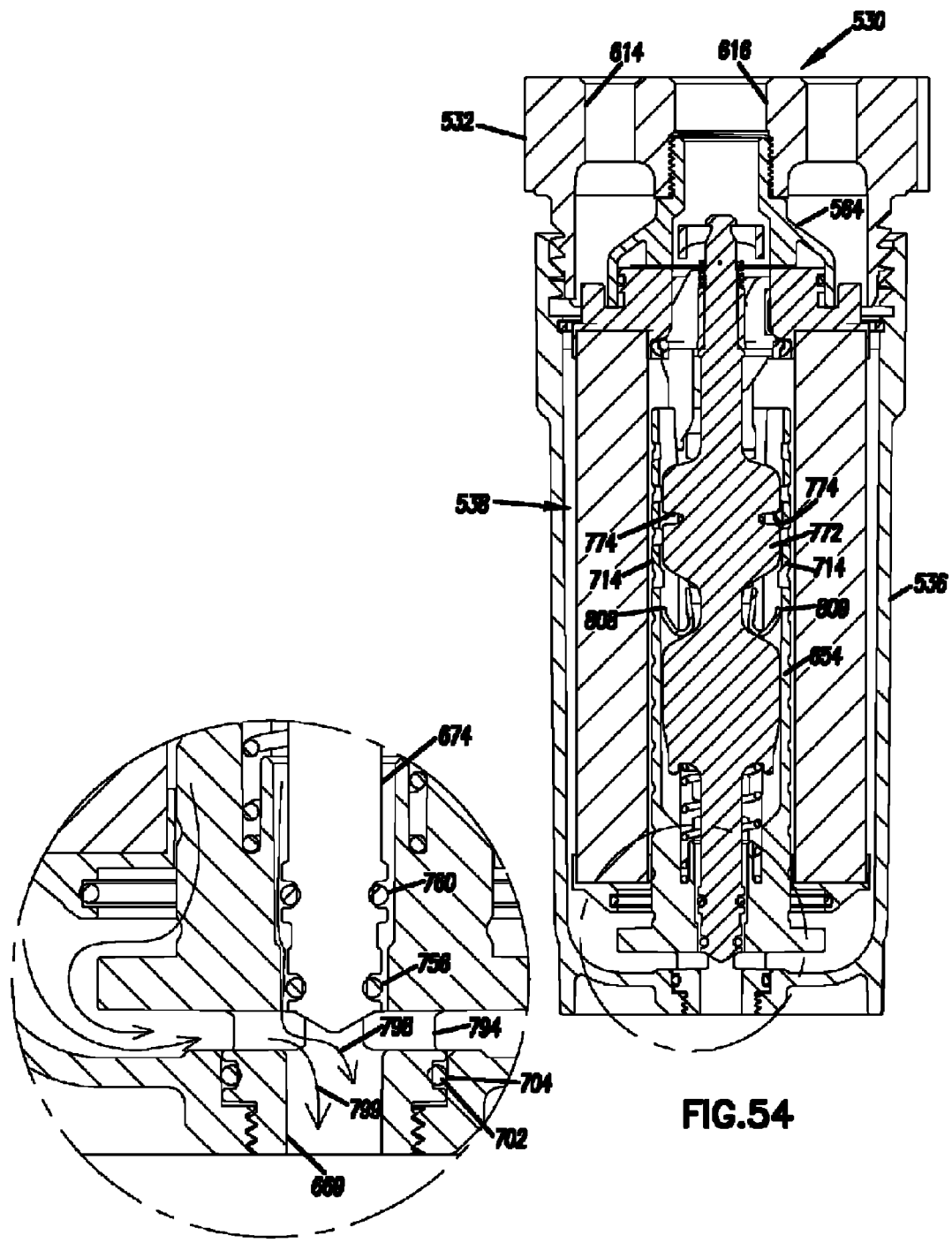
FIG. 54 is a schematic, cross-sectional view of the filter system shown in FIG. 50, but in FIG. 54 showing the filter head partially removed from the filter bowl and showing the drain valve mechanism in an open position.
FIG. 55 is an enlarged portion of the cross-section depicted in FIG. 54.

One embodiment of adaptor 564 is illustrated in perspective view in FIG. 49 and in cross-sectional view in FIGS. 48, 50, and 54. In the embodiment shown, the adaptor 564 includes a funnel 626 circumscribing a central, open aperture 628. Extending from the funnel 626 is a cylindrical wall 630. The wall 130 has an end rim 632, which becomes positioned between the first neck 552 and the L-shaped member 594 of the first endcap 541. The wall 630 defines an inner radial surface 634, which provides a surface against which seal 562 (FIG. 50) is formed between the filter cartridge 538 and the adaptor 564.

Extending from an inner wall of the funnel surface 626 is a plurality of ribs 636. The ribs 636, in this embodiment, are part of the lock-out mechanism in that they interfere with a portion of the filter bowl 536, when the cartridge 538 is not operably oriented within the filter bowl 36, and the engagement between the ribs 636 and the structure in the filter bowl 536 prevents the filter head 532 from threadably engaging the filter bowl 536. This is described more fully below in Section H of this disclosure.

The adaptor 564 cooperates with the filter cartridge 538 to help center the cartridge 538 and filter bowl 536 relative to the filter head 532. As can be seen in FIG. 50, the wall 630 of the adaptor 564 becomes located between the first neck 552 and the L-shaped member 594 of the first endcap 541.

D. The Filter Bowl 36

In reference now to FIGS. 44, 45, 48, 50, and 54, one embodiment of the filter bowl 536 is illustrated. In the embodiment shown, the filter bowl 536 includes a surrounding wall 638 defining an open interior volume 640 for receiving and holding filter cartridge 538 therein. The bowl 536 has, at one end, an open mouth 642 for allowing the filter cartridge 538 to be selectively inserted and removed from the bowl 536. At an end opposite of the open mouth 642 is a closed end 644 defining an opening, which functions as a drainage aperture 646. Circumscribing the closed end 644 is a surrounding rim 648 to allow the bowl 536 to be stood on a horizontal surface, such as a shop bench, without tipping. In this embodiment, the rim 648 also has flat surfaces 649 (FIGS. 40 and 41) to be used in conjunction with a removal tool such as a wrench. In the embodiment shown, centered within the surrounding rim 648 is a tube 650, which axially extends from the closed end 644 and defines the drainage aperture 646. In the embodiment shown, the drainage aperture 646 has connection structure, such as threads 652 to allow it to be operably connected to a porous inner filter support 654 (FIG. 47), which is described further below. The drainage aperture 646 is in fluid communication with the open interior volume 640 of the filter bowl 536.

Adjacent to the open mouth 642 is mating structure 656, illustrated herein as threads 658. The threads 658 are along the inner wall 660 of the surrounding wall 638. The threads 658 are selectively engageable with the threads 620 on the filter head 532. Of course, the threads 658 can also be on the exterior wall, when threads 620 on the head 532 are on an interior wall and a seal groove for holding a seal member 662 is on the exterior wall.

In the embodiment shown, along the inner wall 660 is seal member 662 for forming a releasable seal 664 (FIG. 50) between the filter bowl 536 and the filter head 532.

E. Filter Support 654

Reference is now made to FIGS. 45, 46, 47, 48, 49, 52, and 54. One embodiment of the porous inner filter support 654 is illustrated. The porous inner filter support 654 is oriented within the open filter interior 640 of the filter bowl 536. In particular, in the specific embodiment illustrated, the inner filter support 654 is releasably secured to the filter bowl 536 through a threaded connection 666 between the threads 652 in the aperture 646 of the bowl 536 and a hollow stem 668 that is part of the inner filter support 654. The filter support 654 can also be permanently attached to the bowl 536 by adhesive, press fit, staking, welding, or the support 654 and bowl 536 can be the same integral piece.

In the particular embodiment shown, the inner filter support 654 includes a outer porous wall 670. The outer porous wall 670 defines a plurality of flow passages 672 (FIG. 47) therethrough. In use, the porous inner filter support 154 functions to help support the filter media 654 by lining the open filter interior 546 of the media 544, and the flow passages 672 allow for filtered liquid to flow into a filtered liquid volume 674 (FIG. 50) within the outer porous wall 670.

Attention is directed to FIG. 47, The outer porous wall 670 defines an interior wall surface 676. Extending from the interior wall surface 676 are a plurality of guide rails 678 projecting radially inwardly in a direction toward the filtered liquid volume 674. The guide rails 678, in the embodiment shown, include two parallel rails 679, 680 with a slide track 681 therebetween. The slide track 681 engages portions of a core piece 682, which is described below in Section G of this disclosure.

Each of the guide rails 678 has an engagement end 684. The engagement ends 184 are part of the lock-out mechanism, described in Section H of this disclosure.

At the end of the outer porous wall 670 is a base 686. In general, the base 686 is oriented normal to or perpendicular relative to the porous wall 170. The base 686 includes a first axial surface 688 and an opposite, second axial surface 689. (FIG. 46) Between the first axial surface 688 and second axial surface 689 is an outer radial surface 690. The radial surface 690 forms an outer periphery sealing surface 692 to form seal 612 (FIG. 50) with the second seal member 604 held by the second endcap 542 on the filter cartridge 538. The first axial surface 688 forms a stop or engagement surface 694 (FIG. 50) for engagement against the second endcap 542 of the filter cartridge 538.

Figure 53:
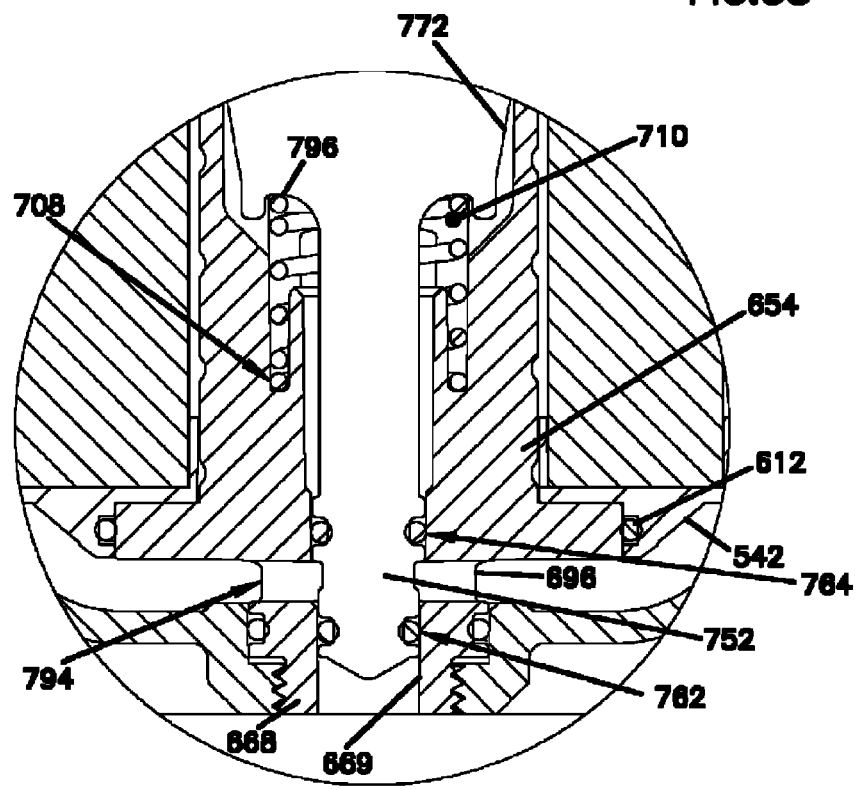
FIG. 53 is an enlarged, cross-sectional view of a portion of a drain valve in a closed position and as illustrated in FIG. 50.

Adjacent to the base 686 is a porous neck 696. When the porous inner filter support 654 is operably oriented within the filter bowl 536, and when the filter cartridge 538 is also operably oriented in the filter bowl 536 (as shown in FIG. 50), the porous neck 696 is in selective fluid communication with the filtered liquid volume 674 (FIG. 50) and an unfiltered liquid volume 698 (FIG. 50) by way of a port 794 (FIG. 53). The unfiltered liquid volume 698 is the volume within the filter bowl 536 that is upstream of the filter media 544. The porous neck 696 is selectively in communication with the filtered liquid volume 674, when the drain valve mechanism is in an open position. The drain valve mechanism is described in Section I of this disclosure.

The hollow stem 668, mentioned above, is in fluid communication with the porous neck 696. The stem 668 is removably oriented within the drainage aperture 646 of the bowl 536. The stem 668 defines an outer radial groove 700 holding a seal member 702 therein. The seal member 702 forms a seal 704 with an inner surface of the tube 650 of the filter bowl 536. The stem 668 is hollow and defines drainage aperture 669, which is located with aperture 646 of the bowl 536.

The inner filter support 654 further includes an inner wall 706 within the outer wall 670 (FIG. 46). The inner wall 706 is solid and extends a relatively short distance from the base 686, specifically, less than 25% of the outer wall 670. The inner wall 706 is circumscribed by the outer wall 670. The inner wall 706 and outer wall 670 define a spring-holding seat 708 therebetween. The spring-holding seat 708 holds a lower spring 710. The lower spring 710 is part of the lock-out mechanism, described in Section H of this disclosure.

Still in reference to FIG. 46, along the interior wall surface 676 of the outer porous wall 670 is an inner sloped shoulder 712. The shoulder 712 can help to limit downward motion of the core piece 682 because it will interfere with the core piece 682 and prevent further downward travel of the core piece 682 within the filter support 654.

The outer porous wall 670 further defines a plurality of receiving slots 714 therethrough. The receiving slots 714 are oriented to receive a portion of a locking spring 716 during servicing of the filter system 530. This is described further below in Section I.

F. Basket 720

Attention is directed to FIGS. 46, 47, 48, and 49. A basket 720 is illustrated. The basket 720 is part of the lock-out mechanism, and its function will be more fully-described below in Section H. A variety of implementations are contemplated. In the particular embodiment illustrated, the basket 720 includes a plurality of legs 722 cantilevered from a base 724. In the embodiment shown, there are four legs 722 evenly and radially-spaced relative to each other. The legs 722 extend axially from the base 724 in a direction toward the closed end 644 of the bowl 536, when the basket 720 is operably assembled in use.

The basket 720 further includes a plurality of petals 726 extending axially from the base 724. In the embodiment shown, there are four petals 726 extending axially from the base 724 in a direction toward the open mouth 642 of the bowl 536, when the basket 720 is operably assembled in use. Thus, the petals 726 extend axially in a direction opposite from the legs 722. The petals 726 are evenly spaced relative to each other. Each of the petals 726, in the embodiment shown, defines an open flow aperture 728, an upper end tip 730, and an angled ramp surface 732. The ramp surface 732 slants downwardly from the end tip 730 down to the base 724.

When the basket 720 is operably assembled with the core piece 682 and installed within the filter bowl 536, the basket 720 is rotationally moveable from a locked position in which a free end 734 of each of the legs 720 axially engages or abuts the engagement end 684 of the guide rails 678 on the filter support 654. The basket 720 is moveable rotationally from the locked position to an unlocked position, the unlocked position being when the legs 722 are free of axial abutment between the free ends 734 and the engagement ends 684 of the guide rails 678 to permit the basket 720 to move axially in a direction toward the closed end 644 of the bowl 536. This is further described in conjunction with the lock-out mechanism, described in Section H below.

The ramp surface 732 on the petals 726 are constructed and arranged to move or rotate the basket 720 from its locked position to its unlocked position by engagement with a portion of the filter cartridge 538. In particular, there will be engagement between the ribs 568 on the first endcap 541 and the ramped surface 732 of each of the petals 726. This is described further below in the lock-out mechanism section, Section H.

The basket 220 further includes a center tube 736 extending from the base 724. The center tube 736 defines a post-receiving aperture 738 sized to receive a post 740 of the core piece 682. The post 740 and core piece 682 are described below in Section G.

Extending between each petal 726 and the center tube 736 is a web 742. In the embodiment shown, there are four webs 742. The webs 742 help to support the center tube 736 and connect it with the rest of the basket 720. Each of the webs 742 also helps to hold an upper spring 744, such that the basket 720 is biased relative to the core piece 682 to keep the basket 720 in the locked position. The function of the upper spring 744 as part of the lock-out mechanism is described in Section H.

G. Core Piece 682 and Locking Spring 716

In reference now to FIG. 47, one embodiment of core piece 682 is illustrated in perspective view. A cross-sectional view of the core piece is illustrated in FIGS. 45, 46, 48, 50, and 54. In general, the core piece 682 is operably oriented within the filtered liquid volume 674, and within the interior of the inner filter support 654.

As can be seen in FIG. 47, in the embodiment shown, the core piece 682 includes a post 740, a center member 770, and a plug 752. In the embodiment shown, the core piece 682 extends a length that, in certain preferred embodiments, will be longer than the length of the media 544.

In the embodiment shown, at one free end of the post 740, a button 748 is defined. Adjacent to the button 748 is a reduced dimension region in the form of a neck 750. The post 740 is received within the post receiving aperture 738 of the basket 720, and the retention mechanism 572 (FIG. 56) engages the post 740 at the button 748. Specifically, the gripper arrangement 576 holds the post 740 at the button 748 by having fingers 580, 581 engage the neck 750 of the post 740. See FIG. 57. Further operational details of the retention arrangement are discussed below in Section J.

In the embodiment shown, the core piece 682 further includes plug 752 moveably oriented between a sealed position (FIGS. 50 and 53) and a drainage position (FIGS. 54 and 55) within the drainage aperture 669 of the porous inner filter support 654. In addition, the plug 752 has a third position, which is a position when it is locked in place during servicing awaiting the insertion of filter cartridge 538. This third locked position is illustrated in FIG. 48.

When the plug 752 is in the sealed position, the plug 752 blocks fluid flow between the interior volume 640 of the bowl 536 and the drainage aperture 669. When the plug 752 is in the drainage position, the plug 752 is oriented relative to the bowl 536 to permit flow from the interior volume 640 of the bowl 536 through the drainage aperture 669.

The plug 752, in the embodiment shown, includes a first groove 754 (FIG. 47) holding a first seal member 756 (FIG. 46) spaced from but adjacent to the first groove 754 is a second groove 758 (FIG. 47). Oriented in the second groove 758 is a second seal member 760 (FIG. 46). The first seal member 756 forms a first seal 762 (FIG. 53) between the plug 752 and the inner wall of the stem 668 within the drainage aperture 669. Thus, in this embodiment, the first seal 762 is between a portion of the porous inner filter support 654 and the core piece 682. The first seal 762 blocks unfiltered liquid from the unfiltered liquid volume, which is in the open interior volume 640 but upstream of and outside of the filter media 544, from flowing through the porous neck 696 and into the drain aperture 669.

Still in reference to FIG. 53, the second seal member 760 forms a second seal 764 between the plug member 752 of the core piece 682 and an inner flow conduit 766 (FIG. 48) of the filter support 654. As such, the second seal 764 seals against unfiltered liquid from the unfiltered liquid volume 698 (FIG. 50) from reaching the filtered liquid volume 674 (FIG. 50).

The second seal 764 also prevents liquid from the filtered liquid volume 674 from flowing downwardly into the unfiltered liquid volume 698.

The plug 752 is discussed more fully below in Section I, in connection with its contribution to the drain valve mechanism.

In reference again to FIG. 47, in the example embodiment shown, the core piece 682 includes center member 770. In this specific embodiment, the center member 770 extends between the post 740 and the plug 752. The core piece 682, in this embodiment, includes a plurality of guide fins 772 radially extending from the center member 770. The guide fins 772 help to hold the core piece 682 centered within the inner filter support 654. The guide fins 772 are also a component, in this embodiment, of the drain valve mechanism, discussed in Section I below.

In the embodiment shown in FIG. 47, at least two of the guide fins 772 define slots 774. In the embodiment shown, the slots 774 are, in general, U-shaped openings that extend from an outer edge of the guide fins 772 partially inwardly toward the center member 770. The guide fins 774 receive a portion of the locking spring 716, when the core piece 682 is operably assembled in use with the parts shown in this example embodiment.

In the embodiment shown, between adjacent ones of the fins 272 is a receiving gap 276. As will be explained below, the receiving gap 276 helps to orient and hold other portions of the locking spring 216.

Figure 58:
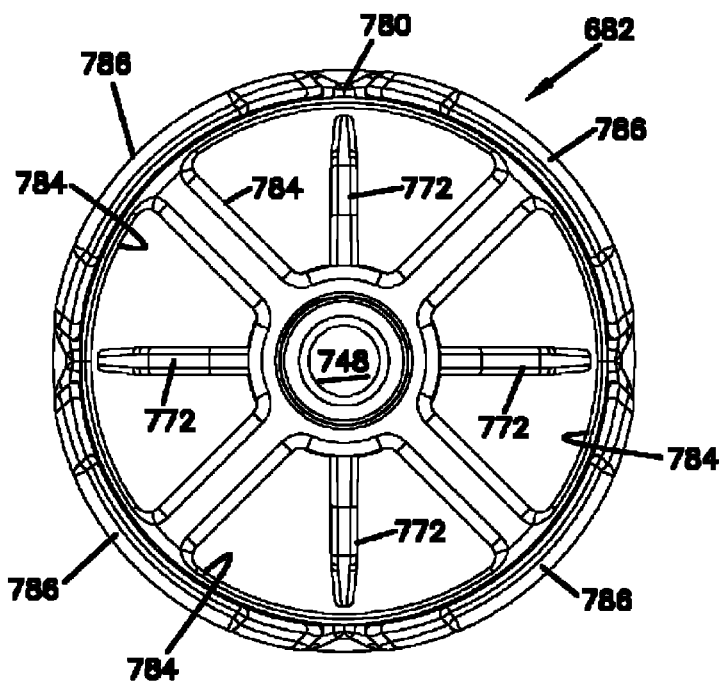
FIG. 58 is a schematic top plan view of the core piece of FIG. 47.

Still in reference to FIG. 47 and in reference to FIG. 58, in the embodiment shown, the core piece 682 further includes a basket holder 778. In this embodiment, the basket holder 778 supports the basket 720 and allows the basket 720 to move between its locked position and its unlocked position. In the embodiment shown, the basket holder 778 includes an apertured frame 780 extending radially from the center member 770. The apertured frame 780 is supported by a plurality of gussets 782. In the embodiment shown, there are four gussets 782 supporting the apertured frame 780. The apertured frame 780 defines leg-receiving apertures 784 (FIG. 58), such that the legs 722 of the basket 720 can penetrate the basket holder 778, by having the legs 722 pass through the apertures 784. The apertures 784 generally have a center axis that is parallel to the center member 770.

Extending axially from the apertured frame 780 in a direction toward the open mouth 642, when the core piece 682 is assembled in use, is a plurality of flanges 786. In the embodiment shown, there are four flanges 786 evenly spaced apart and circumscribing or surrounding the post 740. Each of the flanges 786 defines a pair of openings 788, 789 therethrough. A groove 790 separates each flange 786 from an adjacent flange 786.

The locking spring 716 includes a horizontal member 800, a pair of shoulders 801, 802 at the end of the horizontal member 800, and a pair of hooked arms 804, 805 extending from respective shoulders 801, 802. The hooked arms 804, 805 terminate with hooks 806, 807. The shoulders 801, 802 are generally positioned within the fin slots 774, and the horizontal member 800 extends across the core piece 682. The locking spring 716 functions to limit the vertical motion of the core piece 682.

H. Operation of the Lock-Out Mechanism

As mentioned above, it may be desirable to have in the filter system 530 a mechanism that will ensure that the filter system 530 cannot be operated unless the filter cartridge 538 has been operably assembled within the filter bowl 536. A lock-out mechanism will achieve this objective.

Figures 44, 45:
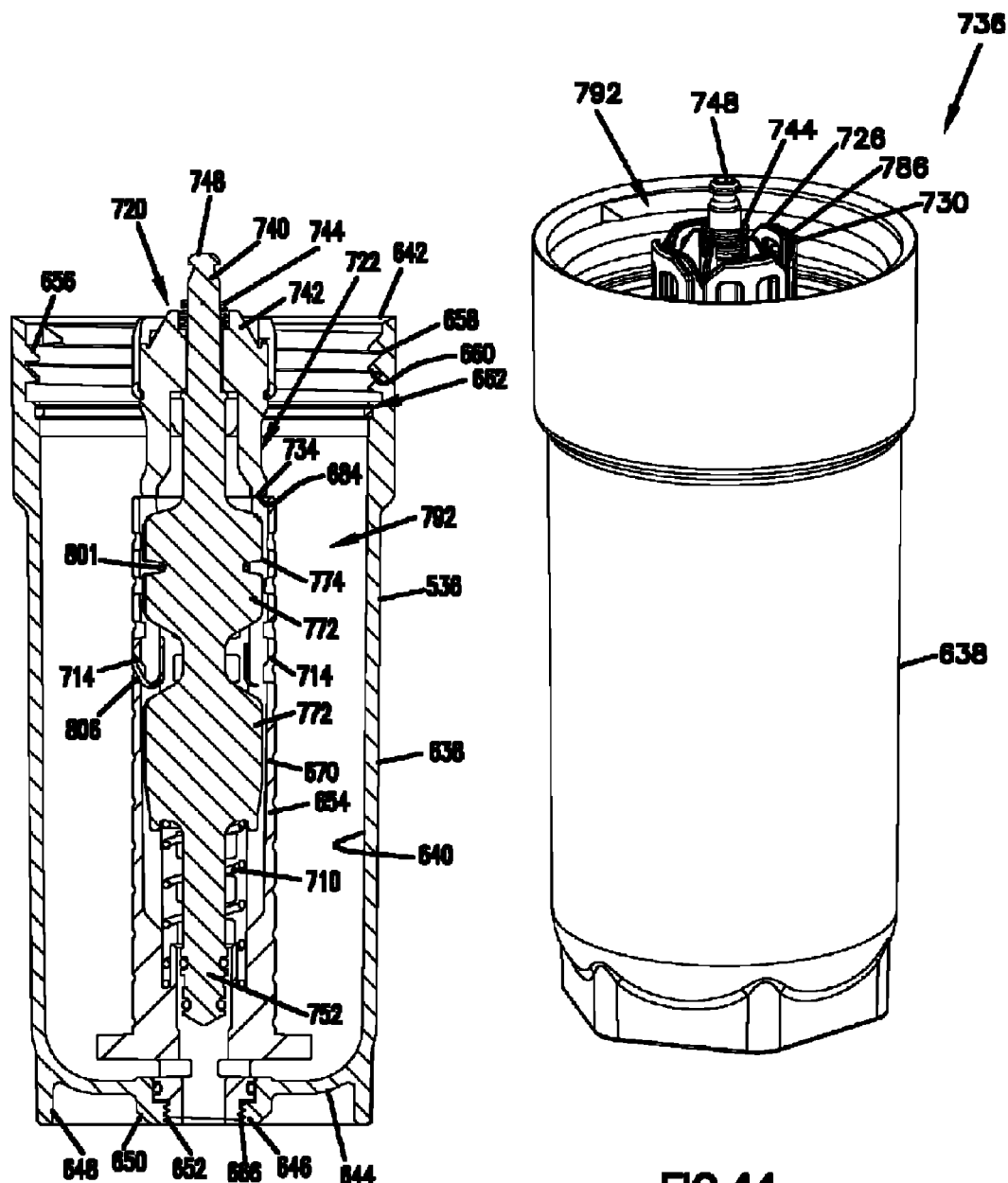
FIG. 44 is a perspective view of the filter bowl depicted in FIGS. 40 and 41.
FIG. 45 is a schematic, cross-sectional view of the filter bowl depicted in FIG. 44 and showing an inner liner assembly.

Reference is first made to FIGS. 44 and 45, which show this embodiment of filter bowl 536 and the filter support 554 and core piece 682 operably assembled therein. In FIG. 45, the filter cartridge 538 is not within the filter bowl 536. FIG. 45 would be, for example, the state of the filter bowl 536 during servicing, after the old filter cartridge 538 has been removed.

In FIG. 45, the basket 720 is snap-fitted to the post 740, and the basket 720 is oriented in its locked position by the bias of the upper spring 744. In particular, the upper spring 744 is oriented such that it biases the basket 720 into the locked position by rotational force exerted between the webs 742 and the resistance to that force because of engagement between the legs 722 and the leg receiving apertures 784.

When the basket 720 is in its locked position, each of the legs 722 has its free end 734 in engagement with the engagement end 684 of the guide rails 678. In this position, without filter cartridge 538 installed in the filter bowl 536, the tips 730 of the petals 726 will contact or engage against the ribs 636 of the adaptor 564. See FIG. 48. Because the legs 722 are resting on top of the guide rails 678, the core piece 682 and the basket 220 cannot move axially downwardly in a direction toward the closed end 644 of the bowl 536. Instead, the entire inner liner assembly 792 is in an extended and rigidly fixed position. As can be seen in FIG. 48, in this rigidly fixed position, the filter head 532 cannot matably connect with the bowl 536 by connection between the threads 658 on the bowl 536 and the threads 620 on the filter head 532.

During servicing, when a new filter cartridge 538 has been provided, the filter cartridge 538 is oriented in the filter bowl 536 by placing it through the open mouth 642.

Attention is directed to FIGS. 50 and 52. When the filter cartridge 538 is properly positioned in the filter bowl 536, the ribs 568 on the first endcap 541 come in contact or engage the ramped surfaces 732 of the basket 720. As the filter cartridge 538 moves axially downwardly toward the closed end 644 of the filter bowl 638, the ribs 568 on the endcap 541 engage against the ramped surfaces 732 of the petals 726 of the basket 720. This engagement between the ribs 568 and ramped surfaces 732 cause the basket 720 to rotate from its locked position to its unlocked position against the spring 744. The rotation is 20-40 degrees, for example, about 25-28 degrees. As the basket 720 rotates from its locked position to its unlocked position, the legs 722 also rotate moving away from the engagement against the engagement end 684 of the guide rails 678. At some point, prior to the basket 720 rotating its full motion (for example, between 525 and 528 degrees), the legs 722 completely clear the guide rails 678. At this point, any additional movement of the filter cartridge 538 in a downwardly axial direction toward the closed end 644 will cause the basket 720 and core piece 682 to also move in that direction against the lower spring 710. The lower spring 710 biases the basket 720 and the core piece 682 in the extended position of FIG. 45.

Once the filter cartridge 538 has been moved downwardly enough to unlock the core piece 682 and move the basket 720 from its locked position to its unlocked position, the filter head 532 will be able to matably engage the threads on the bowl 536 for secure attachment, as shown in FIG. 50.

I. Drain Valve Mechanism

The filter system 530 depicted also has a drain valve mechanism to allow liquid in the complete assembly to automatically be drained during the servicing of the system 530. The drain valve mechanism can be implemented independently of other features in the example embodiment. For example, the drain valve mechanism can be implemented independent of the lock-out mechanism and of the cartridge retention mechanism.

Attention is directed to FIGS. 50 and 53-55. In FIG. 50, when the filter cartridge 538 is operably positioned in the filter bowl 536 and with the bowl 536 being fully threaded on the filter head 532 as shown in FIG. 50, the plug 752 is in the closed and sealed position. In this position, there is in place the first seal 762 and second seal 764.

The second seal 764 seals off liquid located on the clean side, in the filtered liquid volume 674 (FIG. 50), from port 794 that is fluidly connected to the unfiltered liquid volume 698 (FIG. 50). First seal 762 seals off liquid from port 794 from the drainage aperture 669 that is directed to the outside environment.

The lower spring 710 is located in the spring-holding seat 708 and a lower edge 796 of the guide fins 772. With the filter cartridge 538 operably positioned in the bowl 536 and the filter head 532 fully engaged and connected to the bowl 536, the lower spring 710 is a compressed state and is producing a force acting along the central axis of the filter cartridge 538, thereby holding the core piece 682 and basket 720 against the ribs 68 that are integral in the first endcap 541. Further, projections 590, 594 integral to the outward axial surface 554 of the first endcap 541 are held against the lower edge or rim 632 (FIG. 49) of the adaptor 564. Because the first endcap 541 is part of the filter cartridge 538, the entire assembly including the cartridge and the inner liner assembly 792 is held up against the adaptor 564.

When it is time to service the filter cartridge 538, because the media 544 becomes clogged or restricted, or if it just time to replace the cartridge 538 because of wear, the filter assembly 534 will be rotated about its central axis relative to the filter head 532. As this occurs, the filter assembly 534 moves downwardly along the central axis due to unthreading action between the bowl 536 and the filter head 532. While this downward action is occurring, the lower spring 710 continues to hold the filter cartridge 538 against the adaptor 564. The result of this is that the filter cartridge 538 remains fixed in position relative to the adaptor 564 and filter head 532 as the filter bowl 536 moves axially downwardly. This action creates relative motion between the plug 252 and the sealing surfaces forming the first and second seals 762, 764. After two full turns of the filter bowl 536, the drainage aperture 669 is fully open to the fluid in both the unfiltered liquid volume 698 and the filtered liquid volume 674, allowing the liquid to flow along flow paths 798, 799 (FIG. 55) into the outside environment, where it can be captured by some kind of container for proper disposal.

At this point, the core piece 682 can no longer move relative to the inner filter support 654. Locking spring 716 is attached to the core piece 682 by way of slots 774 in the guide fins 772 (See FIG. 47).

With the filter cartridge 538 fully installed in the bowl 536, the hooks 806, 807, in particular, ends 808, 809 of the hooks 806, 807, of the locking spring 716 are spring-loaded against the slide tracks 681 in the guide rails 678 within the wall 670 of the filter support 654.

As the core piece 682 moves upwardly in a direction toward the open mouth 642 of the bowl 536, relative to the filter support 654, the locking spring 716, being attached to the core piece 682 through the slots 774, moves with the core piece 682 until the two ends 808, 809 of the locking spring 716 move radially outwardly and into receiving slots 714 in the wall 670 of the filter support 654. See FIG. 48. The ends 808, 809 of the locking spring 716 lock into a position relative to the filter support 654 preventing the core piece 682 from moving any further. This prevents the core piece 682 from falling out of the filter bowl 536 after the filter cartridge 538 has been removed.

As can be seen in FIG. 48, the plug 752 is in a third position, axially above the drainage position, the position of FIG. 48 of the plug 752 is the position when the core piece 682 is locked in place during servicing awaiting the insertion of filter cartridge 538.

J. Cartridge Retention Mechanism 572

The preferred embodiment illustrated of the filter system 530 includes a cartridge retention mechanism 572, to releasably hold the filter cartridge 538 within the filter bowl 536 during servicing. The cartridge retention mechanism 572 can be implemented independently of other features in the filtration system, including independent of the lock-out mechanism and of the drain valve mechanism.

Figure 56:
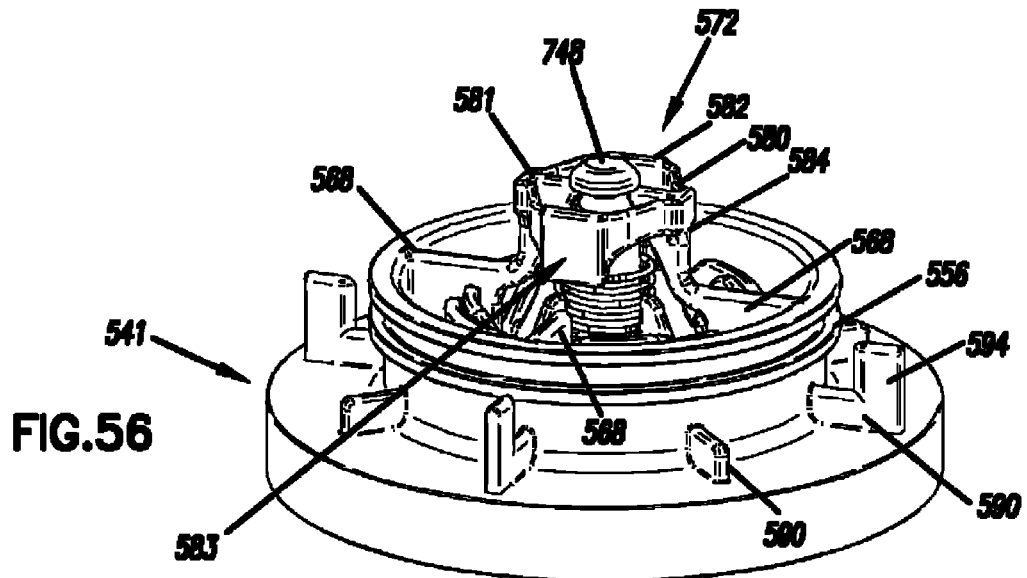
FIG. 56 is a partial, schematic perspective view of an endcap engaging a plug in a center piece, which would occur when the filter cartridge was removed from the filter bowl, the filter media not being depicted for purposes of clarity, constructed according to principles of this disclosure.
Figure 57:
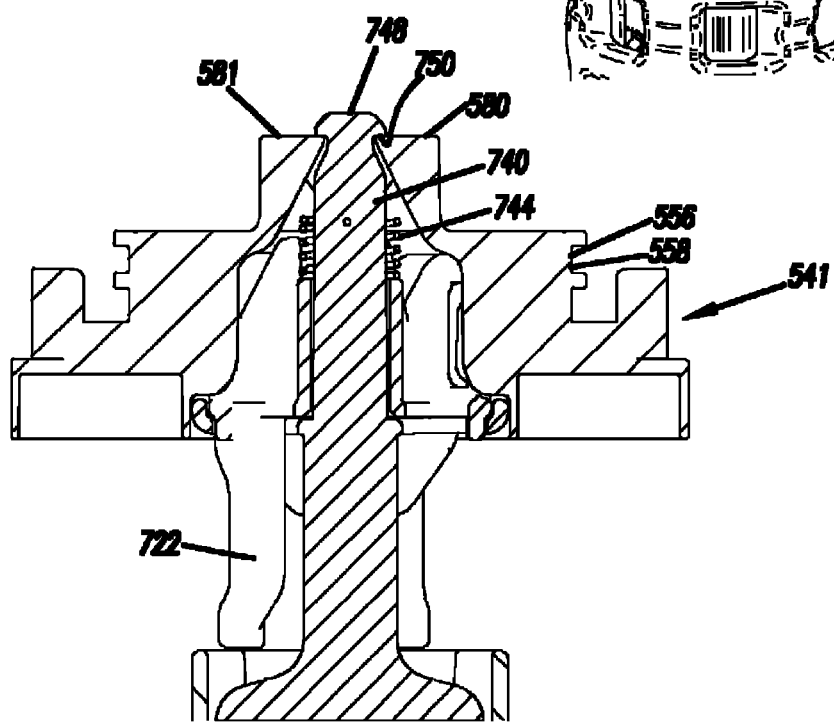
FIG. 57 is a schematic, cross-sectional view of the assembly of FIG. 56.

Attention is directed to FIGS. 56 and 57. These FIGS are schematic and the filter media 544 is not illustrated for purposes of clarity. Rather, only the first endcap 541 is shown, along with a portion of the inner liner assembly 792.

When the core piece 682 is in the position shown in FIG. 48, locked in its upward vertical direction, the post 740 is positioned relative to the first endcap 541 such that fingers 580, 581 on the endcap 541 are located underneath button 748. Specifically, the fingers 580, 581 are gripping the neck 750. Any further downward motion in the axial direction of the bowl 536 including the inner liner assembly 792 causes the neck 750 to come into contact with the fingers 580, 581, applying an axial downward force on the entire filter cartridge 538. The net result is that the cartridge 538 remains inside the bowl 536 during the last full turn of the bowl 536 as it is removed from the filter head 532.

With the filter assembly 534 now completely separated from the filter head 532, the filter cartridge 538 remains captured in the filter bowl 536 by the engagement between the fingers 580, 581 of the gripper arrangement 576 and the button 748 of the post 740. In order to release the filter cartridge 538 from the bowl 536, the release arrangement 578 is depressed. Specifically, the tabs 582, 583 are pressed radially inwardly toward each other and toward the post 740 by the thumb and forefinger of the person providing the servicing. This causes the fingers 580, 581 to move away from the neck 750 of the post 740, allowing the fingers 580, 581 to clear the button 748.

The thumb and forefinger of the service person is on the tabs 582, 583, and the service person can now pull the filter cartridge 538 clear of the button 748 and remove the cartridge 538 from the bowl 536.

It should be understood that in order for the tabs 582, 583 to deflect inwardly and cause the fingers 580, 581 to deflect outwardly, the retention mechanism 572 is made from a material flexible enough to provide that function with an amount of force that can be generated by the squeezing action of a thumb and forefinger. This material may typically be plastic, although it can be other materials as well.

K. Methods

A method for draining liquid from the filter system 530 should now be apparent from the foregoing. One method can include at least partially unscrewing the filter bowl 536 containing the filter cartridge 538 from the filter head 532 and permitting lower spring 710 to axially move core piece 682 having plug 752 from the sealed position shown in FIGS. 50 and 53 to a drainage position, shown in FIGS. 54 and 55. The sealed position includes the plug 752 blocking fluid flow between the unfiltered liquid volume 698 and the fluid outlet port, shown as drainage aperture 669, by blocking flow through a section, such as stem 668, of the inner filter support 654. The drainage position includes the plug 752 being oriented relative to the inner filter support 654 to permit flow through the drain aperture 669 of the stem 668, and permitting flow from the unfiltered liquid volume 698 and the drainage aperture 669.

A method of installing the filter cartridge 538 in the filter bowl 536 should also now be apparent. One method includes orienting the filter cartridge 538 into the filter bowl 536. The method further includes while orienting the filter cartridge 538, pushing the filter cartridge 538 against the core piece 682 to disengage the core piece 682 and the inner filter support 654. This is done, specifically, by engaging the ribs 568 of the first endcap 541 against the ramped surfaces 732 of the basket 720, causing rotation of the basket 720 against the spring 744, which causes the legs 722 to move out of axial abutment between the ends 734 and the engagement 684 of the guide rails 678. The legs 722 are then allowed to move axially downwardly within the outer wall 670 of the filter support 654. Next, after disengaging, the method includes axially moving both the filter cartridge 538 and the core piece 682 relative to the inner filter support 654. Specifically, the filter cartridge 538 pushes the basket 720 and the core piece 682 axially downwardly relative to the filter support 654. This then permits mating engagement between the filter head 532 and the filter bowl 536.

To service the filter system 530, the filter bowl 536 is unscrewed from the filter head 532. As this is done, the core piece 682 moves axially relative to the filter support 654, until the locking spring 716 becomes locked in place relative to the inner filter support 654. Specifically, the ends 808, 809 of the hooks 806, 807 travel along the slide tracks 681 of the guide rails 678 until they snap through the slots 714. When the locking spring 716 has its ends 808, 809 snap into the slots 714, the core piece 682 is axially locked relative to the porous inner filter support 654.

As the core piece 682 moves axially upwardly relative to the filter support 654, the button 748 on the post 740 became gripped by the gripper arrangement 576 of the first endcap 541 of the filter cartridge 538. The filter assembly 534 is removed from the filter head 532, and the filter cartridge 538 stays with the filter bowl 536. The user then grips the release arrangement 578, by placing his forefinger and thumb on the tabs 582, 583. The person squeezes the tabs 582, 583 in a direction toward the post 740. This causes the deflection of the fingers 580, 581, such that they move radially away from the neck 750 of the button 748.

With the cartridge 538 now disengaged from the core piece 682, the user removes the cartridge 538 from the bowl 536 by maintaining the grip on the tabs 582, 583, to axially pull the cartridge 538 from the bowl 536. The old filter cartridge is then disposed.

A new filter cartridge is then installed. A method of installing the filter cartridge has been described above and is then followed.

A method of filtering includes directing liquid to be filtered into the filter head 532 through the inlet conduit 614. The liquid then flows into the unfiltered liquid volume 698. The liquid is prevented from bypassing the filter media 544 by the seal 612 between the second endcap 542 and the base 686 of the porous inner filter support 654; and seal 62 between the first endcap 541 and the adaptor 564. Further, the seal 764 helps to seal against the liquid from bypassing the media 544. The liquid then flows through the filter media 544, through the flow passages 672 in the porous inner filter support 654, and then into the filtered liquid filter volume 674. The filtered liquid then flows through the first open aperture 550 (FIG. 43), through the open aperture 628 of the adaptor 564 and then through the outlet conduit 616 of the filter head 532.

We claim:

1. A filter cartridge for use in a filter bowl; the filter cartridge comprising:
    (a) a first end cap defining a first open aperture;
        (i) the first end cap holding a first end cap seal member;
        (ii) the first end cap defining an aperture wall lining the first open aperture;
        (iii) at least first and second protrusions extending radially into the first open aperture; the at least first and second protrusions engaging a lock-out mechanism in a filter bowl, when the filter cartridge is operably installed in the filter bowl;
            (A) the first protrusion being spaced from the second protrusion in a vertical direction;
            (B) the first protrusion being circumferentially spaced from the second protrusion;
        (iv) the first end cap defines an axially extending neck defining an outer radial surface;
            (A) the first end cap seal member is held by the axially extending neck on the outer radial surface;
    (b) a tubular construction of filter media defining an open filter interior and having first and second opposite ends; the first end being secured to the first end cap;
        (i) the first open aperture being in communication with the open filter interior; and
    (c) a second end cap secured to the second end of the filter media; the second end cap defining a second open aperture in communication with the open filter interior;
        (i) the second end cap holding a second end cap seal member;
    wherein an unobstructed volume extends from each of the at least first and second protrusions in an axial direction to an end of the filter cartridge on which the second end cap is disposed; and
    wherein a free space extends directly from both the first and second protrusions in an axial direction opposite of the second end cap to permit rotation of part of the lock-out mechanism in the filter bowl.

2. A filter cartridge according to claim 1 wherein:
    (a) the first open aperture of the first end cap defines an inner diameter;
    (b) the first protrusion extends into the first open aperture no greater than 40% of the inner diameter of the first open aperture; and
    (c) the second protrusion extends in the first open aperture no greater than 40% of the inner diameter of the first open aperture.

3. A filter cartridge according to claim 1 wherein:
    (a) the first protrusion and second protrusion are located circumferentially spaced within 50° of each other.

4. A filter cartridge according to claim 1 wherein:
    (a) the first protrusion and the second protrusion are located greater than 45° of each other.

5. A filter cartridge according to claim 1 wherein:
    (a) the first open aperture of the first end cap defines an inner diameter;
    (b) the vertical distance between the first and second protrusions is 2-30% of the inner diameter.

6. A filter cartridge according to claim 1 further comprising:
    (a) at least a third protrusion extending radially into the first open aperture;
        (i) the third protrusion being circumferentially spaced from the first protrusion and the second protrusion;
        (ii) the third protrusion being vertically spaced from only one of either the first protrusion or the second protrusion.

7. A filter cartridge according to claim 6 further comprising:
(a) at least a fourth protrusion extending radially into the first open aperture;
(i) the fourth protrusion being circumferentially spaced from the first, second, and third protrusions; and
(ii) the fourth protrusion being vertically spaced from only two of the first protrusion, the second protrusion, or the third protrusion.

8. A filter cartridge according to claim 7 wherein:
(a) two of the first, second, third, and fourth protrusions are circumferentially spaced within 45° of each other; and a remaining two of the first, second, third, and fourth protrusions are circumferentially spaced within 45° of each other.

9. A filter cartridge according to claim 1 wherein:
(a) the inner radial surface forming a portion of the aperture wall; and
(i) only one of the first and second protrusions extends from the inner radial surface of the neck.

10. A filter cartridge according to claim 9 wherein:
(a) the first end cap defines a filter media holding section having an inner media wall; the inner media wall defining an inner radial surface which forms part of the aperture wall;
(i) the inner radial surface of the inner media wall being spaced radially inwardly relative to the neck inner radial surface;
(ii) only one of the first and second protrusions extends from the inner radial surface of the inner media wall.

11. A filter cartridge according to claim 1 wherein:
(a) the second end cap defines a second axially extending neck defining a radial surface;
(i) the second end cap seal member is held by the second axially extending neck on the radial surface.

12. A filter cartridge according to claim 1 wherein:
(a) the first end cap further includes an axially projecting centering arrangement projecting from an outward axial surface thereof adjacent to an outer rim of the first end cap.

13. A filter cartridge according to claim 1 further including:
(a) a retention mechanism centered within the first open aperture and extending from the first end cap; the retention mechanism having a gripper arrangement and a release arrangement.

14. A filter cartridge according to claim 13 wherein:
(a) the gripper arrangement includes a pair of opposing fingers radially extending toward each other; and
(b) the release arrangement includes a pair of opposing tabs, each tab being located about 90° relative to the fingers.

15. A filter cartridge according to claim 1 wherein:
(a) the filter media is pleated media.

16. A filter cartridge according to claim 1 wherein:
(a) the first end cap aperture wall has an end rim adjacent and against the filter media in the open filter interior;
(i) each of the first and second protrusions being spaced from the end rim so that the end rim is protrusion-free.

* * * * *